(12) United States Patent
Ahanger et al.

(10) Patent No.: US 8,307,392 B2
(45) Date of Patent: Nov. 6, 2012

(54) SYSTEMS AND METHODS FOR INSERTING ADS DURING PLAYBACK OF VIDEO MEDIA

(75) Inventors: Gulrukh Ahanger, Brookline, MA (US); Pavel Murnikov, Acton, MA (US); Todd Boes, Marblehead, MA (US); Robert Hammond, Exeter, NH (US)

(73) Assignee: Yahoo! Inc., Sunnyvale, CA (US)

( * ) Notice: Subject to any disclaimer, the term of this patent is extended or adjusted under 35 U.S.C. 154(b) by 415 days.

(21) Appl. No.: 12/134,569

(22) Filed: Jun. 6, 2008

(65) Prior Publication Data

US 2008/0307454 A1 Dec. 11, 2008

Related U.S. Application Data

(60) Provisional application No. 60/943,244, filed on Jun. 11, 2007.

(51) Int. Cl.
*H04N 7/10* (2006.01)
*H04N 5/445* (2011.01)

(52) U.S. Cl. ............... 725/36; 725/32; 725/34; 725/46; 725/51

(58) Field of Classification Search ............ 725/32, 725/34–36, 46, 51
See application file for complete search history.

(56) References Cited

U.S. PATENT DOCUMENTS

| | | | |
|---|---|---|---|
| 6,698,020 | B1 | 2/2004 | Zigmond et al. |
| 7,039,930 | B1 | 5/2006 | Goodman et al. |
| 7,676,142 | B1 | 3/2010 | Hung |
| 2002/0097979 | A1 | 7/2002 | Lowthert et al. |
| 2003/0101454 | A1 | 5/2003 | Ozer et al. |
| 2004/0003398 | A1* | 1/2004 | Donian et al. ............. 725/34 |
| 2005/0119976 | A1* | 6/2005 | Taylor et al. ............. 705/52 |

(Continued)

OTHER PUBLICATIONS

Official Action issued in connection with U.S. Appl. No. 12/134,577 mailed Nov. 24, 2010.

(Continued)

*Primary Examiner* — Kieu Oanh T Bui
(74) *Attorney, Agent, or Firm* — James J. DeCarlo; Greenberg Traurig, LLP

(57) ABSTRACT

The solution of the ad delivery platform described herein provides for the marketing and monetizing of media assets via the delivery of advertisement with on-demand video. The ad platform optimizes the delivery of ads by controlling the insertion frequency and format of the ad delivered with video streams. The ad platform provides flexible and configurable ad insertion rules to specify the insertion frequency and format for the composition of ads during playback of on-demand video media. The ad insertion rules may be based on a user profile, user behavior history, topic of the stream to be delivered, duration of the video or ad, and/or the popularity rating of the video or ad. The ad platform includes a reporting tool and usage reports to measure the effectiveness of the ad insertion rules in delivering ads to market and monetize the video media. The ad platform also includes an ad inventory management and forecasting tool for determining the available inventory of ad placement based on data collected over a period of time regarding the delivery of ads and the ad insertion rules to be used for the delivery of a desired ad. With these tools, a more effective ad campaign can be created based on the target information and optimization via the ad insertion rules.

33 Claims, 34 Drawing Sheets

U.S. PATENT DOCUMENTS

| | | |
|---|---|---|
| 2006/0080171 A1 | 4/2006 | Jardins et al. |
| 2007/0018425 A1* | 1/2007 | Gilmore et al. ............ 280/288.4 |
| 2007/0094082 A1* | 4/2007 | Yruski et al. .................... 705/14 |
| 2007/0261072 A1 | 11/2007 | Boulet et al. |
| 2007/0276726 A1* | 11/2007 | DiMatteo ........................ 705/14 |
| 2008/0133340 A1 | 6/2008 | Do et al. |
| 2009/0007172 A1 | 1/2009 | Ahanger et al. |
| 2009/0013347 A1* | 1/2009 | Ahanger et al. ................ 725/36 |

OTHER PUBLICATIONS

Official Action issued in connection with U.S. Appl. No. 12/134,577 mailed May 11, 2011.

Official Action issued in connection with U.S. Appl. No. 12/134,589 mailed Mar. 30, 2011.

* cited by examiner

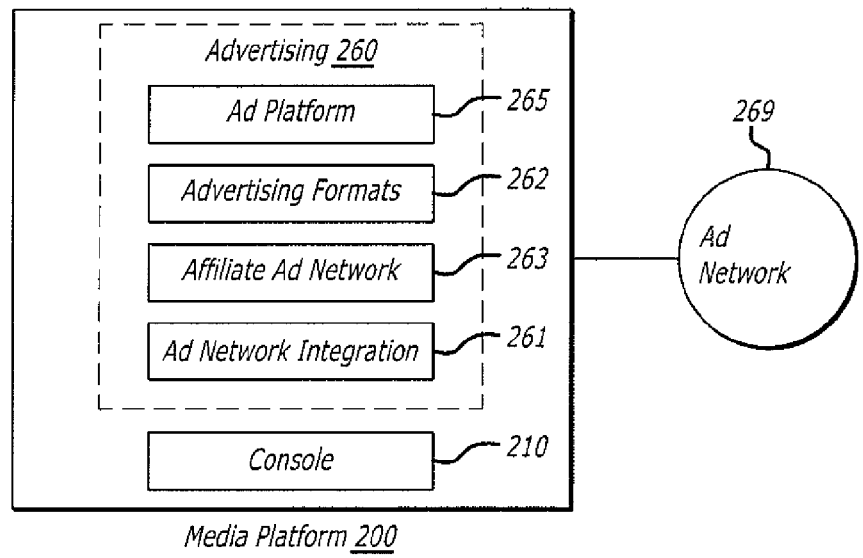
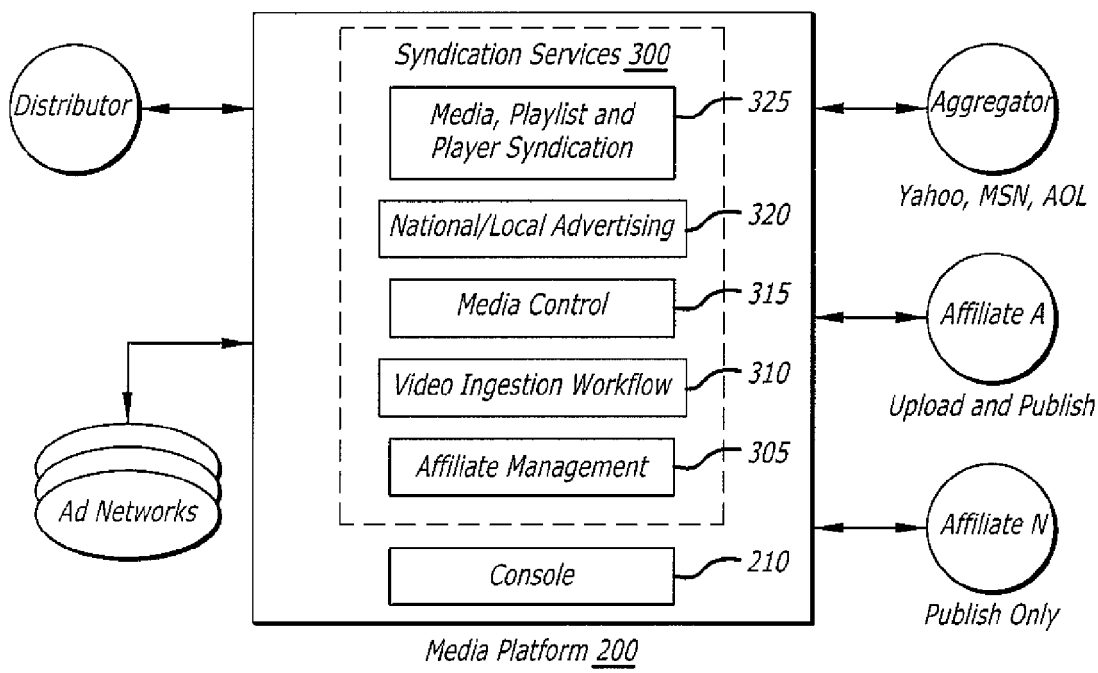

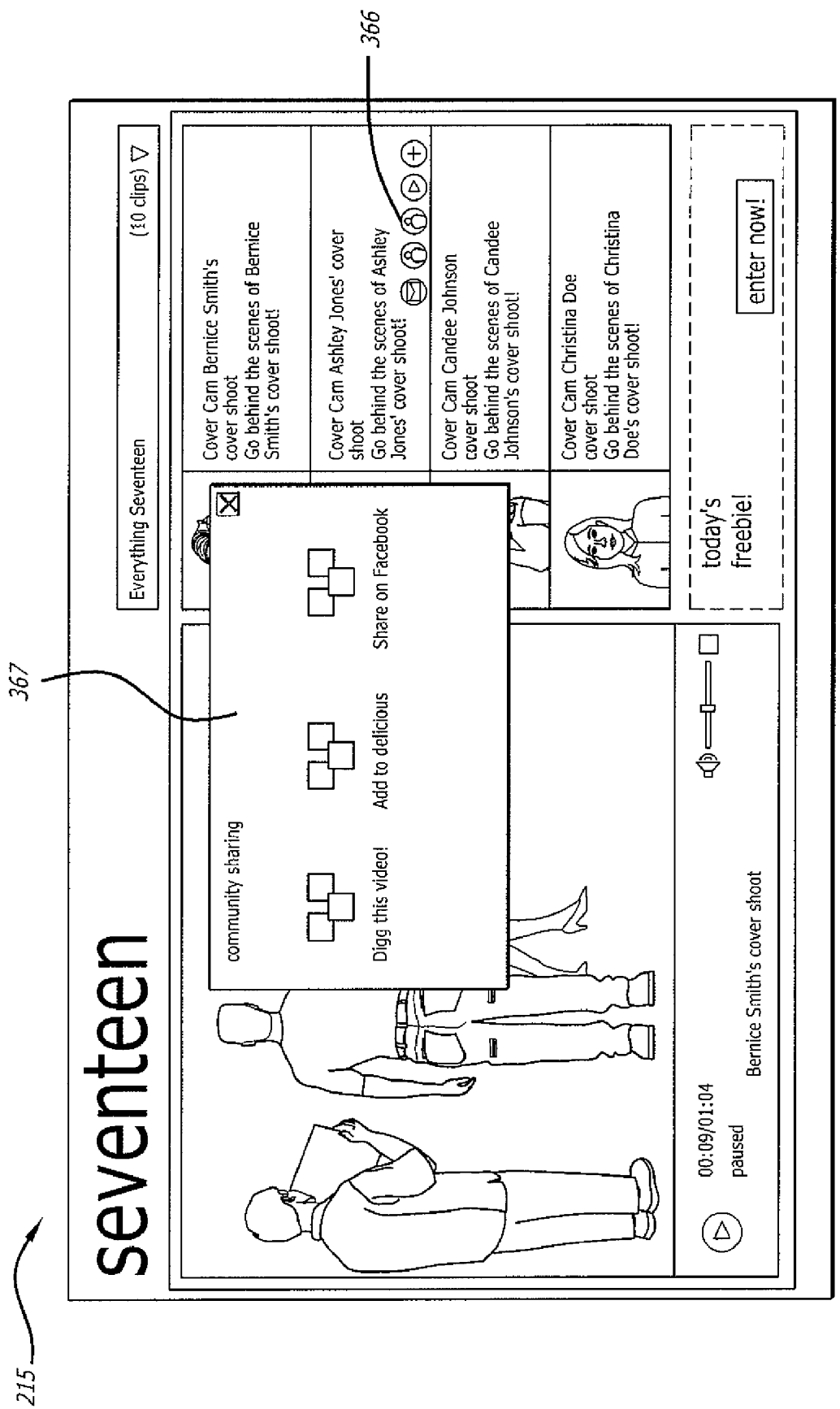

Total inventory = $f(ai, sl) = ai \times sl$
the available inventory (ai) is a function of the total
audience available over span of time and the spot load (sl).

Parameters —— 920
- Days and the hours during which streams where played back
- Number of streams
- Video titles and their genres
- Audience segment of the consumer
- Churn rate, i.e., how many times an ad was streamed to users
- Special Events, Seasonal Trends, etc.

SYSTEMS AND METHODS FOR INSERTING ADS DURING PLAYBACK OF VIDEO MEDIA

RELATED APPLICATION

This application claims the benefit of and priority to U.S. Provisional Patent Application No. 60/943,244, entitled "Systems and Method for Inserting Ads During Playback of Video Media" and filed on Jun. 11, 2007, which is incorporated herein in its entirety by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent application generally relates to an advertising serving platform for dynamically inserting and delivering ads during playback of on-demand video media.

BACKGROUND INFORMATION

As the number of people communicating over a publicly accessible communication network, such as the Internet, continues to grow, the use, availability and distribution of media content via the Internet, such as video and audio media files, grows as well. The popularity of delivering and experiencing media content via the Internet continues to grow because the Internet provides for both immediacy of the media and interactivity of the media. Media content can provide a rich interactive user experience from a network connected device. In addition, media content delivered to computing devices via a network may receive input from the user or information about the user to both personalize and dynamically enhance the user experience, thereby further increasing the immediacy and interactivity of the medium. As such, delivering media content via the Internet is quickly gaining adoption as a mechanism for reaching consumers for purposes of marketing and monetizing media assets.

Some of the challenges with marketing and monetizing media assets over the Internet, such as broadband video, are due to the ubiquitous and on-demand nature of the medium. Web-sites provide a wide range of video content varying in content type, duration and quality. Many web-sites make video content accessible at the request or upon demand of the user. Users may search, find, select and play video media when they want. Video media is also available to users from a wide range of network connected devices, such as cell phones and other mobile devices. As such, users may access video media from where ever they want. During playback of the video, users typically have control of the playing of the video via the media player. For example, the user may pause, rewind, stop or fast forward the playing of the video. Thus, users may be able to view the video for how ever long they want and in a manner they want.

SUMMARY OF THE INVENTION

The solution of the ad delivery platform described herein provides for the marketing and monetizing of media assets via the delivery of advertisement with on-demand video. The ad platform optimizes the delivery of ads by controlling the insertion frequency and format of the ad delivered with video streams. The ad platform provides flexible and configurable ad insertion rules to specify the insertion frequency and format for the composition of ads during playback of on-demand video media. The ad insertion rules may be based on a user profile, user behavior history, topic of the stream to be delivered, duration of the video or ad, and/or the popularity rating of the video or ad. The ad platform includes a reporting tool and usage reports to measure the effectiveness of the ad insertion rules in delivering ads to market and monetize the video media. The ad platform also includes an ad inventory management and forecasting tool for determining the available inventory of ad placement based on data collected over a period of time regarding the delivery of ads and the use of as insertion rules. With these tools, a more effective ad campaign can be created based on the campaign's target information and optimization via the ad insertion rules.

In one aspect, the present invention is related to a method for displaying an ad during a playback of a video media at an insertion point during playback specified by an ad insertion rule and using a format for the ad specified by the ad insertion rule. The method includes receiving a request to playback a video media and identifying an ad insertion rule associated with the video media. The ad insertion rule may specify an insertion point during playback of the video media to display an ad. The ad insertion rule may also specify a format for displaying the ad at the insertion point. The method also includes determining a point during playback of the video media corresponding to the insertion point specified by the ad insertion rule. In response to the determination, the method includes displaying the ad at the determined point during playback of the video media using the format for the ad specified by the ad insertion rule.

The ad insertion rule may specify a frequency for inserting ads at multiple insertion points during the playback of video media. The ad insertion rule may specify the frequency based on a length of the video media. The ad insertion rule may also specify a format displaying an ad during playback of the video media based on a length of the video media. For example, the ad insertion rule, may identify a length of time for displaying the ad, a location of the ad, or a type of ad to display.

In some embodiments, the method includes identifying a user requesting playback of the video media. The method may include obtaining a profile or a behavior history of the identified user. The profile may include one or more of the following information: name, age group, topics of interest, gender, geographic location, ethnic background, household income, education level, and children in household. The method may also include obtaining the behavior history of the identified user having the following information: average viewing period, trend in popular topics, number of streams, days and hours of streaming, and Internet protocol address mapping to location. The behavior history of the identified user may also include one or more of the following user actions on a media player: mute, pause, restart, full screen, mid point viewing, complete viewing, fast forward, rewind, and may include any actions such as a mouse over, hover or identify that the user initiated play via a click through.

In other embodiments, the method includes identifying the popularity rating of the video media requested for playback. In another embodiment, the method include identifying the popularity rating or the ad specified by the ad insertion rule associated with the requested video media. In some cases, the popularity rating may be based on a number of views of the video media, such as the most popular videos or ads having the highest number of views.

In one embodiment, the method includes determining the point during playback of the video media corresponds to a period of time indicated by the frequency. The point in playback of the video media may be determined to correspond to the insertion point specified by the ad insertion rule based on the profile or the behavior history of the identified user. In some cases, the point during playback of the video media may be determined to correspond to the insertion point specified by the ad insertion rule based on the identified popularity rating of the video and/or the ad.

In one embodiment, the method includes displaying the ad for the length specified by the ad insertion rule based on the length of the requested video media. The ad also may be displayed at a location specified by the ad insertion rule based on the length of the requested video media. In some embodiments, the ad may be displayed at a location, for a length of time or having a predetermined ad type based on the profile or the behavior history of the identified user. In another case, the ad may be displayed at a location, for a length of time or having a predetermined ad type based on the identified popularity rating of the video or ad. The method may include increasing or decreasing a frequency of ads displayed during playback of the video media based on the identified popularity rating. Any one or more of the following types of ads may be displayed responsive to an ad insertion rule: gateway, interstitial, bumper, context positioning, a spot, a bug, telescoping, interactive video, video curtains, video roadblocks, ticker lay, and shadow ad.

In another aspect, the present invention is related to dynamically inserting an ad during playback of a video media based on an action of a user via a media player. The includes receiving a request by a user to playback a video media via a media player and identifying an ad insertion rule associated with a video media. The ad insertion rule may specify an insertion point for displaying an ad during playback of the video media based on one or more actions of a user via the media player during a playback session of the video media. The method includes detecting one or more actions of the user via the media player during the playback session of the video media, and determining a point during playback of the video media corresponding to the insertion point specified by the ad insertion rule based on the detected one or more actions of the user. The playback session may include a user session's with a web-site or a user session's with a media player. The method further include displaying the ad specified by the ad insertion rule at the point during playback of the video media based on the determination.

In some embodiments, the method includes detecting a length of time of the playback session is greater than or less than a predetermined length of time. In another embodiment, the method includes detecting the user has taken one or more of the following actions via the media player: mute, pause, restart, full screen, fast forward, and rewind. The method may include displaying the ad at a location, for a length of time or having a predetermined type based on the detected one or more actions of the user. The frequency of ad insertion or format of the ad may be changed based on the detected one or more actions of the user. For example, the location of the ad or a length of time for displaying the ad may be changed based on a detected action of the user.

In other aspects, the present invention is related to a method for dynamically displaying an ad into a playback of a video media based on actions of a user at a web site providing the video media. The method includes receiving a request by a user to playback a video media via a web site and identifying an ad insertion rule with a video media. The ad insertion rule may specify an insertion point for displaying an ad during playback of the video media based on one or more actions of the user at a web site. The user's visit to the web-site may include a playback of video via a media player. The method includes detecting one or more actions of the user at the web site and determining a point during playback of the video media corresponding to the insertion point specified by the ad insertion rule based on the identified one or more actions of the user. The ad may be displayed in accordance with the ad insertion rule at the point during playback of the video media based on the determination. For example, the ad may be displayed at a location, for a length of time or having a predetermined type based on the detected one or more actions of the user at the web-site.

In one embodiment, the method includes detecting a length of the user's visit at the web site greater than or less than a predetermined length of time. In some cases, the type of content the user viewed at the web-site is detected. In other cases, the user interface element selected by the user at the web-site are detected, such as the URLs the user visited. The frequency of ad insertion or format of the ad may be changed based on the detected one or more actions of the user at the web-site. For example, a location of the ad or a length of time for displaying the ad may be changed based on the detected one or more actions of the user at the web-site.

In yet another aspect, the present invention is related to a method of generating a usage report for an ad insertion rule. The usage report provides information about delivery of ads at a plurality of insertion points during playback of video media. The delivery of ads may be controlled by applying one or more ad insertion rules, which specify a format, a frequency or an insertion point for displaying the ad during a playback of video media. The method includes collecting data regarding delivery of ads at insertion points during playback of video media. The method includes identifying an ad insertion rule from the one or more ad insertion rules. The method includes generating from the collected data a report providing a number of ads that were delivered by application of the identified ad insertion rule during the playback of the video media.

In some embodiments, the method includes collecting data providing temporal information on the insertion points at which the ads were displayed during playback of video media. A report may be generated from the collected data the report to identify one or more points in time of the insertion points at which the ads were delivered during the playback of the video media. The report may identify the one or more points in time the ads were delivered in relation to a length in time of the video media or a length of time of playback of the video media.

In another embodiment, the method includes collecting data identifying a profile or behavior of a user associated with the ad insertion rule with the insertion points at which the ads were displayed during playback of video media. A report may be generated from the collected data the report providing information from the profile or the behavior history of the user. The report may be generated to maintain anonymity of the user. Data may be collected identifying one or more user actions of a user via a player of the video media. A report may be generated from the collected data identifying the one or more user actions associated with each of ads delivered at each of the insertion points during the playback of the video media. A report may also be generated from the collected data identifying user actions taken within the delivered ad.

In other embodiments, the method includes collecting data identifying a format for each ad delivered via the ad insertion rule. The format may include a type, location or a length of the ad. A report may be generated from the collected data identifying the format used for each of the ads delivered at each of the insertion points during the playback of the video media. In some embodiments, the report may identify the number of delivered ads by format. A generated report may also identify a rule criteria that was met in triggering the one or more ad insertion rules.

In another aspect, the present invention is related a system generating a usage report for an ad insertion rule. The usage report provides information about delivery of ads at a insertion points during playback of video media. The video media may include a plurality of video media of variable length and the playback of each of the video media may be of variable duration. For example, the user may determine the duration of the playback. The delivery of ads may be controlled by applying one or more ad insertion rules. The one or more ad insertion rules may specify a format, a frequency or an insertion point for displaying the ad during playback of video media. The system includes a data collection service collecting data regarding delivery of ads at insertion points during playback of video media. The system may include a user interface for identifying an ad insertion rule from the one or more ad insertion rules. The system also includes a reporting service generating from the collected data a report providing a number of ads that were delivered by application of the identified ad insertion rule during the playback of the video media. The data collection, reporting service and user interface of the system may be deployed as a software as a service.

In some embodiments, the data collection service collects data providing temporal information on the insertion points at which the ads were displayed during playback of video media. The reporting service may generate from the collected data the report to identify one or more points in time of the insertion points at which the ads were delivered during the playback of the video media. The reporting service may generate from the collected data the report to identify the one or more points in time the ads were delivered in relation to a length in time of the video media or a length of time of playback of the video media.

In other embodiments, the data collection service collects data identifying a profile or behavior of a user associated with the insertion points at which the ads were displayed during playback of video media. The reporting service may generate from the collected data the report providing information from the profile or the behavior history of the user. The reporting service generates from the collected data the report identifying user actions taken within the delivered ad.

In another embodiment of the system, the data collection service collects data identifying a format for each ad delivered via the ad insertion rule. The format may include a type, location or a length of the ad. The reporting service may generate from the collected data the report identifying the format used for each of the ads delivered at each of the insertion points during the playback of the video media The data collection service may collect data identifying one or more user actions of a user via a player of the video media. The reporting service may generate from the collected data the report identifying the one or more user actions associated with each of the ads delivered at each of the insertion points during the playback of the video media. The reporting service may also generate from the collected data the report to identify the number of delivered ads by format.

In yet another aspect, the presenting invention is related to a method for forecasting total inventory for an ad to be displayed during playback of video media of variable length. The ad may be dynamically inserted during playback based on one or more ad insertion rules and the duration of playback may be of a variable length dynamically determined by a user.

The method includes collecting data on delivery of video media to one or more users and delivery of ads during playback of each of the video media. The delivery of ads may be based on applying one or more ad insertion rules during playback of video media. The method also includes identifying from the collected data a number of times each of the video media was played during a time period and a number of ads delivered via the ad insertion rules at the insertion points during playback of each of the video media over the time period. The method also includes receiving input identifying an ad requested to be delivered during playback of the video media by applying a set of one or more ad insertion rules, and determining a forecast of a total inventory for the requested ad based on the identified number of times each of the video media was played, the identified number of ads delivered during playback of each of the video media and the identified set of one or more ad insertion rules. The forecast of the total inventory may be determined using a time series forecasting method.

In one embodiment, the method includes receiving input from a user identifying the set of one or more ad insertion rules for determining the forecast. The forecast of the total inventory may be determining one of estimating or predicting a number of times an ad may be displayed during playback of the video media by applying the identified set of one or more ad insertion rules. In some embodiments, the method includes identifying from the collected data a day or a time during which each of the video media was played during the time period. The forecast of the total inventory may be determined based on the identified day or the identified time of the played video media and received input identifying a day or a time to deliver the requested ad.

In other embodiments, the method includes identifying from the collected data an audience segment for each of the video media played during the time period. The audience segment may be identified based on a portion of a day, or a day part. The forecast of the total inventory may be determined based on the identified audience segment of the played video media and received input identifying a predetermined audience segment for which to deliver the requested ad.

In some aspects, the present invention is related to a method for forecasting a what-if scenario of total inventory for an ad to be displayed during playback of video media of variable length. The ad may be dynamically inserted during playback based on one or more ad insertion rules. The duration of playback may be of a variable length dynamically determined by a user. The method includes collecting data on delivery of a plurality of video media to one or more users and delivery of ads during playback of each of the plurality of video media, the delivery of ads based on applying one or more ad insertion rules during playback of video media. The method also includes identifying from the collected data a number of times each of the video media was played during a time period, and a number of ads delivered via the ad insertion rules at points in time during playback of each of the video media over the time period. The method also includes receiving input identifying an ad requested to be delivered during playback of the plurality of video media, changing one or more ad insertion rules to be applied for the requested ad during playback of the video media, and determining a forecast of a total inventory for the requested ad based on the identified number of times each of the media was played, the identified number of ads delivered during playback of each of the video media and the changed one or more ad insertion rules.

In some embodiments, the forecast of the total inventory may be determined by estimating or predicting a number of times an ad may be displayed during playback of the video media by applying the changed one or more ad insertion rules. The forecast of the total inventory may also be determined based on the identified audience segment of the played video media and received input identifying a predetermined audience segment for which to deliver the requested ad. One or more of a target day, a time, a genre, audience segment or quantity for delivering the requested ad may be changed and the forecast of the total inventory may be determined based on these changes.

In yet another aspect, the present invention is related to a method for forecasting a what-if scenario of a total inventory for an ad to be displayed during playback of video media based on target information. The method includes collecting data on delivery of video media to one or more users and delivery of ads during playback of each of the plurality of video media. The delivery of ads based on applying one or more ad insertion rules during playback of video media. The method includes identifying from the collected data a number of times each of the video media was played during a time period, and a number of ads delivered via the ad insertion rules at points in time during playback of each of the video media over the time period. The method includes receiving input identifying an ad requested to be delivered during playback of the video media and input identifying target information including a target audience, a target time period or a category for the requested ad. The method further includes the step of determining a forecast of a total inventory for the requested ad based on the identified number of times each of the video media was played, the identified number of ads delivered during playback of each of the video media and the identified target information. One or more of the target audience, the target time period, or the category for delivering the requested ad may be changes and the forecast of the total inventory determined based on these changes.

The details of various embodiments of the invention are set forth in the accompanying drawings and the description below.

BRIEF DESCRIPTION OF THE DRAWINGS

The foregoing and other objects, aspects, features, and advantages of the present invention will become more apparent and may be better understood by referring to the following description taken in conjunction with the accompanying drawings, in which:

FIG. 2G is a block diagram of an embodiment of advertising services of the media delivery platform;

FIG. 3A is a diagrammatic view of an embodiment of syndication services of the media delivery platform;

FIG. 3C is an example pictorial of an embodiment of community site integration of the community services portion of the media delivery platform;

FIGS. 3D and 3E are example pictorials of an embodiment of an embedded player feature of the community services portion of the media delivery platform;

FIG. 5D is a pictorial view of an embodiment of a console for previewing a template of a branded player;

FIG. 5E is a pictorial view of an embodiment of a console for scheduling the times for branding a player;

FIG. 5F is a pictorial view of another embodiment of a console for scheduling the times for branding a player;

FIG. 7C is a pictorial view of an example embodiment of a call for action at an end of the ad depicted in FIG. 7B;

FIG. 7E is a pictorial view of another example embodiment of available new video clips as a result of a user taking a call for action;

FIG. 9B is a diagrammatic view of embodiments of total inventory computations and parameter information for forecasting inventory.

In the drawings, like reference numbers generally indicate identical, functionally similar, and/or structurally similar elements.

DESCRIPTION

Certain illustrative embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiments of the media delivery platform described herein provide a solution for creating, distributing and managing intelligent and cost-effective delivery of video, audio and broadband media content over a network, such as the Internet, to desktop, mobile computing, and network connected devices. In some embodiments, the media delivery platform provides an Internet Protocol or IP TV platform to create, distribute and manage Internet based or broadband based video, such as direct-to-consumer broadband video channels. The media platform provides Internet-based video publishing, syndication and community building functionality and services. The media delivery platform also provides content and advertising network integration in support of monetizing media assets via delivery of Internet based advertisement in conjunction with video.

In some embodiments and as will be discussed in greater detail below, the media delivery platform includes an ad delivery platform, or ad platform, to provide functionality for the delivery of on-demand video advertisement. The ad platform provides a solution for the composition of ads in video streams by controlling ad insertion frequency and format of the ad based on information, such as a user profile, user behavior history, topic of the stream to be delivered, duration of the video or ad, and/or the popularity rating of the video or ad. The ad platform provides flexible and user configurable ad insertion rules to determine the insertion frequency and format for the delivery of ads during playback of on demand video media. The ad platform also provides a reporting tool and usage reports identifying delivery of ads based on these ad insertion rules. In other embodiments, the ad platform also includes an ad inventory management and forecasting tool for determining the available inventory of ad placement based on data collected over a period of time regarding the delivery of ads and the one or more ad insertion rules to be used for the delivery of a desired ad.

Computing Environment

Figure 1A:
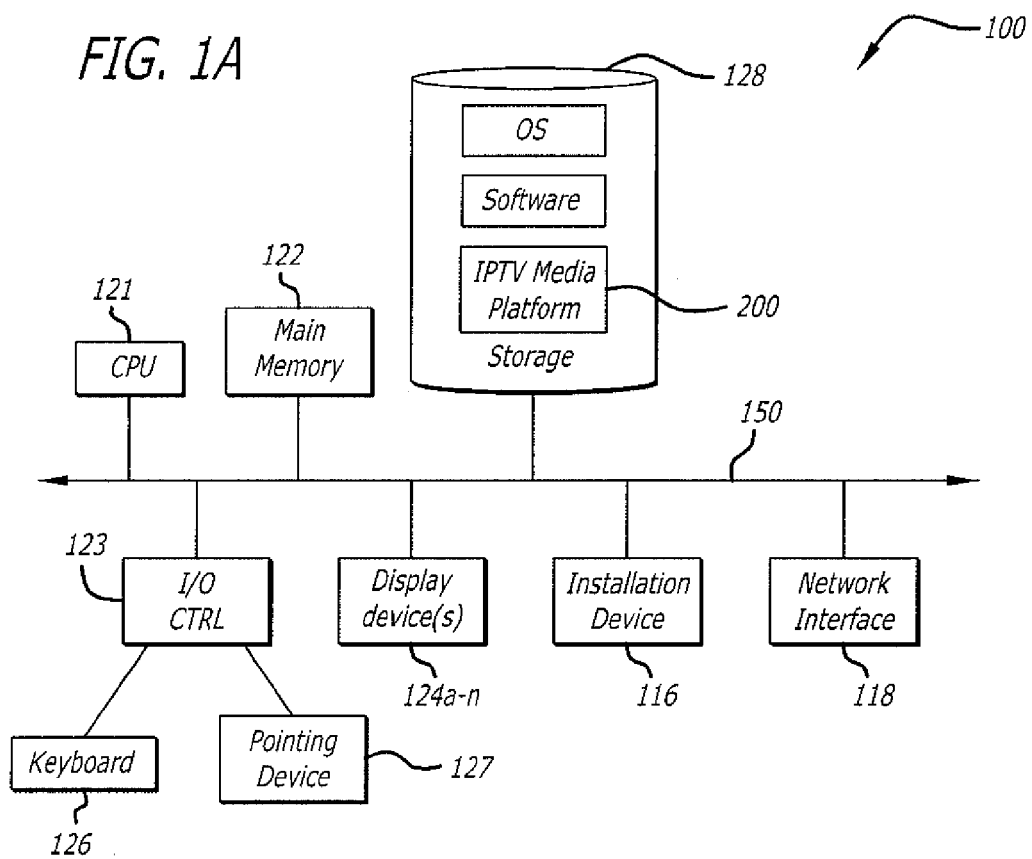
FIGS. 1A and 1B are block diagrams of embodiments of a computing device for practicing an embodiment of the present invention.
Figure 1B:
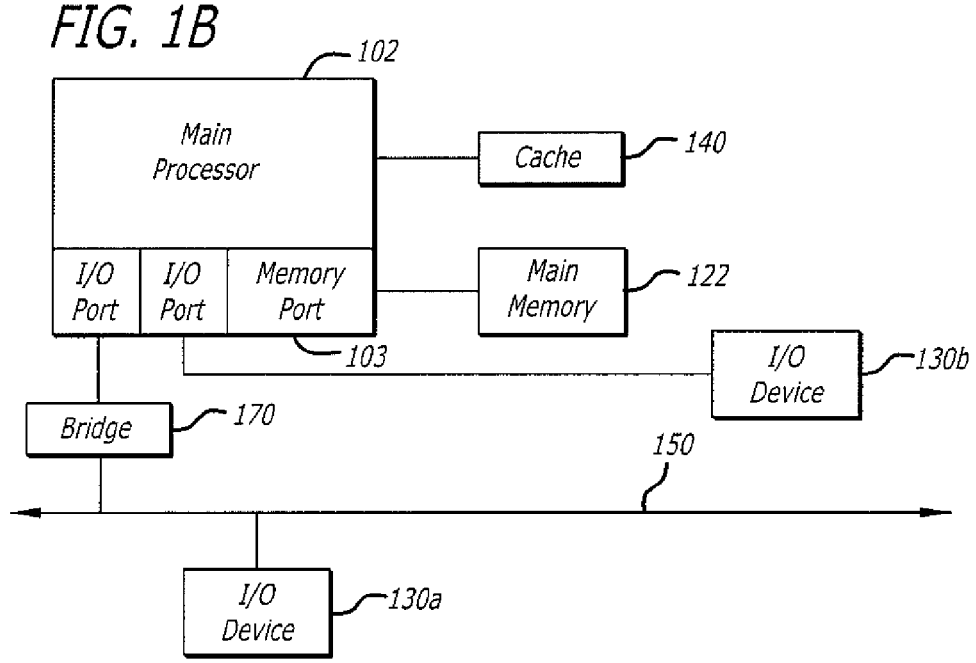

Prior to discussing the details of the embodiments of the media delivery platform of the present solution, a computing environment for operating the media delivery platform, or any portions thereof, is discussed. FIGS. 1A and 1B depict block diagrams of a computing device 100, and in some embodiments, also referred to as a network connected device 100, useful for practicing an embodiment of the systems described herein. As shown in FIGS. 1A and 1B, each computing device 100 includes a central processing unit 102, and a main memory unit 122. As shown in FIG. 1A, a typical computing device 100 may include a visual display device 124, a keyboard 126 and/or a pointing device 127, such as a mouse. In some embodiments, the visual display device 124 and any related hardware and/or software supports and is capable of displaying high-definition video as described in detail further herein. Each computing device 100 may also include additional optional elements, such as one or more input/output devices 130a-130b (generally referred to using reference numeral 130), and a cache memory 140 in communication with the central processing unit 102.

The central processing unit 102 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 102 communicates with main memory 122 via a system bus 150 (described in more detail below). FIG. 1A depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 102 communicates directly with cache memory 140 via a secondary bus, sometimes referred to as a backside bus. In other embodiments, the main processor 102 communicates with cache memory 140 using the system bus 150. Cache memory 140 typically has a faster response time than main memory 122 and is typically provided by SRAM, BSRAM, or EDRAM.

In the embodiment shown in FIG. 1A, the processor 102 communicates with various I/O devices 130 via a local system bus 150. Various busses may be used to connect the central processing unit 102 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 102 may use an Advanced Graphics Port (AGP) to communicate with the display 124. FIG. 1B depicts an embodiment of a computer 100 in which the main processor 102 communicates directly with I/O device 130b via HyperTransport, Rapid I/O, or InfiniBand. FIG. 1B also depicts an embodiment in which local busses and direct communication are mixed: the processor 102 communicates with I/O device 130a using a local interconnected bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any software 120, or portion thereof, related to the intelligent delivery system described herein. The computing device 100 may further comprise a storage device 128, such as one or more hard disk drives or redundant arrays of independent disks, for storing an operating system and other related software, and for storing application software programs such as any program related to the intelligent delivery system 120. Optionally, any of the installation devices 116 could also be used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. In one embodiment, the computing device 100 may provide a USB connection to receive a media playing or media storage device, such as an iPod device manufactured by Apple Computer of Cupertino, Calif.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. The computing device 100 can be any workstation, desktop computer, laptop or notebook computer, server, handheld computer, mobile telephone or other portable telecommunication device, media playing device, a gaming system, or any other type and/or form of computing, telecommunications or media device that is capable of communication and that has sufficient processor power and memory capacity to perform the operations described herein. For example, the computing device 100 may comprise a device of the iPod family of devices manufactured by Apple Computer of Cupertino, Calif., a Playstation 2, Playstation 3, or Personal Playstation® Portable (PSP) device manufactured by the Sony Corporation of Tokyo, Japan, a Nintendo DS™ or Nintendo Revolution™ device manufactured by Nintendo Co., Ltd., of Kyoto, Japan, or a Xbox™ or Xbox 360™ device manufactured by the Microsoft Corporation of Redmond, Wash.

Media Platform

Figure 2A:
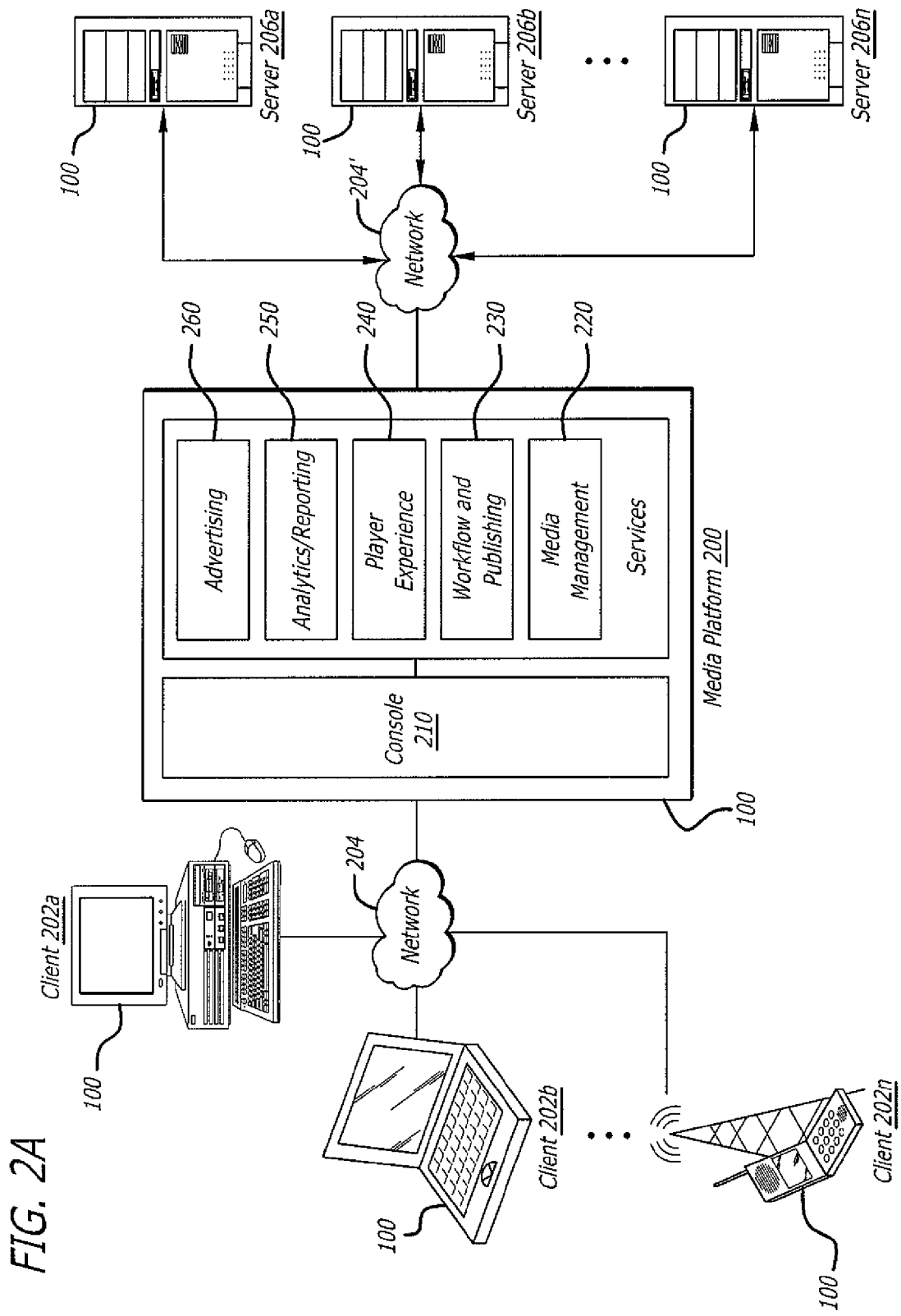
FIG. 2A is a block diagram of an embodiment of a media delivery platform.

Referring now to FIG. 2A, an embodiment of an environment and architecture of a media delivery platform, or media platform, is depicted. In brief overview, the media platform 200 is in communication with a network 204 to deliver media, such as video, to one or more network connected devices 100, such as clients 202A-202N (also generally referred herein as client(s) 202). The media platform 200 may reside, operate or execute on one or more computing devices 100, such as servers 206A-206N (also generally referred herein as server(s) 206). The media platform 200 may also communicate with a second network 204', such as to a server 206 of a content and/or advertising service, provider or application. The media platform 200 may obtain from the servers 206A-206N media assets and/or advertisements for delivery to the clients 202. The media platform 200 may include one or more of the following services for creating and managing delivery of video media over a network 204 to one or more clients: 1) media management 220, 2) workflow and publishing 230, 3) player experience 240, 4) analytics and reporting 250, and 5) advertising 260. The media platform 200 provides a user interface 210, referred to as a console, for accessing the functionality, operations or logic provided by these services.

The media management service 220 of the media platform 200 provides functionality, operations and/or logic to upload and manage media files with associated metadata. The media management service 220 also controls how media is accessed and consumed by applying business rules. The media management service 200 may provide services for automated video ingestion and multi-format transcoding of media. Also, the media management service 200 may provide functionality to enrich or add additional data to the metadata associated with a video. The workflow and publishing services 230 provides an application via the console 210 to allow a user to select and customize media players, search and select content, build play lists of media and content, and/or publish players to websites and network connected devices. The player experience services 240 provides functionality to enable a user to create a media player based on player template and/or to customize or create a custom player using a player development toolkit.

The advertising services 260 of the media platform 200 provides functionality for the delivery of advertisement, such as Internet based and video ads, in conjunction with delivery of video media to network connected devices 100. In one embodiment, the advertising services 260 includes an ad server platform, discussed in further detail below, to create, manage and use ad insertion rules to control and/or optimize the timing and format of delivery of ads during playback of video media. The advertising services 260 may integrate or communicate with content and advertisement providers, applications or systems, such as those provided by Lightningcast, Inc. of Washington, D.C., which is owned by AOL, LLC of Dulles, Va., or by DoubleClick, Inc. of New York, N.Y. The analytics and reporting services 260 provides alerts, reports and/or dashboards to provide information on performance and operation of delivery of video media and advertisements via the media platform 200. In one embodiment, the ad server platform provides usage reports on the delivery of ads via ad insertion rules.

In some embodiments, the media platform 200 includes the Maven Internet TV Platform, or any portion thereof, manufactured or otherwise provided by Maven Networks, Inc. of Cambridge, Mass. In other embodiments, the media platform 200 includes any of the services, functionality, and/or software, or portions thereof manufactured or otherwise provided by Brightcove, Inc. of Cambridge, Mass. In some embodiments, the media platform 200, or portions thereof is provided, as a Software As A Service (SAAS) model or under an Application Service Provider model. In other embodiments, the media platform 200, or portions thereof, may be provided embodied as an appliance. The media platform 200 may include software, hardware, or any combination thereof. Any of the services of the media platform 200 may comprise an application, program, library, script, service, process, task or any other type and/or form of executable instructions. These services may be implemented as any type and form of web services, via Extensible Markup Language (XML) or any other type and form of programming or scripting language, methodology or architecture.

The console 210 includes any type and form of graphical user interface for providing, displaying or otherwise accessing the functionality, logic or operations provided by the services of the media platform 200. The console 210 may include an application, program, library, script, service, process, task or any other type and/or form of executable instructions. In some embodiments, the console 210 is a browser-based interface. In one embodiment, the console 210 includes any type and form of Rich Internet Application. In other embodiments, the console 210 provides content, such as web page files, e.g., AJAX, HTML file, Dynamic HTML (DHTML), Flash within HTML, ActiveX or JavaScript to display via a user interface.

Although FIG. 2A shows a network 204 and a network 204' (also generally referred herein as network 204) between the clients 202 and the servers 206, the clients 102 and the servers 106 may be on the same network 204. The networks 204 and 204' can be the same type of network or different types of networks. The network 204 and/or the network 204' can be a local-area network (LAN), such as a company Intranet, a metropolitan area network (MAN), or a wide area network (WAN), such as the Internet or the World Wide Web. In one embodiment, network 204' may be a private network and network 204 may be a public network. In some embodiments, network 204 may be a private network and network 204' a public network. In another embodiment, networks 204 and 204' may both be private networks. In some embodiments, a client 202 may be located at a remote location communicating via a WAN connection over the network 204 to the servers 206 located at a corporate data center.

The network 204 and/or 204' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 204 may comprise a wireless link, such as an infrared channel or satellite band. The topology of the network 204 and/or 204' may be a bus, star, or ring network topology. The network 204 and/or 204' and network topology may be of any such network or network topology as known to those ordinarily skilled in the art capable of supporting the operations described herein.

Figure 2B:
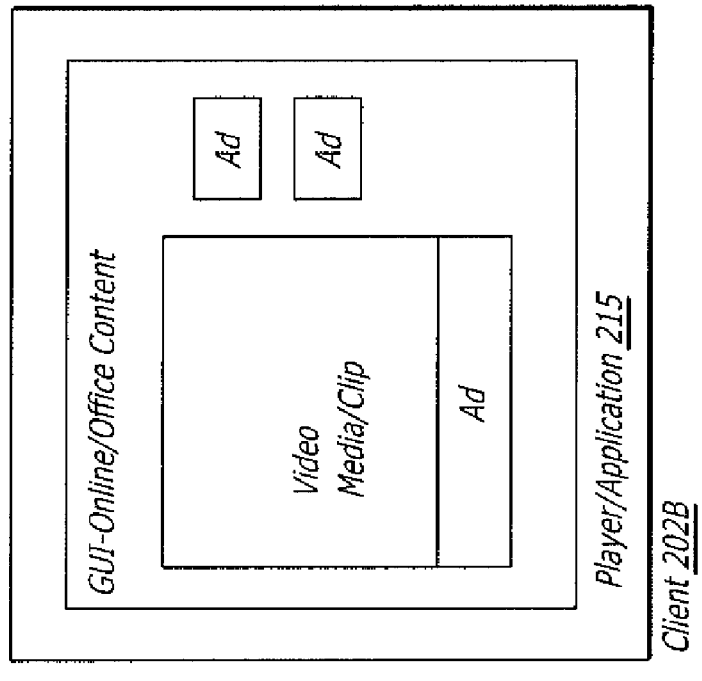
FIG. 2B is a block diagram of an embodiment of client environment for practicing an embodiment of the media delivery platform.
Figure 2B:
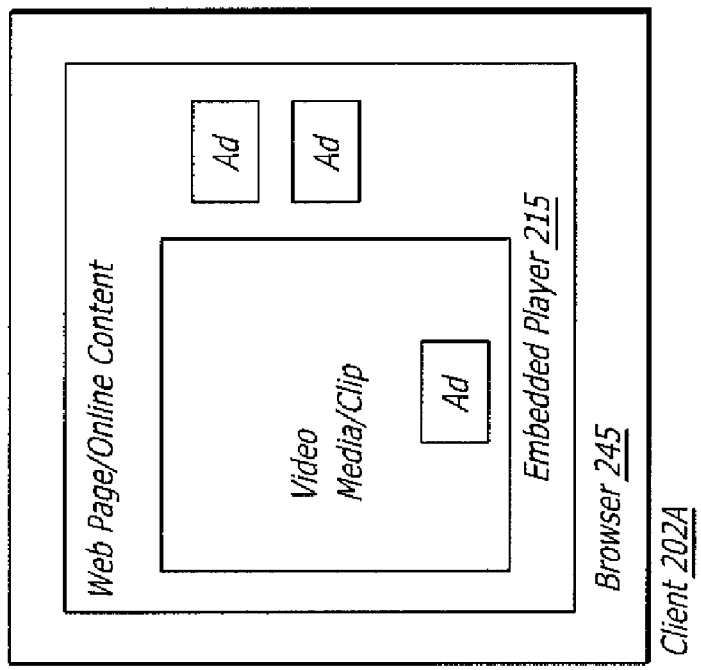

The media platform 200 may be used to deliver video media and/or advertisement to a client via a media player. Referring now to FIG. 2B, embodiments of a client 202 for receiving delivery of video content and/or ads are depicted. In brief overview, a client 202A may include a browser 245 for connecting to, communicating with and receiving content via a network 204 from one or more servers 206. The client 202A may connect via the browser 245 to a web site providing a media player 215, such as a media player embedded in online content of a web page. In some embodiments, the client 202A, browser 245 or player 215 may access offline content via memory or storage accessible by client 202A, such as via a cache. In other embodiments, the browser 245 or player 215 provides access to both online and offline content.

The browser 245 comprises any type and/or form of application, program, service, library, process, or set of executable instructions for accessing content via a network, such as the Internet using uniform resource locators. The browser 245 may include any type and form of graphical user interface. The browser 245 may be, for example, a Microsoft® Internet Explorer browser and/or Netscape™ browser, or a FireFox browser.

In another embodiment, a client 202B may include a media player 215 or application for playing media, such as video, and/or for displaying any type and form of graphical user interfaces. In one embodiment, the player 215 or application provides access to or plays downloaded or offline content. In some embodiment, the player 215 accesses content or receives delivery of content via a network 204. In one embodiment, the player 215 provides access to both online and offline content.

The media player 215 may include any type and/or form of software, hardware, or combination of software and hardware for experiencing, running, or otherwise playing a media in any form, such as various types and forms of information and data, electronic, digital or otherwise, for conveying information via text, audio, graphics, animation, video and/or interactivity. In some cases, multimedia may also refer to the use of a plurality of media, such as video, audio and data. Additionally, the media to be played by the media player 215 may be in any form or unit of information, such as a file, data structure or object in memory, data or information stored on physical media of a storage device 128 or I/O device 130 of a computing device 100, or data signals transmitted or propagated via a network, e.g., streaming media. Furthermore, the type and/or format of the media may include a container format such as 3gp, AVI, ASF, Matroska, MOV, MP4, NUT, Ogg, RealMedia, a video codec such as 3ivx, Cinepak, DivX, DV, H.263, H.264/MPEG-4 AVC, HuffYUV, Indeo, MJPEG, MPEG-1, MPEG-2, MPEG-4, RealVideo, Sorenson, Theora, WMV, XviD, and/or audio codecs, such as AAC, AC3, ALAC, AMR, FLAC, MP3, RealAudio, Shorten, Speex, Vorbis, and WMA. In these embodiments, the media player 215 may read and process a media of any type and/or format.

In some embodiments, the media player 215 comprises an application, program, library, script, service, process, task or any other type and/or form of executable instructions. In one embodiment, the media player 215 comprises one of the following: the Windows Media Player manufactured by the Microsoft Corporation of Redmond, Wash., iTunes or QuickTime manufactured by Apple Computer, Inc. of Cupertino, Calif., RealPlayer® manufactured by RealNetworks, Inc. of Seattle, Wash., or Macromedia Flash Player manufactured by Adobe Systems Incorporated of San Jose, Calif. In other embodiments, the media player 215 includes any custom, proprietary, open source, shareware, freeware or any other type of application, program or executable instructions capable of playing media, either for a specific purpose or otherwise for an general or desired purposes. Additionally, the media player 215 may include any type and/or form of user interface, graphical or otherwise, for accessing, controlling, managing, or otherwise providing input and/or receiving output regarding media and/or the playing of media.

Figure 2C:
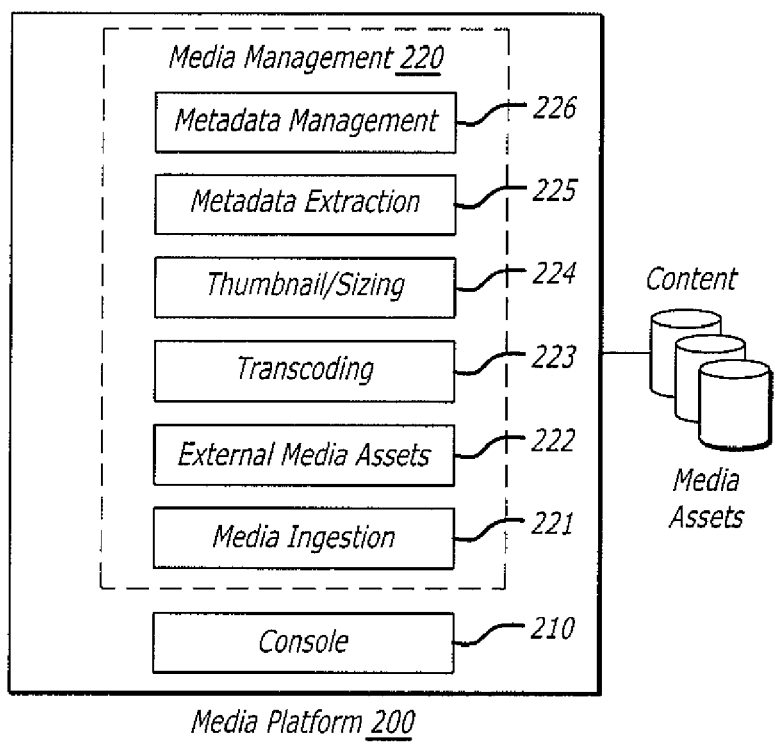
FIG. 2C is a block diagram of an embodiment of media management services of the media delivery platform.

Referring now to FIG. 2C, an embodiment of the media management services 220 of the media platform 200 is depicted. In brief overview, the media management service 220 includes the following functionality, services, operations, logic or components: 1) media ingestion 221, 2) support for external media assets 222, 3) video transcoding 223, 4) thumbnail generation and video sizing services 224, 5) metadata extraction 225, and 6) metadata management 226.

The media ingestion services or component 221 provides an interface and mechanism for uploading content via any type and form of protocol. In one embodiment, the media ingestion service 221 provides a browser-based media upload interface for uploading media via HyperText Transfer Protocol (HTTP) or File Transfer Protocol (FTP). In some embodiments, the media ingestion service 221 provides for bulk upload of multiple media files, assets or content from one or more sources, such as servers 206. For example, the media ingestion service 221 may use any type and form of bulk or batch FTP transfers to upload multiple media files. In other embodiments, the media ingestion service 221 interfaces, integrates or communicated with an external system or application to obtain or transfer media. For example, the media ingestion service 221 may interface with a content management system (CMS) or a digital asset management (DAM) system. The media ingestion service 221 may store any ingested media into any type and form of storage or memory of the one or more computing devices used by the media platform 200.

The external media asset services component 222 may provide any type and form of interface and mechanism for identifying, managing, maintaining or otherwise supporting the use of media assets and files stored in storage external to the media platform 200, such as on a server 106. The external media asset services 222 may use any type and form of database or tracking system to identify and track externally stored media.

The transcoding service 223 includes any type and form of executable instructions, logic or function for converting media content from one format or codec to another format or codec. In some embodiments, the transcoding service 223 automatically converts ingested media to a predetermined format or codec for use by the media platform 200. In one embodiment, the process of transcoding is the digital-to-digital conversion of media from one format or codec to another format or codec. In another embodiment, the transcoding service 223 changes a media from one bitrate to another bitrate, for example decreasing the bitrate of a media. In some embodiment, the transcoding service 223 coverts from a lossless format to a lossy format. In other embodiments, the transcoding service 223 decodes a first format into an intermediate format and then encodes the intermediate format into a second format. The transcoding service 223 may support the encoding, decoding, conversion or translation of any media format and/or bitrate, including but not limited to Flash Video format (FLV) and Windows Media Video format (WMV).

The thumbnail and video sizing service 224 includes any type and form of interface and mechanism for generating a different sized version of an ingested or externally controlled media file. In one embodiment, the service 224 automatically generates a thumbnail media file for any received or ingested media file. In other embodiments, the service 224 automatically generates one or more different versions of an ingested media file, each having a different size. In another embodiment, the service 224 received a media file and modifies the media file to have a different size. In some embodiment, the service 224 modifies, converts or generates a media file providing a video of a different resolution.

The metadata extraction service 225 provides an interface and mechanism for extracting any information and/or metadata associated with a media file or asset, such as metadata transferred with a video. In some embodiments, the metadata extraction service 225 automatically extracts or otherwise obtains metadata from ingested video files. The metadata may include data identifying runtime, format and/or bitrate information regarding a video. In one embodiment, the service 225 extracts metadata from the video or media file. In other embodiments, the service 225 extracts metadata from a file, data structure or objects associated with the video or media file.

The metadata management service 226 provides logic, function, rules and/or operations to create, edit, modify or otherwise manage any information and/or metadata associated with a media file or asset. In one embodiment, the metadata management service 226 provides an interface to extend metadata fields associated with media, such as any of the following fields: title, short description, long description, genre classification, keywords, thumbnail, available date, expiration data and geography restrictions. In another embodiment, the metadata management service 226 provides a user interface for a user to create, edit or modify fields and values of the fields of the metadata associated with the media.

Figure 2D:
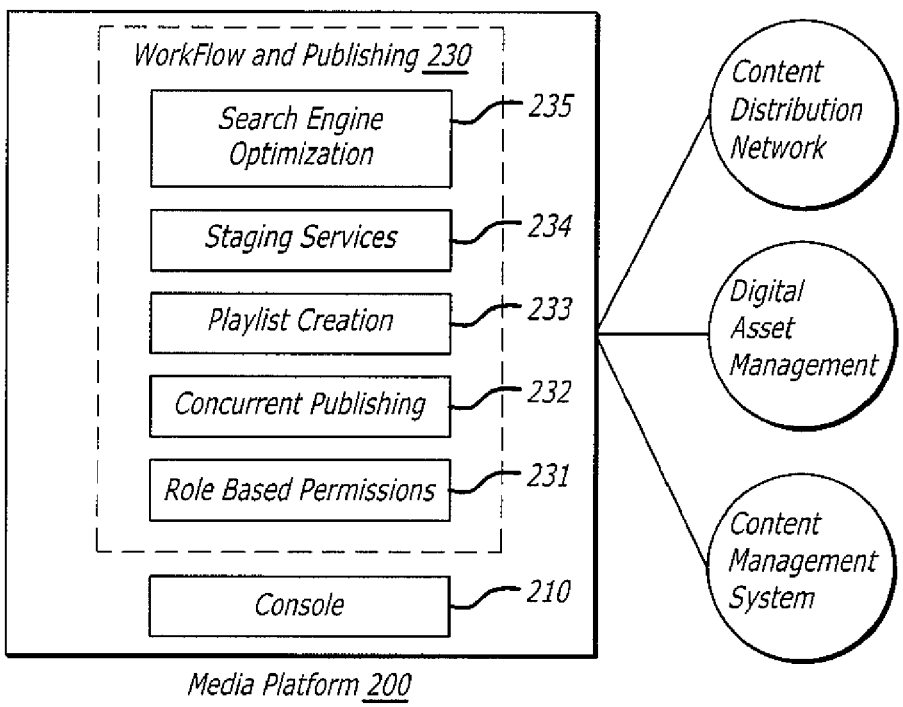
FIG. 2D is a block diagram of an embodiment of workflow and publishing services of the media delivery platform.

Referring now to FIG. 2D, an embodiment of the workflow and publishing services 230 of the media platform 200 is depicted. In brief overview, the workflow and publishing services 230 includes the following functionality, services, operations, logic or components: 1) role based permissions 231, 2) concurrent publishing 232, 3) playlist creation 233, 4) staging services 234, and 5) search engine optimization 235.

The role based permission functionality 231 provides an interface and mechanism to configure roles and permission for any user of the media platform 200. The role based permission 231 may provide any type and form of user interface to create, edit and modify roles and permission for users, or groups or category of users. The role based permissions 231 can include rules controlling which affiliates or business partners can access content and what type of access the affiliate or business partner has. The role based permissions 231 can include rules on what content an end user may have access to and the type of access. For example, a role based permission rule may control where an end user or consumer can view content geographically or by location.

The publishing features 232 of the publishing service 230 provides workflow functionality, interfaces and logic for video channels to be created, edit, managed and published. In some embodiments, the publishing features provide for multiple video channels to be concurrently or simultaneously created, edit, managed, and published. In some embodiments, this enables multiple users to work on different editions of the same video channel in parallel.

The playlist creation service 233 provides an interface and mechanism for a user to identify, select, organize and/or arrange a list of video media, such as by video titles, to be played by a media player 215. In some embodiments, the playlist creation service 233 provides for the creation of dynamic playlists that update content automatically, based on one or more of the following: video title, description, genre, keywords, dates and owner-based rules. The staging services portion 234 of the service 230 provides for the provisioning of a staging environment to test any configuration or portion of the media platform. In some embodiment, the staging service 234 provides a secure environment to review and test a media player and/or a published video channel.

The search engine optimization service 235 includes any type and form of logic, functions, or operations to optimize the search of video media provided via the media platform 200 in one or more target search engines. The search engine optimization service 235 may generate an Extensible Markup Language sitemap for any content or video channel created, published or managed via the media platform 200. In some cases, the search engine optimization service generates a Media RSS or MRSS data for syndicating multimedia files in RSS feeds. In one embodiment, the Media RSS content generated by the search engine optimization service 235 is used to feed media files into Yahoo! Video Search manufactured by Yahoo, Inc. of Sunnyvale, Calif., which is a feature of Yahoo! Search that allows to search for video files. In some embodiments, the search engine optimization service 235 converts dynamic content to be published via a media player into one or more snapshots of static content and feeds these snapshots of information to a search engine. As new content for a player becomes available, the search engine optimization service 235 may automatically convert the new content into static content and feed the converted content to the search engine.

Figure 2E:
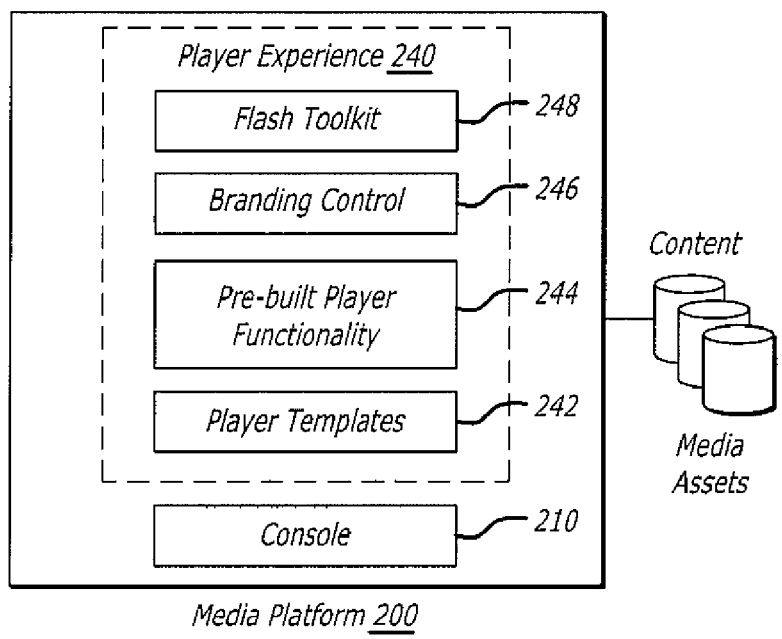
FIG. 2E is a block diagram of an embodiment of player experience services of the media delivery platform.

Referring now to FIG. 2E, an embodiment of the player experience services 240 of the media platform 200 is depicted. In brief overview, the player experience services 240 includes the following functionality, services, operations, logic or components: 1) player templates 242, 2) pre-built player functionality 244, 3) branding control 246, and 4) a flash toolkit 248.

The player experience service 240 includes one or more player templates 242. In one embodiment, a player template 242 is a pre-built media player 215 that may be further customized by a user or otherwise used as provided. In other embodiments, a player template 242 includes pre-built content to be used by or access via a media player 215. This pre-built content may be further customized by a user or otherwise used as provided. The player template 242 may include any type and form of player content or use any type of script, programming or media player authoring language or tool, such as Flash and/or Dynamic HyperText Markup Language (DHTML) content. In some embodiments, the console 210 provides a graphical user interface to create, edit, modify, manage or otherwise provide a player template 242. In other embodiments, the console 210 provides a graphical user interface to create, edit, modify, manage or otherwise provide a media player 215 using a pre-built player template 242.

The player experience services 240 may also include any type and form of pre-built player functionality 244, such as for example any of the following player features: 1) category navigation, 2) playback control, 3) volume control, 4) expanded video windows/window controls, 5) send-to-a-friend, 6) embed video and player links, 7) community site embedding, 8) RSS subscription, 9) search, 10) links, 11) auto-play and 12) add-to-favorites. Via scripting, programming or any other type and form of media player authoring tool or language, additional desired features for a media player may be added to a pre-built template 242 or to the pre-built player functionality 244. For example, a user may author Flash or Dynamic HTML content that be added, selected and used as part of the player experience services 240.

The branding control component 246 of the player experience services 240 provides branding control of a media player 215 via user interface functionality and configuration of the console 210. The branding control 246 provides an interface and mechanisms to configure the graphical representation and presentation of a media player 215. In some embodiments, the branding control 246 provides a What-You-See-Is-What-You-Get (WYSIWYG) environment for designing and configuring the graphical look and feel of a media player 215. With the branding control 246 configuration, a user may design, configure or provide a media player 215 with a graphical representation that matches, corresponds or identifies with a company, company logo, or enterprise branding.

The player experience services 240 also includes, in some embodiments, a Flash toolkit 248 to allow a user to create, edit, manage or customize one or more media players 215 either from a pre-built template 242 or otherwise. The Flash toolkit 248 may provide a development environment for a user to design, create, edit or test any type and form of Flash or DHTML content. The toolkit 248 may include an application programming interface to access any of the functionality of any of the services of the media platform 200. Although the toolkit 248 is generally referred to as using the Flash media authoring language, the toolkit 248 may be designed and constructed for any type and form of media authoring language and may provide a development for a user create any media player and associated content with a media authoring language.

Figure 2F:
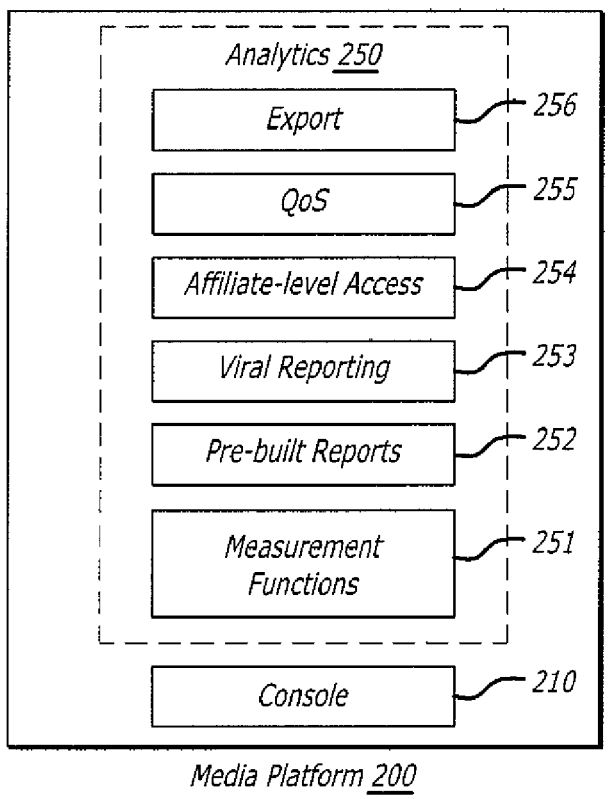
FIG. 2F is a block diagram of an embodiment of analytics services of the media delivery platform.

Referring now to FIG. 2F, an embodiment of the analytics services 250 of the media platform 200 is depicted. In brief overview, the analytics services 250 includes the following functionality, services, operations, logic or components: 1) measurement functions 251, 2) pre-built reports 252, 3) viral reporting 253, 4) affiliate-level access 254, 5) Quality of Service 255 and 6) exporting 256.

The measurement functions 251 of the analytics services 250 include any type and form of function, logic or operations to detect, measure, track and/or collect data associated with any action, activity or transaction occurring via the media platform, or any portion thereof. In some embodiments, the measurement functions 251 detect and tracks actions of a user via the media player 215, such as player control actions or navigation patterns. In other embodiments, the measurement functions 251 detects and tracks actions of a user via a website providing the video media or media player 215. The measurement functions 251 may detect, measure, and track any activity of a media player, a user or any operation of the media platform 200 on a predetermined frequency, such as every hour or on a daily basis. For example, the measurement functions 251 may measure the number of playbacks and duration of the playback for any one or more video clips. In another example, the measurement functions 251 may measure the number of views, clicks, user actions, or revenue generated in association with any one or more videos, such as to identify which video, content or video channel is generating the most views, clicks, user actions, or associated revenue.

The analytics services 250 may provide one or more pre-built reports 252. The pre-built reports 252 comprise any type and form of reporting user interface, such as a dashboard, to visually present information related to the measurement, performance, and/or operation of the media platform 200 or the delivery of content and/or advertisement via the media platform 200. In some embodiments, a pre-built report 252 provides information related to the measurement, performance and/or operation of a video clip, group of video clips or a video channel.

The analytics services 250 may also include via the viral reporting functionality 253 the measurement and tracking of information related to the use and playing of video content and media players distributed to a plurality of users. For example, the viral reporting functionality 253 and/or a measurement function 251 may track the number, location and users receiving or using video content and media players distributed via the media platform 200, such as via a published video channel. For example, users or consumers of a published video channel may share and embed published content to other web-sites, blogs and community sites. The viral reporting functionality 253 identifies and provides a report on the number, location and identity of these sites having the content. From the viral reporting functionality 253, a report may be provided to identify the viral sites having the most content, traffic or generating the most revenue.

The analytics services 250 may provide functionality 254 to control the access of affiliates to any of the reports, dashboard, and operational or performance measurement information provided by the analytics services. Via the affiliate-level access control 254, a publisher of content or content owner may design, configure and control the reporting information any affiliate may access via the media platform 200. In some embodiments, the affiliate-level access control 254 may be used to provide different levels of access to different affiliates. In other embodiments, the affiliate-level access control 254 may be used to provide different reports, such as different pre-built reports 252, to each affiliate.

The analytics services 250 may also include a Quality of Service (QoS) measurement, diagnostic and reporting functionality 255. In some embodiments, the QoS functionality detects, measures, diagnoses and provides analytical reports on the availability, operation and/or performance of network-level service, application-level services, and the performance with respect to the user's experience with consuming or viewing content via the media platform 200. In one embodiment, the QoS 255 includes any portion of the Keynote Stream Perspective™ product manufactured by Keynote Systems, Inc. of San Mateo, Calif.

The analytics service 250 may also include exporting functionality 256 to convert, translate, encode or otherwise provide data from any data, report or information accessible by or via the analytics service 250 to a predetermined format, such as Extensible Markup Language (XML), Microsoft Excel format (XLS), or Abode's Portable Document Format (PDF).

Referring now to FIG. 2G, an embodiment of the advertising services 260 of the media platform 200 is depicted. The advertising service 260 provides functionality and support to monetize media assets via use of advertisement, such as online, video, or Internet based advertisement. In brief overview, the advertising services 260 includes the following functionality, services, operations, logic or components: 1) ad network integration 261, 2) advertising formats 262, 3) affiliate ad network support 263, and an ad server platform 265.

The advertising services 260 of the media platform includes an ad network integration component 261 to interface, communicate and coordinate with advertisement network providers 269. An ad network 269 comprises any type and form of aggregator or broker of advertising inventory for many web sites. In some embodiments, an ad network 269 is considered a sales representative for the web sites within a network. In one embodiment, the ad network 269 includes any of the advertisement services and products provided by Lightingcast. In another embodiment, the ad network 269 includes any of the advertisement services and products provided by DoubleClick. The ad network integration components 261 may include any type and form of application programming interface, programming language, and tools and use any type and form of one or more communication, networking or application layer protocols to interface or communicate with an ad network 269.

In some embodiments, the ad network integration 261 provides interfaces and communicates with multiple ad networks, concurrently, simultaneously, subsequently or otherwise. The advertising services 260 includes support for affiliate ad networks by providing functionality 263 to allow the use of multiple ad networks 261 from a single account. In this manner and in some embodiments, each affiliate or business partner can use an affiliate determined or specified ad network 261 to manage and sell advertisement inventory.

The advertising services 260 provide an interface and configuration mechanism to design, configure, or otherwise create and use any type and form of format for advertising. An ad may comprise any visual or graphical information, representation or display. An ad may include video, audio, data, text, graphics, pictures, HTML, DHTML, Flash or web page content, applets, programming language, scripts, uniform resource locators, or any combination thereof. The ad format may include any type and form of video effects or overlays such as a bug style ad format or video curtain type of ad format. As will be described in further detail below, an ad format may specify the type, location, and duration of an ad. For example, an ad format may specify the ad as a pre or post-roll video. In some embodiments, the advertising formats 262 includes any of the formats supported, specified or identified by the Interactive Advertising Bureau (IAB) and/or any of the IAN standards or guidelines.

Referring now to FIG. 3A, an embodiment of the syndication services 300 of the media platform 200 is depicted. The syndication services 300 allow a publisher or distributor of video media to control the reach of distribution and media consumption of video assets. Syndication services 300 provide affiliate account set up and allow the video asset owner to control which services of the media platform 200 the affiliate has access to, such as any of the media management, workflow and publishing, player experience, analytics, advertising and community services described herein. For example, a video asset owner can configure affiliate accounts in the media platform 200 to determine which affiliates can access the assets and specify the geographical regions where the video may be viewed. Further to the example, the video asset owner may control if the video content is played by a provided player or in the affiliate's media player.

In brief overview, the syndication services 300 includes the following functionality, services, operations, logic or components: 1) affiliate management 305, 2) video ingestion workflow 310, 3) media control 315, 4) national/local advertising services 320, and 5) media, playlist and player syndication services 325.

The affiliate management 305 of the syndication services 300 includes any type and form of function, logic or operations and user interface to provide setup, management and configuration of one or more affiliate accounts. Via the console 210, a user may setup or otherwise establish an account, which may be referred to as account registration. The data or information of the account may identify one or more entities, persons, contact information, type of account, payment and payment plans, and account and activity history. A user may be able to configure the account and add, modify or delete one or more account settings. In some cases, account settings may be local to one affiliate. In other cases, an account setting may be global to multiple affiliates. An account setting may control or establish which ad network or ad insertion frequency to use. An account setting may also control or establish, ad inventory allocation, and provide ad publishing restrictions. The account management 305 includes self-service registration. With self-service registration, a user may via the console 210 sign up for an affiliate account. The content owner may qualify and approve the affiliate. Account management 305 may also include automated email notices with regards to new account activation, account deactivation, and account setting changes. The automated email notifications may streamline the affiliate communication process.

The account management service 305 supports multiple business models and allows a user to configure an affiliate account for distributing video content provided by a content owner or distributor, content supplied by the affiliate or both. The account management 305 provides a user interface and configuration to establish and configure a role for an affiliate. A role identifies an affiliate's access right to a portion, or all, of the video content and which features and services of the media platform the affiliate may access. In one case, a role may be configured for an affiliate such that the affiliate can only use a published player of the video content distributor. A role may be configured with respect to feature and services of the media platform related to uploading and managing content, creating and managing players, creating and managing templates, creating and publishing editions of content, and creating and managing users. For example and as illustrated in FIG. 3A, a first affiliate may only be given publish rights to a portion of the video content while a second affiliate may have access rights to publish as well as upload video content.

The video ingestion workflow 310 of the syndication services 300 includes any type or form of function, logic or operations and user interface to setup, manage and control ingestion of multiple video assets, such as a large library of video desired to be used for online programming or in a video channel published via the media platform. Via the console 210, the video ingestion workflow service 310 provides automated uploads of a plurality of video media via any type and form of protocol, such as HTTP or bulk file FTP uploads. The video ingestion workflow service 310 uploads the plurality of video media to one or more storage locations, such as a central storage location. From these storage locations, the stored content may be available to all of the affiliated under the access control provided by the media platform 200. The video ingestion workflow 310 may provide a user interface and functionality for approval control of which uploaded video assets are to be stored to which location or made available for access control to an affiliate. As such, in some embodiments, large library of assets may be ingested once to a central location and made available to an affiliate in a controlled and secure manner, such as via the media control 315 discussed below.

The media control 315 of the syndication services 300 includes any type and form of function, logic or operations and user interface to setup, manage and control access to video assets via one or more business policies or rules. The business rules may be assigned to, associated or used with any role configured for an affiliate. A business rule may comprise any type and form of configuration, language, script, or logic. The business rule may identify the content to be controlled in any manner, such as by name, type, description or any metadata associated with the content. The business rule may provide access rights to content by any type of granularity, such as by the action an affiliate may take with respect to the video content. For example, the business rule may assign any one or more of the following access rights: read/view, write/edit upload, edit, publish, or distribute. The business rule may identify what type of player the affiliate may use for the content, such as a distributor designated player or a player controlled by the affiliate. The business rule may be configured to control what content the affiliate may use such as distributor provided content or affiliate content in conjunction with the distributor's content. The business rule may also identify and assign which services, or portions thereof, of the media platform the affiliate may use or access. Business rules may also be used to control and manage affiliates with respect to advertising, playlists and player syndication as discussed below.

The syndication services 300 also include functionality 320 to control and manage the type of advertising available to one or more affiliates. Via the console 210, an affiliate may be configured to use the ad inventory provided by the distributor and/or to control of a portion of the ad inventory. The national and local advertising service 320 provides configuration, such as via roles, business rules or otherwise, to designate one or more ad networks to be used by an affiliate. In one case, the affiliate may only use the ad networks designated by the distributor or video asset owner. In another case, the affiliate may use ad networks designated by the affiliate. In still another case, the affiliate may use an ad network designated by the distributor for a portion of the ads while using an ad network designated by the affiliate for another portion of the ads. In some embodiments, the affiliate may select an ad network from a predetermined list of ad networks. In other embodiments, the affiliate may use any one of the ad networks pre-designated by the distributor for the affiliate The syndication services 300 may also provide services for media, playlist and player syndication 325. The media, playlist and player syndication 325 includes any function, operations, logic and user interface for configuring, designating, publishing via roles, business rules or otherwise the media, media playlist and media player used by an affiliate. In some embodiments, an affiliate may be configured to use a distributor provided media player 215 for accessing or playing published content. In other embodiments, an affiliate may be configured to use an affiliate provided or designated player, or otherwise a player determined by the affiliate. The media, playlist and player syndication 325 may configure one or more media files for syndication via an affiliate. As such, the content owner or distributor may control syndication on a media file basis. The media, playlist and player syndication 325 may also configure one or more playlists for use by affiliate in playing the media. In some embodiments, the playlists may be dynamically determined via one or more business rules, such as a playlist which depends on information about the affiliate or the site consuming the content.

Figure 3B:
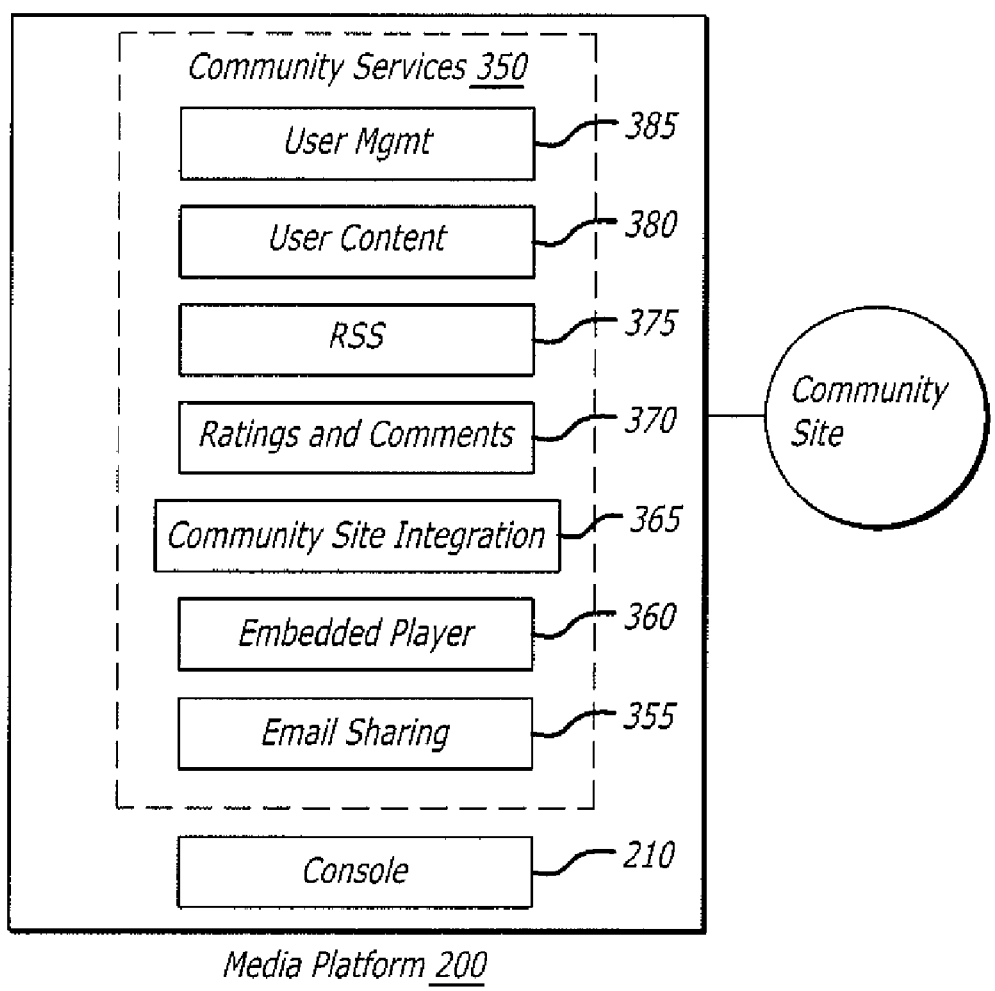
FIG. 3B is a block diagram of an embodiment of community services provided by the media delivery platform.

Referring now to FIG. 3B, an embodiment of the community services 300 of the media platform 200 is depicted. In brief overview, the community services 200 provides a range of audience building features. The community services includes the following functionality, services, operations, logic or components: 1) email sharing 355, 2) embedded player 360, 3) community site integration 365, 4) ratings and comments 370, 5) RSS feeds 375, 6) user content 380 and 7) user management 385.

With the email sharing functionality 355 of the community services 300, a user can share a video with friends directly from the medial player 215. In some embodiments, the media player 215 comprises executable instructions to generate an email that includes a description of the video and a link or URL to launch the video. In other embodiments, the media player launches an email program, such as Microsoft Outlook, on the computing device of the user. In some embodiments, the video is embedded in the body of the email. The user may specify multiple email addresses to send the video description or link to the video. The user may also specify a comment or add text to the body of email. In some cases, the user may specify a subject of the email. In other cases, a title or description of the video may be used as the subject matter of the email.

Figure 3D:
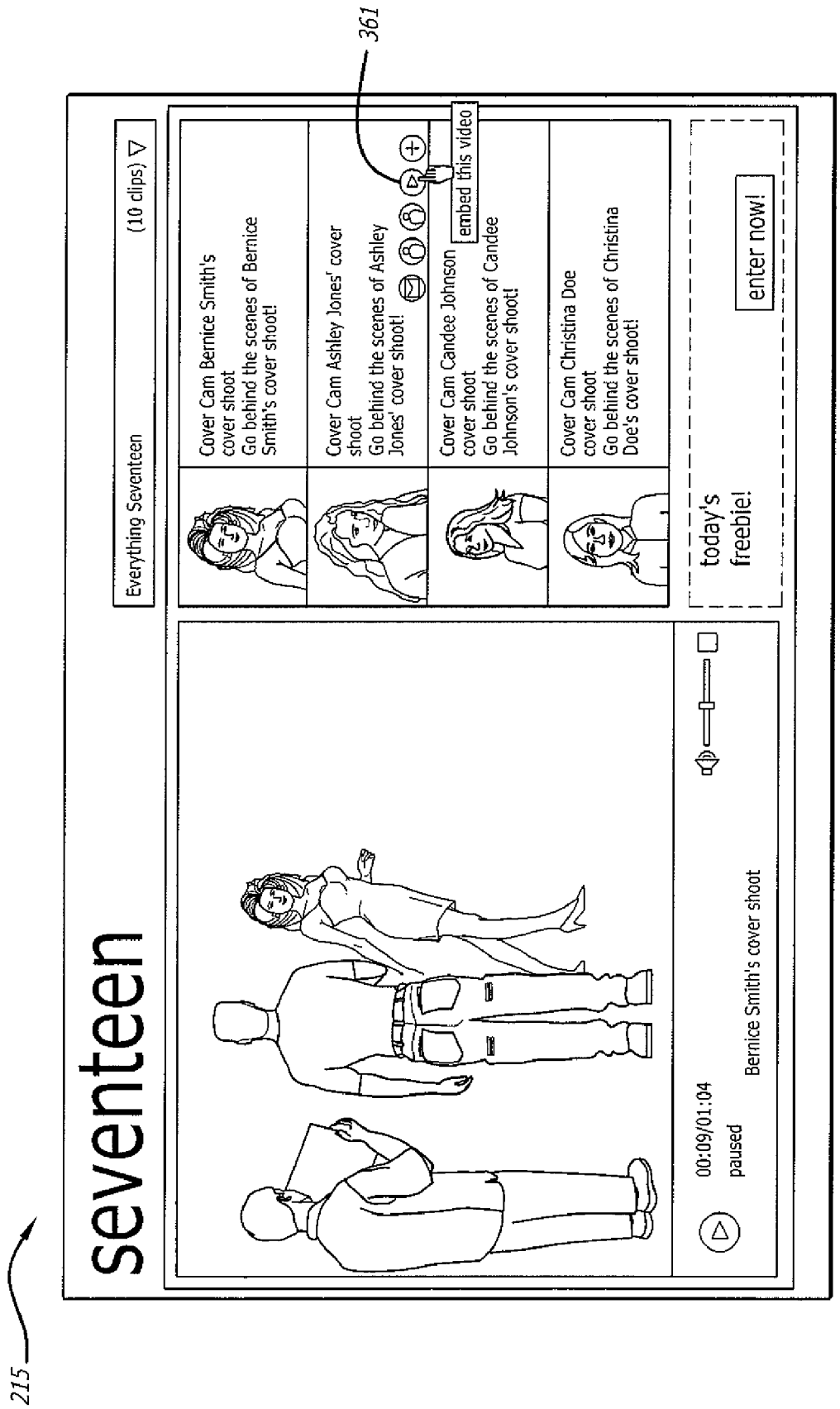
Figure 3E:
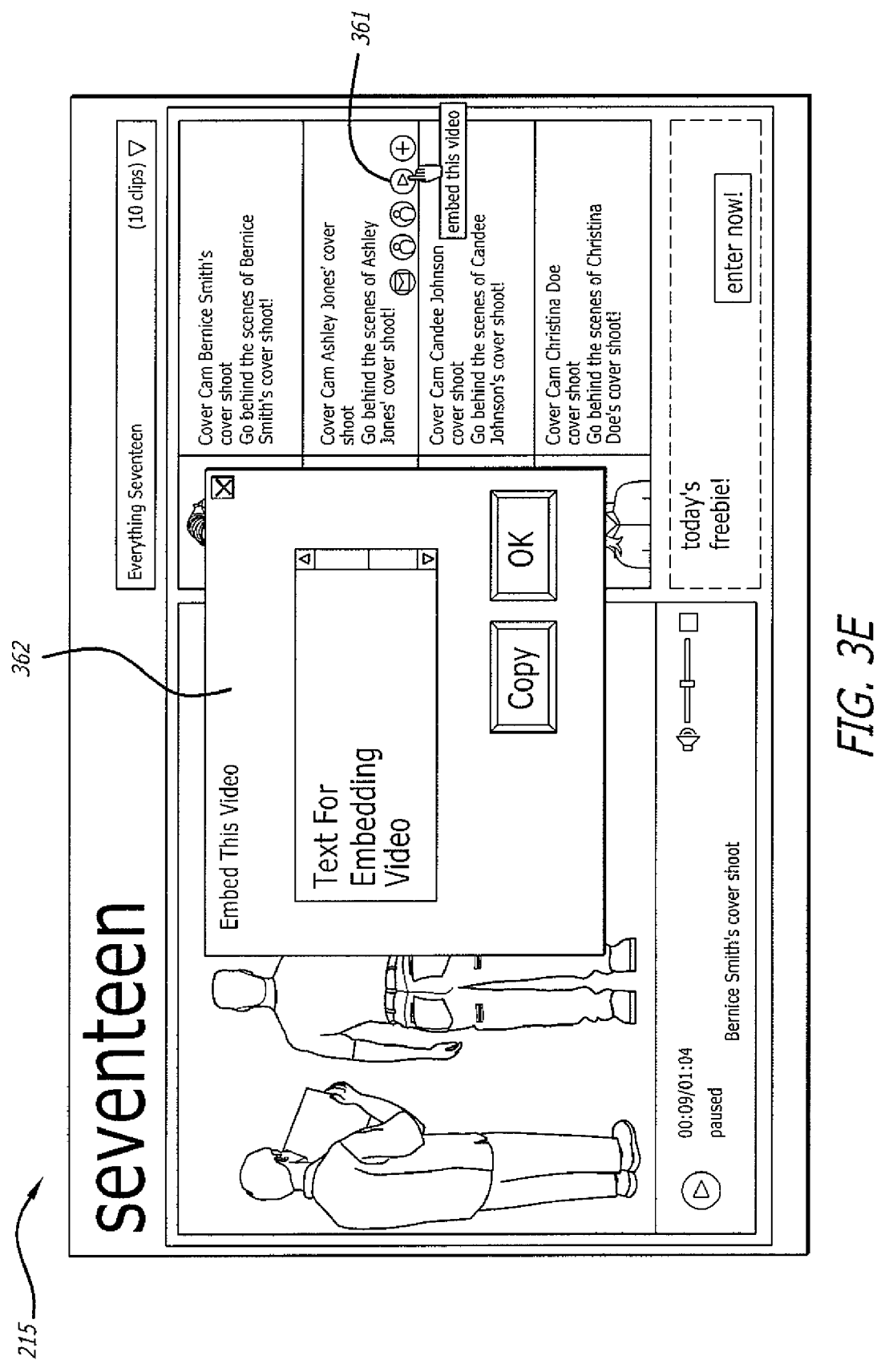

In some embodiments, the community services 350 includes the functionality and capability, referred to as embedded player 360, to embed a player 215 or link thereto into another website, blog, community site or any other type and form of network accessed content. For example, and referring now to FIGS. 3D and 3E, a user interface element may be associated with a video to allow a user to execute the feature of embedding player into other content. As depicted in FIG. 3D, in some embodiments, a selectable user interface element 361, such as a button, may be selected by a user to execute the embedded player functionality 360. In response to the selection and as depicted in FIG. 3E, a second user interface element 362 may be displayed to provide the script, instructions, code or text to embed the player into other content. The user interface 362 providing the embedded player text may include other user interface elements to select, copy and/or paste the embedded player text from the user interface 362 to another program, application, tool, web page or content. In some embodiments, the embedded player 260 may include HTML content with one or more URLs to the video content. Access to the URLs via any sites having the embedded player 360 and videos played by the embedded player 260 may be tracked and usage measured by the media platform 200.

Referring back to FIG. 3B, the community services 350 may also include integration 365 to one or more other community or social networking web sites, such as Digg at www-.digg.com, MySpace at www.myspace.com, facebook at facebook.com and delicious at www.del.icio.us.com. Community site integration 365 may include any type and form of interface mechanism or communications with another system, application, server, software, service or web-site. For example, community site integration 365 may be implemented via XML and web services. In another example, the community site integration 365 may upload one or more media files via HTTP or FTP to another site. In some embodiments, community site integration 365 includes one or more user interface elements to allow a user to select another site by name, title, URL or otherwise and post content, or any portion thereof, from a media player 215. In other embodiments, community site integration 365 includes using account information or user credentials from the media platform 200 to access another site via a registered user or account of the site.

Referring now to FIG. 3C, an embodiment of the feature of community site integration 365 is depicted. In brief overview, a media player 215 may display video content, such as a video channel published via the media platform 200. The media player 215 may include a selectable user interface element 366, such as a button, to select a video or content to be published, distributed, uploaded or otherwise included in content of or posted to another site. Upon selection of the community site integration feature, a second user interface element 367 may be displayed to provide the user with a selection of community sites to which to post the video. In some embodiments, the list of community sites available to post the video content may be configured via roles, business rules or otherwise via the media platform 200. In some embodiments, upon selection of the community site to post the video, the media player and/or user interface 367 may open, connect, traverse or otherwise go to the selected site. For example, the media player 215 may launch or otherwise open a web-page to the selected community site, and in some cases, pre-fill any user interface elements or other content of the community site in order to post the video to the site.

Referring back to FIG. 3B, the community services 350 may include user interface elements, logic, functionality or operations to allows users to provide ratings and comments 375 on video content, ads, and/or user generated content via a media player 215 or via the media platform 200. A user may rate any type and form of content using any type and form of rating system. The rating may be associated with the content and displayed near or in association with the rated content. The rating system may have any length, order or type of scale, and may be numerical or text based. In some cases, the user may generate or provide a user generated rating scale. The community services 350 may provide playlists based on ratings. The video content may be searched, organized and displayed in any manner according to ratings.

A user may provide any type and form of comments, such as text-based submissions, regarding any content. For example, the media player may include a text based form to allow a user to enter and submit comments. The comments may be associated with the content and displayed near the content. The media player 215 may organize and display comments in an organized fashion such as in a topic list or discussion grouping. The community services 350 may provide playlists based on comments. The video content may be searched, organized and displayed in any manner according to the comments. In some embodiments, the community services 350 provides functionality and user interface elements to monitor comments and approve, reject, recall, remove or release any monitored comments.

The community services 350 may also include one or more RSS feeds or documents 375. The initials "RSS" may be used to refer to the following formats: Really Simple Syndication (RSS 2.0), RDF (Resource Description Framework) Site Summary (RSS 1.0 and RSS 0.90) or Rich Site Summary (RSS 0.91). RSS formats may be specified using XML (Extensible Markup Language). RSS comprises a web feed format used to publish updated content such as video, blog entries, news headlines or podcasts. An RSS document, which is also called a "feed," "web feed," or "channel," may include either a summary of content from an associated web site or the full text, or any portion thereof. The RSS content may be read using software, program or a service called a "feed reader" or an "aggregator." The user subscribes to a feed by providing the feed's link to the reader. The reader checks the user's subscribed feeds regularly for new content and downloads any updates to the content.

A user may subscribe to an RSS feed 375 based on any type and form of category or based on the availability of new content for a player. The media platform 200 may provide multiple RSS feeds or documents for subscription. In some embodiments, the media platform 200, for example, via the community services 350, may automatically generate an RSS document 375 for a video channel, such as during the publication process. The media platform 200 and/or media player 215 may provide user interface elements for a user to select to subscribe to an RSS feed 375.

The community services 350 may also provide user interface elements, functions, logic or operations for a user to contribute or upload content to the media platform 200. For example, the console 210 may provide a user interface or utility for a user to select content from a computing device or storage area to upload or submit to a site provided via the media platform 200. In some embodiments, the user provided content is stored with any content in ingested by the media platform. The media platform 200 may store the user content in a central storage location with other content or video assets. The user content may be managed under the media access control, workflow and publishing services or any other services provided by the media platform for owner or distributor provided content. For example, roles and business rules may be configured to provide control over the user provided content.

The community services 350 may include one or more user management functions 385 providing administrative features for managing a community site. The user management functions 385 include: user registration and account setup, user login process, such as authentication and authorization, user name and password retrieval, user contributed content approval, account suspension, automatically or otherwise. The user management functions 385 may also provide reports on one or more users and their usage and activity at the site.

Ad Server Platform

Figure 4A:
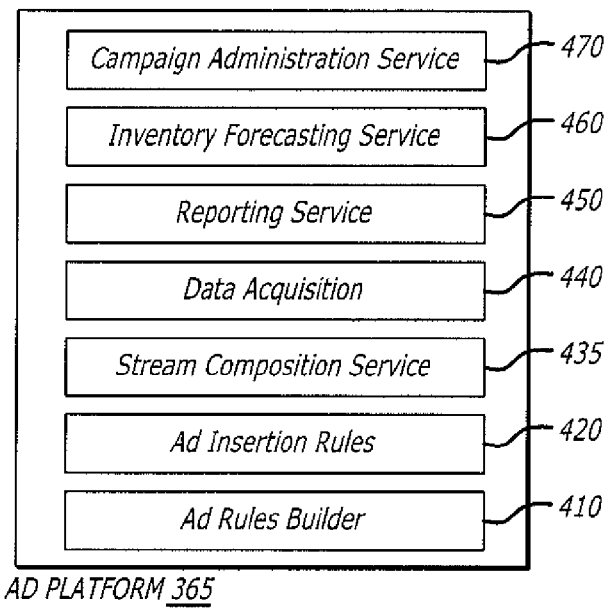
FIG. 4A is a block diagram of an embodiment of an ad server platform.

Referring now to FIG. 4A, an embodiment of an advertisement server platform, also referred to as an ad server platform or ad platform 365 is depicted (the ad platform was introduced as the ad platform 265 in FIG. 2G). The ad platform 365 comprises an environment, system and functionality for delivering broadband on-demand video advertising. The ad platform 365 provides a solution for: 1) composition of ads in video playback by controlling ad insertion frequency and format via ad insertion rules, 2) an inventory management and forecasting tool for on-demand video stream composition environment, and 3) ad campaign management and ad delivery.

In brief overview, the ad platform 365 has an ad insertion rules builder 410 for configuring, specifying or identifying one or more ad insertion rules 420. The ad platform 365 also includes a stream composition service 435 which composes a video stream to include, integrate or insert the display of one or more ads. The stream composition service 435 may use one or more ad insertion rules 410 to control insertion points and format of ads composed into a video stream. The ad platform 365 has a data acquisition service 440 for collecting data related to perform and operation of delivery of video, ads and use of the ad insertion rules 420. A reporting service 450 may provide reports on the performance and operations of the system, such as delivery of ads during video playback via the ad insertion rules, from data collected by the data acquisition service 440. The ad platform 365 may also have an inventory forecasting system 450 to predict or estimate total inventory available for an ad over a time period based on past performance data, such as the data collected by the data acquisition service 440. Additionally, the ad platform 365 may have a campaign administration service 470 to manage one or more ad campaigns.

Any of the ad rules builder 410, ad insertion rules 420, stream composition service 440, reporting service 450, inventory forecasting service 460 and campaign administration service 470 may be separate components or modules, or may be combined in any manner in a single module or multiple modules. Any of the above services, components or modules may comprise any type and form of executable instructions, such as a program, application, process, task, service or library and may be implemented using any type and form of programming language, scripts or applications. For example, in one embodiment, the ad platform 365 or any portion thereof is implemented as web services or using SOAP (Simple Object Access Protocol) and having an XML based interface. In some embodiments, the ad platform 365, or any portion thereof, is deployed or otherwise provided as a hosted solution, otherwise referred to as a Software-As-A-Service (SaaS) or application service provider (ASP) delivery model.

The campaign administration service 470 may include any type and form of campaign management software, tool or service. In one embodiment, the campaign administration service 470 includes a campaign management system manufactured or provided by DoubleClick or LightingCast. In some embodiments, the campaign administration service 470 integrates, interfaces or communicated with an external campaign management software, tool or service. In one embodiment, the campaign administration service 470 obtains information on an ad campaign from the campaign management software, tool or service. In other embodiments, the campaign administration service 470 obtains information on an ad campaign from a user, such as via a user interface. In some embodiments, the campaign administration service 470 transmits ad targeting user data to the campaign management system. In one embodiment, the campaign administration service 470 transmits metadata from the media platform to the campaign management system. In response, the campaign management system may transmit to the campaign administration service 470 campaign information.

Stream Composition and Ad Insertion Rules

The ad platform 365 via the stream composition service 435, also referred to as an ad optimization engine 435, manages and controls the insertion or delivery of ads during playback of video, such as via on-demand video services. On-demand services, such as on-demand video or media, can be accessed at a time determined by a consumer or user as opposed to a predetermined service such as TV programming which is available at a time determined by the broadcaster. Video on demand systems, such as the media platform 200 in one embodiment, allow users to select, activate, view and/or control viewing of video or media content over a network, such as via streaming, or video or media accessed via a storage, such as via downloaded content. A server may provide or make available the video or media content at any time and/or upon a user request. A user may also via a media player 215 control and manage the playback of the video or media, such as via media player controls of pause, stop, fast forward, play and rewind. Each media available on-demand may vary in total length or duration. Any user's access to the media may vary in 1) the duration, the frequency and the continuity in which the media is viewed by the user, 2) the date, time and place the media is viewed or played back, 3) the type and location of the device used to access the media and 4) the actions taken by the user during playback of the media.

The stream composition service 435 optimizes or otherwise improves the effectiveness, inventory, timing and/or quantity of delivered ads, such as delivering ads during playback of on-demand video. The stream composition service 435 may be configured, instructed, controlled or managed via one or more ad insertion rules 420. For example, an ad insertion rule 410 may specify a frequency, time of insertion or format for delivering an ad during playback of a video.

Figure 4B:
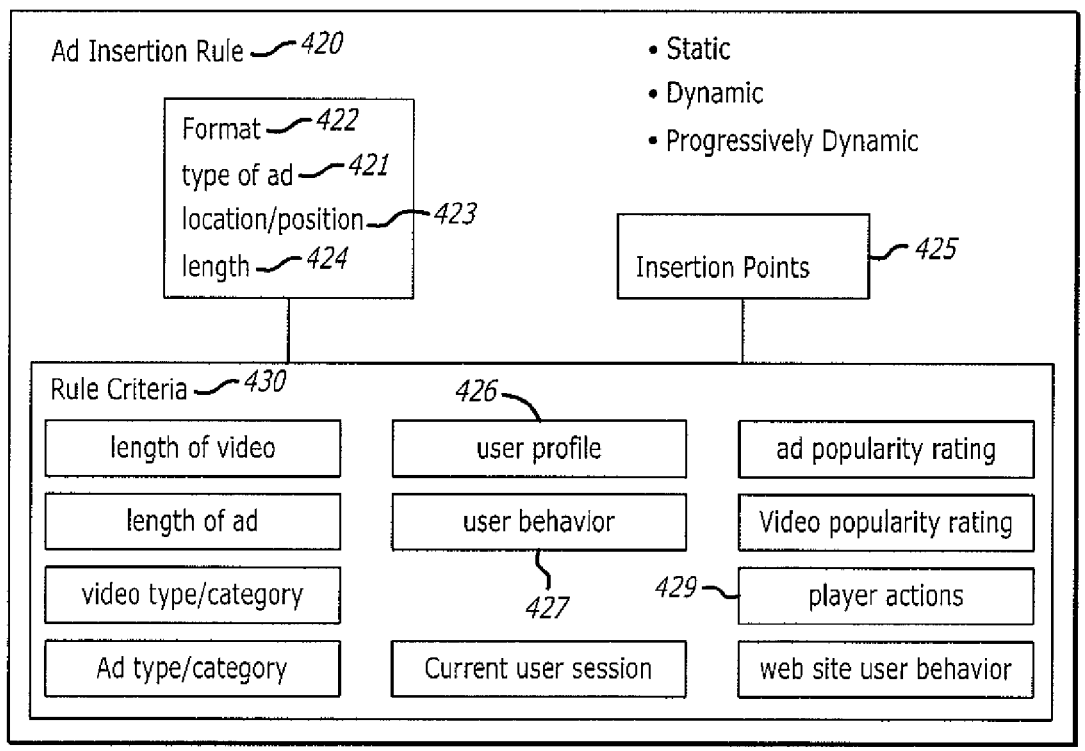
FIG. 4B is a block diagram of an embodiment of an ad insertion rule.
Figure 4C:
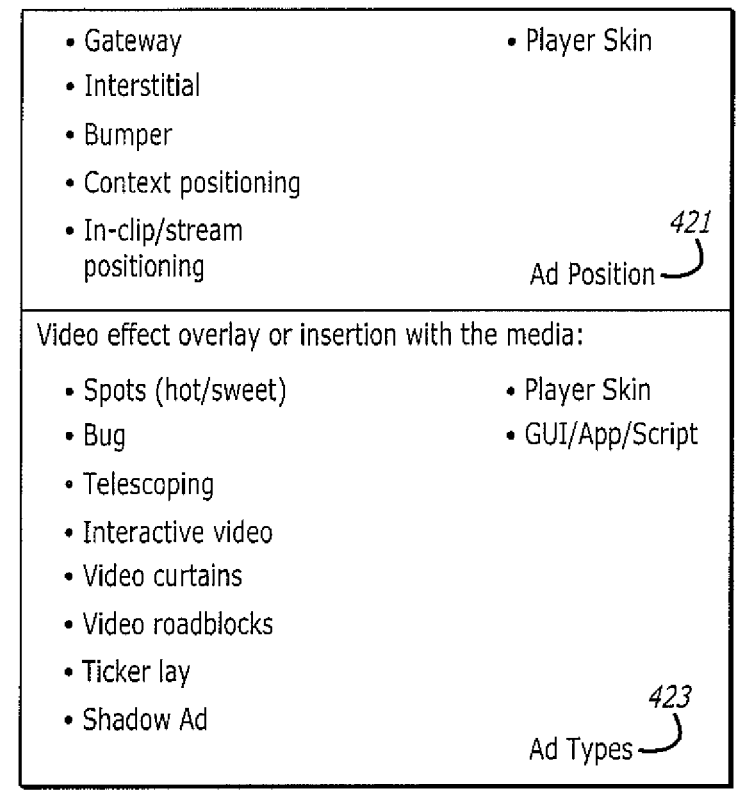
FIG. 4C is a diagrammatic view of an example embodiment of ad positions and ad types for an ad insertion rule.

Referring now to FIG. 4B, details of embodiments of an ad insertion rule 420 will be discussed. An ad insertion rule 420 comprises any type and form of policy, business rule, logic, function, or instruction to determine when, where, how, to whom and/or in what format to deliver an ad, such as during playback of media. The ad insertion rule 420 may be configured by a user such as via a command line or graphical user interface. The ad insertion rule may be configured or specified by another system, application, program, service, process or task, such as via an application programming interface (API). The ad insertion rule 420 may be designed, constructed configured or specified via any type of programming language, scripting language, user interface selections, fourth generation language, custom or proprietary rule language or syntax or any combination thereof.

In brief overview, an ad insertion rule 420 may include a format 422, one or more insertion points 425 and one or more rule criteria 430. The rule 420 determines the format 422 for delivery of an ad and the time during playback of the video, e.g., insertion points 425, to deliver the ad in accordance with any criteria 430. The format 422 of the ad insertion rule 420 may specify a type of ad 421, a location or position 423 of the ad and/or the length or display duration 424 of the ad. The insertion point 425 may specify any temporal information of when to display or deliver the ad, such as a frequency of the ad, or a time during playback relative to the length of the video. The rule criteria 430 specify criteria for which to trigger the rule, apply the rule for playback of the video, or otherwise deliver or display an ad.

The rule criteria 430 include any type and form of criteria, logic or conditions. In some embodiments, the rule criteria 430 may be based on information, operations, performance or characteristics of the media. In other embodiments, the rule criteria 430 may be based on information, operations, performance or characteristics of the ad. In one embodiment, the rule criteria 430 may be based on information, profile or activity of a user. In another embodiment, the rule criteria 430 may be based on information, operations, performance or characteristics of the device 100 used to access the media. In some embodiments, the rule criteria 430 may be based on any temporal information, such as time of day or part of day. By way of example and not in any way to be limiting, the rule criteria 430 may be based on 1) length or duration of the video, 2) length or duration of the ad, 3) type or category of the video, 4) type or category of the ad, 5) user profile 426, 6) user behavior 427, 7) user session information, such as length and activity, 8) popularity rating of ad, 9) popularity rating of video, 10) any media player actions 429, and 11) any user behavior and activity at a web site.

Figure 4D:
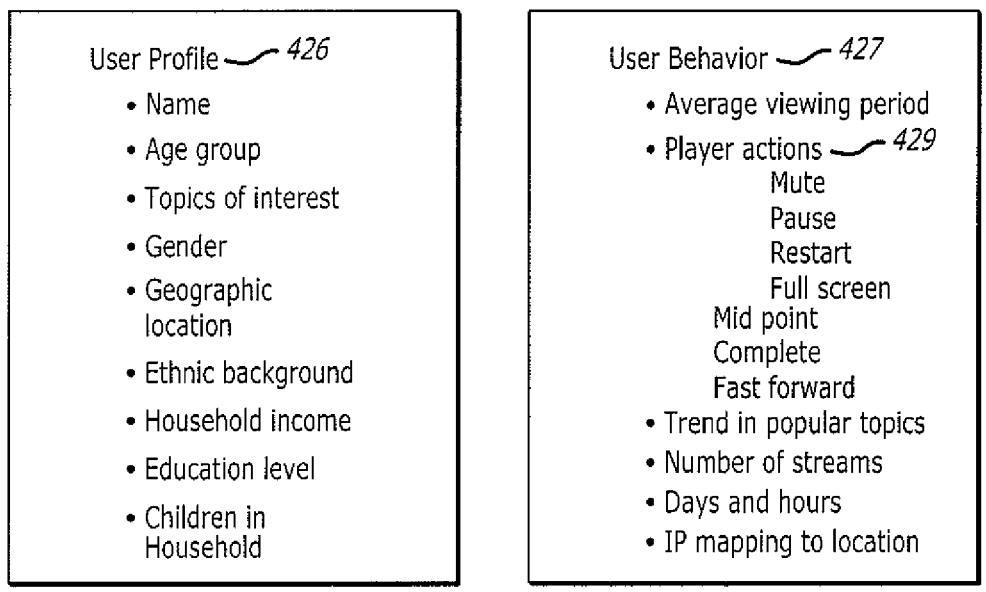
FIG. 4D is a diagrammatic view of an example embodiment of user profile and user behavior information associated with an ad insertion rule.

As illustrated in FIG. 4D, a profile 426 of a user may include any type and form of attribute, characteristic or information regarding a user, such as 1) name, 2) age or age group, 3) topics of interest, 4) gender, 5) geographic locations, 6) ethnic background, 7) household income, 8) education level, 9) number of people or children, and ages in household. Also, as illustrated in FIG. 4D, a behavior 427 of a user may include any type and form of attribute, characteristic or information regarding activity or behavior of the user at a web site, playing videos, or other accessing content, such as 1) average viewing period, 2) player actions 429, 3) trends in topics, 4) number of playbacks 5) day and hours of playbacks, and 6) internet protocol address mapping to location of user requesting playbacks. Any of the information of the user profile 426 and user behavior 427 may be used to form conditions, logic or criteria for the rule criteria 430 of an ad insertion rule 420.

Referring back to FIG. 4A and in further view of FIG. 4B, the format 422 may include any information identifying, specifying or otherwise providing a type of ad 421, location or position 423 of the ad, and the length or duration 424 of the ad. The length 424 of the ad may be specified use any time and form of temporal information. In some embodiments, the length 424 identifies how long or for what duration an ad should be displayed. In other embodiments, the length 424 identifies a length of time to deliver an ad, continuously or otherwise. In one embodiment, the length 424 identifies for how long a video or media ad should be played. In yet another embodiment, the length 424 may be relative to a length of the video, duration of the video playback or any other criteria, such as any of the rule criteria 430. For example, the length 424 for the ad may be a percentage of the length of the video or duration of the playback. In another embodiment, the length 424 may be increased or decreased based on user profile 426 or user behavior 427. For example, the length of the ad may be decreased base on a user 426 being registered or a user 427 with a history of short playback duration.

The position 423 of the format 422 of the ad may include any information specifying or otherwise identifying: 1) where in a playlist the ad will be displayed or run, 2) at what point in relation to the playback of the video clip and/or 3) in what location the ad will be displayed or run, such as a location relative to the screen of the device 100 or the video. By way of example and in no way limiting, in some embodiments, the ad position 421 includes any of the following position identifiers or indicators:

Gateway: pre-roll ad, which may run prior to the start or at the start of playback of the video or start of a playlist;

Interstitial: an ad may be inserted within a playlist, such as between video media or video clips. This may include specifying after how many video clips for which an ad will be inserted in the playlist, such as after every two clips.

Bumper: an ad may be inserted at the end of a playlist or at the end of playback of a video media or clip;

Context positioning: an ad may be placed adjacent, next to, near or in a position relative to a video clip, such as a video clip of the same or similar genre, type or category as the ad;

In-clip/stream positioning: an ad may be inserted within a video clip during playback. For example, insert an ad every 30 seconds with a video clip of 90 seconds; and Player-skin: an ad may take the form of a skin of the media player, such as any color, graphics or other form of ad around the border of the media player. For example, a skin of a media player may comprise a desired or custom graphical user interface or a desired look and feel of the media player.

The ad platform 365, and or ad insertion engine 435, may display or deliver an ad during playback or otherwise provide in stream positioning by: 1) stopping or pausing the playback of the video, displaying or delivering the ad, and then resuming playback and/or 2) delivering or displaying the ad with the video via a video effect overly or insertion of video within the clip or during the clip's playback. In some embodiments, the ad position 423 may identify the ad is to be located, placed, displayed or otherwise delivered at any of the following: the top, top left, top right, top middle, middle, middle left, middle right, bottom, bottom left or bottom right of the video media window, the media player, the web page providing the video, or the screen of the computing device 100.

The ad type 423 may include any type and form of organization, arrangement and/or layout of color, graphics, imagery, transitions, elements, style, creativity, overlays, visual effect, user interaction or combination thereof. By way of example and in no way limiting, an ad type 423 may include any of the following:

Spot (hot/sweet): a clickable ad type that allows a user to click the ad to explore additional information or details of a product or service or to initiate an action Bug: a persistent floating ad that floats on type of a video clip Telescoping: display a long-0form version of the video at a user's request (show preview first)

Interactive video: interactive elements in a video clip such as a poll, survey of a game Video curtain: the ad is displayed across the player's display area or portion thereof. A video curtain type of ad may expand across the player area while the video ad is playing.

Video roadblock: synchronize the ad space—all or a portion thereof—on a page, such as images and rich media, with the video creative. In one embodiment, a video roadblock is the online version of a full-page print ad. Roadblocks may be placed before the entry to a home or web page. The user may click on the ad to jump to another web page (e.g., open a new window) or select a link to continue to the intended web page. In some cases, the user is automatically forwarded to the web page, after a predetermined time period, for example 5 seconds.

Ticker lay: the ad is a ticket with text, an image or video information as a side curtain or letter box;

Shadow ad: the ad may be displayed as a road-blocked creative directly below the video clip, such as when the video is playing.

Player skin: the ad may alter or change the appearance and behavior, or look and feel of a media player 215.

The ad type 423 may include other types of online advertising forms. In one embodiment, the ad type includes a banner ad, which is an advertising graphic image or animation displayed on a website. In some cases, the ad type 423 may include a tristitial ad in which the ad is segments in a single as space as three discrete campaign images displayed in succession during the same single impression. In another embodiment, the ad type 423 may be a floating ad in which the ad moves across the user's screen or floats above the content. In some embodiments, the ad type 423 may be an expanding ad in which the ad changes size and/or which may alter the contents of the webpage. In other embodiments, the ad type 423 may include a wallpaper ad in which the ad changes the background, or portion thereof, of the page being viewed. The ad type 423 may include a pop-up ad in which a new window opens in front of the current window, displaying an advertisement, or entire webpage. The ad type 423 may also be a pop-under ad. The pop-under is similar to the pop-up ad except that the window is loaded or sent behind the current window so that the user does not see the ad until they close one or more active windows. The ad type 423 may include a map ad in which text or graphics linked from, and appearing in or over, a location on an electronic map such as on Google Maps. The ad type 423 may be a graphical user interface, an application or script to provide interactive functionality with a user, such as receive user selection or have a user fill in and submit a form or survey.

Figure 4E:
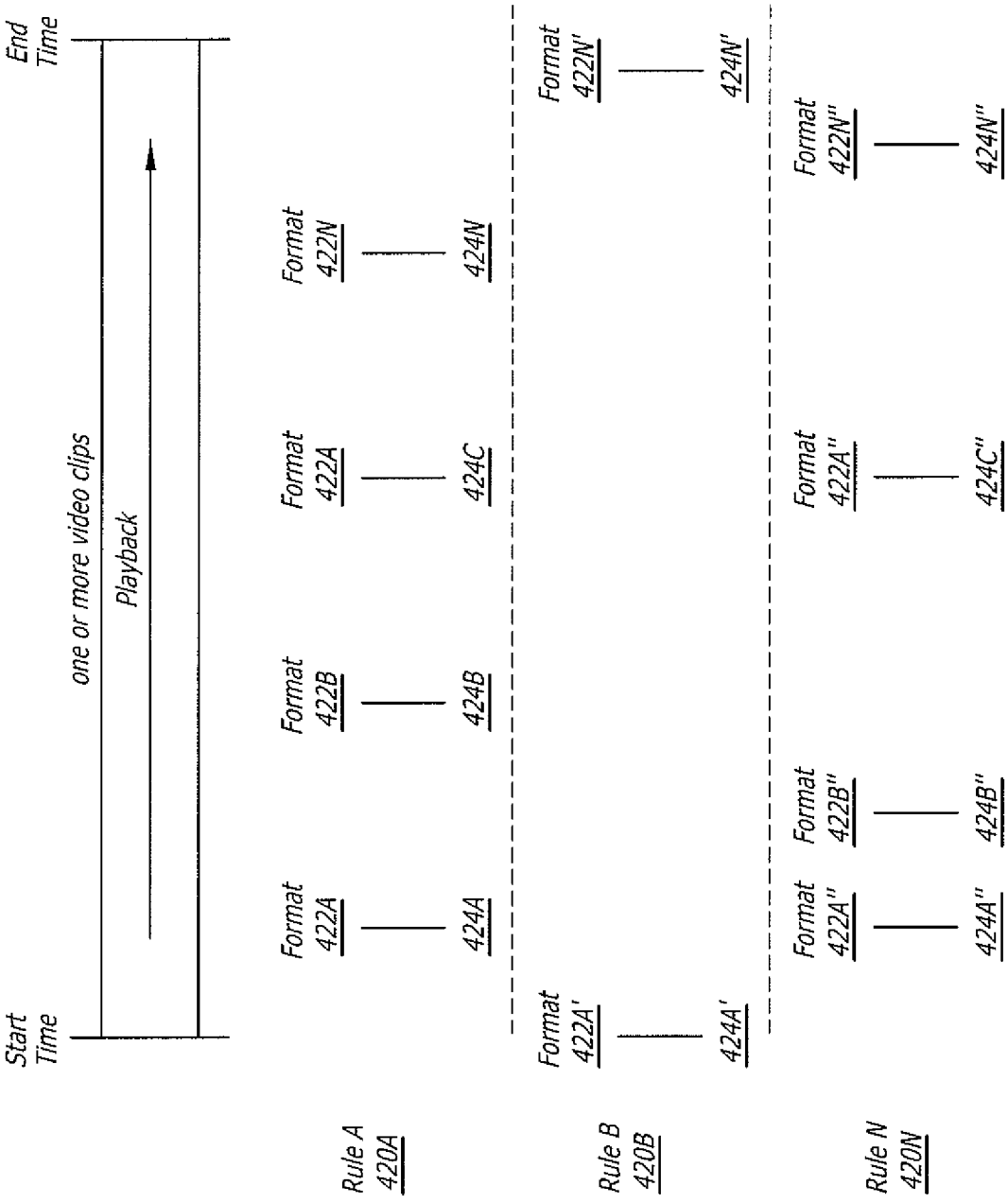
FIG. 4E is a diagrammatic view of an example embodiment of ad insertion rules for inserting ads during a playback of video media.

Referring back to FIG. 4A and in further view of FIG. 4E, the ad insertion rule 424 identifies or specifies one or more insertion points 424 for delivery, display or running of an ad. As mentioned above, the insertion point 424 may specify any temporal information of when to display or deliver the ad, such as a frequency of the ad, or a time during playback relative to the length of the video. In some embodiments, the insertion point 424 may be specified via a descriptor identifying a position in playback of video media, such as the start, mid-point, end of a video clip.

In another embodiment, the insertion point 424 may be specified via a cue point. A cue point may be any type and form of identifier, signal, or instruction associated with or in a video media to indicate a point of interest or to direct or instruct to perform an activity or otherwise take an action. In some cases, a cue point may be specified via metadata associated with the video media. The cue point may be provided with or in the video media or manually inserted via a user interface or video editing tool.

In other embodiments, the insertion point 424 may be specified as a time value or point in duration of playback of the video media, such as in seconds and/or milliseconds of playback. For example, the insertion point 424 may be specified as at or after 1 second of playback. In some cases, the point in duration of playback may be specified relative from the start, mid-point, or end of the playback or another reference point, such as 10 seconds after the start of playback, 10 seconds before the end of playback or 10 seconds before or after a cue point. In one embodiment, the insertion point 424 is specified as a percentage, such as a percentage of duration of playback or percentage of length of the video media. In some embodiments, the ad type 423 also identifies the insertion point 424 for the ad. For example, if the ad type 423 is a roadblock or gateway ad type, the ad may be displayed at or before the start of a video clip.

In another embodiment, the insertion point 424 may be specified relative to a user action. For example, the insertion point 424 may be specified relative to a user action of the media player 215, such as upon start, pause, and rewind action of the media player 215. In another example, the insertion point 424 may be specified relative to a user action for the web page or web site, such as upon selection of a predetermined URL or hyperlink.

In another embodiment, the insertion point 424 may be specified as a frequency based on any time period, such at every 10 seconds. The insertion point 424 may be specified as a progressive, or increasing or decreasing frequency or series of frequencies. For example, every 10 seconds for the first minute, and every 20 seconds for the second minute, and every 30 seconds for the third minute and so on. In other embodiments, a frequency for the insertion point 424 may be specified relative to a length of the video media. For example, if the video media is greater than 90 seconds in length, then insert an ad every 30 seconds. In another example, if the video media is less than 90 seconds in the length then insert an ad every 15 seconds.

In some embodiments, based on the insertion points 424 of an ad insertion rule 420, the stream composition service 435 controls, manages, changes or otherwise manipulates the streaming or playback of the video to provide the delivery, running, displaying or playback of an ad. The stream composition service 435 may deliver the ad in the video stream or playback, on top of or as an overlay to the video stream or playback, or near, adjacent or otherwise in associated or conjunction with the video stream or playback. In one embodiment, the stream composition service 435 composes the stream or playback of the video to include displaying or playback of the ad. For example, the stream composition service 230 may change the content of the stream or playback to insert or include content into the stream or playback for an ad.

In another embodiment, the stream composition service 430 delivers, runs or displays the ad as an overlay or as a visual effect in conjunction with the playback of the video. The playback of the video may be paused or may continue to play. In some embodiments, the stream composition service 435 stops or pauses the playback of the video to display or deliver the ad, and then resumes or otherwise continues the playback. In yet other embodiments, the stream composition service 435 displays or runs the ad as part of the media player, such as a skin or another window. In other embodiments, the stream composition service 435 displays or runs the ad in conjunction or association with the video, such as near, adjacent to or on the same web page as the video media.

In one embodiment, the stream composition service 430 optimizes or otherwise improves the ad delivery frequency by providing more options for specifying ad placement. By way of example and in no way to be limiting, the ad platform 365 and/or stream composition service 435 may provide the following ad placements methods:

1. Dynamic Ad placement—ad insertion rules 420 may be specified to insert cue points within a video clip to display ads or video ad effects.
2. Dynamic clip rating-based ad placement—Based on a popularity rating of a video clip more ads may be targeted within or around the video clip.
3. Premium membership ad placement—This method may provide an incentive for the user to register with user profile information. A publisher may create or provide a special or predetermined composition (playlist) with improved or premium content. Also based on registration or membership, this method may specify a lesser number or frequency of ad placements.
4. Manual Ad placement—A publisher may manually identify cue points for ad insertion. The media platform 200 may ingest video content (e.g., via metadata) with cue points to use as insertion points.
5. Progressively-Dynamic Ad Placement—The ad placement rules may change (e.g., frequency and format of ad placement) as the user progresses through a playback session.

Any of the above ad placement methodologies may be encompassed in one or more ad insertion rules 420.

As referred to in FIG. 4B, the stream composition service 430 may compose ads via ad insertion rules 420 categorized as follows: 1) static, 2) dynamic and 3) progressively dynamic. A static ad insertion rule may be a predefined ruled provided with or in the media platform 200, or the stream composition service 435. For example, a static rule 420 may be specified to deliver a particular ad targeted for a particular stream or targeted for a particular day part. In another example, a static rule 420 may have the frequency of the insertion point 424 preset. In a further embodiment, the spot or cue point where an ad is played back is predefined.

In some embodiments, a dynamic ad insertion rule 420 may be a rule assigned to or for a stream composition based on any rule criteria 430. A dynamic rule 420 may be assigned for stream composition by taking in account user profile, user behavior history, ad popularity ratings, and clip popularity ratings. For example, if a user historically views clips of 180 seconds duration on average then insert 45 second of ads or if a user's view period is less than 60 seconds then "ticker lay" ad on clips.

In other embodiments, an ad insertion rule 420 may be referred to as progressively dynamic. A progressively dynamic rule may consider information, user actions and criteria based on the current playback session and user activity. In one embodiment, a progressively dynamic rule is based on criteria 420 at the time of request of playback as well as criteria collected, detected or identified during playback. For example, a static or dynamic rule may be initially used for a particular user. As the user progresses through the session more user behavioral data is collected and the stream composition may be modified on-the-fly based on the collected data. In another example, a user may be rewarded for a longer session by changing the frequency (e.g., decreasing) the spot load, etc.

In view of the different ad insertion rules, the ad placement methodologies may be encompassed in a 1) static composition, 2) dynamic composition or 3) dynamically progressive composition. In some cases, the static composition of ad placement may be based on the manual ad placement or premium membership ad placement methods. For example, a publisher may specify via ad insertion rules (predefined or otherwise) and/or cue points:

1. If the playlist should have a gateway and/or bumper ad, and/or,
2. If interstitial ad should be inserted and also after how many clips an ad needs to be inserted. NumClips (NC) >x. E.g. insert after very clip, and/or,
3. Identify a set of points in a clip to insert video clip ads or video effect ads.

In another case, the dynamic composition may be based on the dynamic ad placement, clip rating or ad rating-based placement, or premium membership ad placement methods. This may allow a publisher to set relatively fluid rules based on the duration of a clip, such 1. Set a variable clip length in seconds and ClipLength (CL)>=z and then specify an ad effect insertion every ny seconds with the clip, where, y is an interval in seconds and n is an integer from 1 . . . N (E.g. If the clip is >=60 seconds then add a bug or a ticker at every 25 seconds). For every position, n, the following condition should be true, z−ny>=y seconds.
2. If a clip rating (CR)>=l then change the value of n in the above step. For example, if originally n is set as 20 seconds then set it to 15 seconds. In addition, specify if ads can be inserted before and after the clip playback if not part of the original composition.
3. If a user has registered all the information about himself or herself then the value of n in step 1 above may change. Rule in step 2 may not be applicable for this user. For example, if originally n is set as 20 seconds then set it to 30 seconds.

In some cases, progressively-dynamic composition may be based on user session duration, historic average user session data at the site, historic average user session for streaming video at the site, historic average viewing time of a user for a clip, or current user session for streaming the data at the site. An example rule may be:

1. Changing the value of n if a user has registered all the information about him/herself (see example rule 3 above for dynamic composition); and/or 2. Override the rule 2 in the above dynamic composition section and have a particular ad effect (different content) show all the time on each clip. For example, if user view time is only 20 seconds then just over lay a bug on top right all the time, or have ticker lay all the time.

Any or all of the above variable values for a rule of a static, dynamic or progressively dynamic stream composition may be set to a default value. The default value may be associated or set on a per customer, distributor, and/or affiliate basis. In one embodiment, the default variable values may be overridden for each composition.

Referring to FIG. 4E, a diagram depicting an example use of ad insertion rules 420 to provide a variety of insertion points 424 and ad formats 422 during playback of media, such as video, is depicted. In brief overview, a media may be played or streamed from a starting point, or start time, for any duration up to and including an end point, or end time, which may be the length of a video clip. For example, on-demand video may be started by request of a user and the video's playback controlled by the user via a media player 215. Depending on the criteria 430 of the rules, one or more ad insertion rules 420 may be applied during the playback of the media. A first ad insertion rule 420A may provide for ad formats 422A-422N at insertion points 424A-424N respectively. A second ad insertion rule 420B may provide for ad formats 422A'-422N' at insertion points 424A'-424N' while a third ad insertion rule 420C provides for ad formats 422A"-422N" at insertion points 424A"-424N". Each or any of the ad formats for any of these rules 420A-420N may provide different ad formats at any of the insertion points 424. Any of the insertion points of any of these rules 420A-420N may be specified using the same or different notation—for example, rule 420A may have an insertion point based on frequency while rules 420B and 420C have insertion points based on frequency and/or duration and/or percentage of the video clip.

The ad insertion rules are generally discussed herein as delivering ads during playback of a video media. This may include pre-playing and post-playing of the video media, or at any time associated with the playing of the video media. During playback may also include any temporary stopping, pausing or interruption to the playing of the media, intentional or otherwise. Furthermore, during playback may include delivering ads during a single video clip, intra-video, or it may include delivering ads between a series of one or more video clips—inter video—such as a playlist. Moreover, the ad insertions rules may be applied to deliver ads during video clips and in between video clips. In some cases, the ad insertion rules may be applied between playlists. In other cases, the ad insertion rules may be applied to a plurality of video media being played back concurrently, simultaneously or otherwise at the same time.

The following table of use cases describe some different example scenarios for using and applying ad insertion rules 420:

| Example Use Cases | |
|---|---|
| User Scenario: Manually increasing the ad revenue opportunities | Description: Tom, a user, may want to increase ad sales revenue and he takes a look at the opportunities that he has to insert ads in a playlist. This is a combination of what ad formats are available and also how he may specify to insert them. Tom's ad inventory may have for example Flash-based hot spots, bugs, ticker text stream, and video clip type ads. |
| Video ad revenue - Intra playlist | Tom may specify placement of video ads around the video clips in a playlist. Tom specifies an ad insertion rule to apply gateway and bumper video ads and also every two video clips to insert a video ad. |
| Graphics ad revenue - Inter video clip | Tom may insert graphics in the video clips in the playlist too. Tom may go through each video clip in the playlist and manually identify cue points in each clip where a graphic may be overlaid. In addition to specifying which graphics to overlay, he also specifies where on a frame the graphics should be placed and for how long it should be visible. |
| Video ad revenue - Inter video clip | Tom may insert ad video clips in the video clips in the playlist too. Tom may go through each video clip in the playlist and identify cue points in each clip at which a video ad is to be inserted. The playback of the selected video clip may stop at this point, the video ad may be played, and then resume playback of the original video. Tom may also specify the duration of ad video play back. |
| Graphics/Video ad revenue - Inter video clip | The video content is already logged for cue points by a third party when the video is uploaded into the media platform 200, the logged cue points are also loaded into the media platform. Publisher brings up the video to identify the cue points Publisher is presented with the cue points loaded into the media platform Publishers uses some cue points and associates ad formats and positions with the cue points Publishers adds additional cue points |
| User Scenario | Description: Linda, the system administrator keeps seeing Tom pick the same manual options most of the time so she decides to create system default rules for overlays graphics, ticker text, and video ads. |
| Video ad revenue - Intra playlist | Tom's distributor assigns Tom's affiliate the default ad network as well as suggestions of where to put video ads Tom keeps the default suggestion. |
| Video ad revenue - Intra playlist | Tom's distributor assigns Tom's affiliate the default ad network as well as suggestions of where to put video ads Tom keeps the gateway ad but removes the bumper |

-continued

| Example Use Cases | |
|---|---|
| | ad and also increases the frequency of ads, instead of adding video ads every two clips provide video ads every one clip. |
| Graphics ad revenue - Inter video clip | Linda sets up a rule such that if a video clip is equal or more than 60 seconds then insert a bug every 20 seconds and keep it visible for 2 seconds. Tom keeps the default rule |
| Graphics ad revenue - Inter video clip | Linda sets up a rule such that if a video clip is equal or more than 60 seconds then insert a bug every 20 seconds and keep it visible for 2 seconds. Tom changes the length of the clip to 50 seconds and every 15 seconds a bug is shown for 2 seconds |
| Graphics ad revenue - Inter video clip | Linda sets up a rule such that if a video clip is more than 60 seconds then insert a bug every 20 seconds and keep it visible for 2 seconds. Tom deselects the rule |
| Graphics ad revenue - Inter video clip | Linda sets up a rule such that if a clip is 30 seconds longs then overlay the clip with the ticker text. Tom keeps the default rule |
| Graphics ad revenue - Inter video clip | Linda sets up a rule such that if a clip is 30 seconds longs then overlay the clip with the ticker text. Tom deselects the rule |
| Graphics ad revenue - Inter video clip | Linda sets up a rule such that if a clip is 30 seconds longs then overlay the clip with the ticker text. Tom changes the length from 30 seconds to 45 seconds |
| User Scenario: Dynamically increasing the ad revenue opportunities | Description: Linda also notices that Tom's revenue generation can be increased if some of the rules are changed dynamically depending on the community ratings and/or user registration. |
| Graphics/video ad revenue - Inter video clip | Linda sets up a rule such that if a clip has an aggregate rating above 3 (1-5 range) then target more ads to the clip, an ad should be displayed before and after the ad and the inter-video clip should be displayed every 20 seconds. Tom may deselect the rule |
| Graphics/video ad revenue - Inter video clip | Linda sets up a rule such that if a clip has an aggregate rating above 3 (1-5 range) then target more ads to the clip, an ad should be displayed before and after the ad and the inter-video clip should be displayed every 20 seconds. Tom may change the rule to display ad only before the video clip unless another rule dictates that ad should be also after the video clip Tom may leave the interval unchanged to 20 seconds |
| Graphics/video ad revenue - Inter video clip | Linda sets up a rule such that if a clip has an aggregate rating above 3 (1-5 range) then target more ads to the clip, an ad should be displayed before and after the ad and the inter-video clip should be displayed every 20 seconds. Tom may leave the rule unchanged |
| User Scenario: Ad Rules Builder Progressively-Dynamic ally increasing the ad revenue opportunities | Description: Linda, the system administrator sees that end-users have different behaviors; for example, a particular user, on average, just views a video clip for only 20 seconds |
| Graphics ad revenue - Inter video clip | Linda sets up a rule in the system that if the end user historically on average views a clip just 20 seconds then have an ad graphics present on the video Tom may leave the rule unchanged |
| Graphics ad revenue - Inter video clip | Linda sets up a rule in the system that if the end user historically on average views a clip just 20 seconds then always have an ad graphics present on the video Tom may deselect the rule |
| Graphics ad revenue - Inter video clip | Linda sets up a rule in the system that if the end user historically on average views a clip just 20 seconds then always have an ad graphics present on the video Tom sees the rule and instead of a bug may select a ticker text to be present all the time |

Figure 4F:
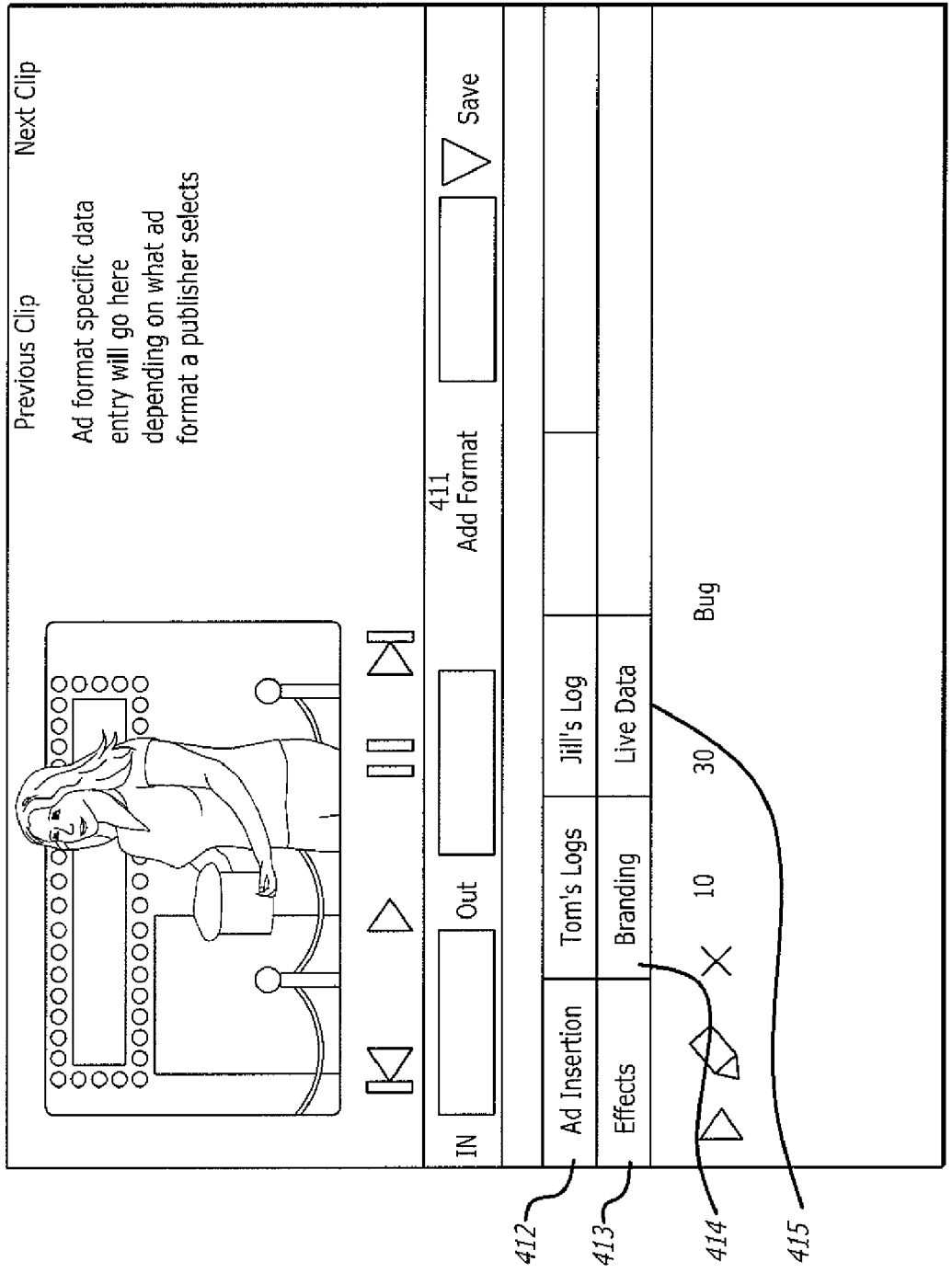
FIG. 4F is a diagrammatic view of an example embodiment of ad insertion rules builder for establishing insertion points for displaying as during playback of video media.

Referring now to FIG. 4F, an example embodiment of an ad insertion rules builder 410, also referred to as an ad builder 410, is depicted. The ad insertion rules builder 410 may comprise any type and form of interface for creating, modifying, configuring, selecting, or specifying one or more ad insertion rules 420. In one embodiment, the ad builder 410 includes any type and form of a user interface, graphical or command-line, for a user to create, modify, configure, select, or specify an ad insertion rule. In another embodiment, the ad builder 410 includes any type and form of application programming interface (API) for a program, application, script, process, service or set of executable instructions to create, modify, configure, select, or specify an ad insertion rule. In some embodiment, the user interface for the ad builder functionality is provided via the console 210.

In brief overview, the example embodiment of the ad builder 410 in FIG. 4F provides an interface for manually identifying ad insertion points for one or more video clips. The interface may include a user interface element 411 to select, save and/or upload an ad format to display at an insertion point. The interface may also include user interface elements that display the times for the insertion points, for example, the time the ad starts to display and the time the ad completes displaying. The ad rules builder 410 may have one or more user interface elements, such as an ad insertion tabs 412 for the user to create, configure or specify the effects 413, branding 414 and data 415 to use at an insertion point.

The ad format identified via the ad format user interface element 411 may include any supported rich media effects, such as a Flash formatted .swf file. A user may be able to upload an ad effect to display for a selected insertion point. One of the ad formats may be a video clip. The builder 410 may provide an option to use a clip requested from another system or third party. The builder 410 via the user interface element 411 may otherwise allow the user to upload a video clip from a server.

The "Ad Insertion" user interface element 412, such as a tab, may include any of the finalized ad related information. In one user interface configuration, a user may click on the tab 412, and three sub-tabs 413, 414 and 415 may appear. The ad information for a composition may be configures as described below.

The "Effects" tab 413 may include time-based information about the effects that may be overlaid on a video frame, floaters, live data that may be displayed as a ticker, or a video clip. For the effects and video clips, a user may specify if they want the "system" to decide what effects or clips to display or playback For the effects, a user may specify a single point in time and/or an out point until when the effect should be displayed. In addition a user may select formats to overlay over a video frame, player, and/or the page itself. The user may specify the position mapping for the effect within the frame. The user may specify the positions relative to the player. The webpage may be mapped via XML for the player. If a user selects an ad video clip and identifies an in point, the user may also select how long the video clip should be plated. The user may also select an effect called "re-skin." The user may upload a .swf file to re-skin the player or select from a list that already exist in the system, such as a list of player skins available for an affiliate.

The "Branding" tab 414 may used to re-brand a video with logo or add other branding information. For example, if an affiliate wants to re-brand a video with the affiliate's logo or add some other branding information, then the user may re-brand the effects for a particular player and/or playlist. The branding information may be associated with the complete playlist, e.g., all clips, or with clips selected by the user. Configuration data for these branding effects may be stored in associated with the affiliate. For example, any data that is stored at the affiliate level shows up under the branding tab 413. A user may elect to deleted this branding data for this playlist or add some additional branding.

In one embodiment, the "Live Data" tab 415 provides access to configuration related to displaying of an RSS feeds, such as a ticker over the video at the bottom of the frame. For example, if a user selects "ticker lay" for effects via the effect tab 413 then live data is used for displaying this type of ad. In one embodiment, the tab 415 provides a user interface to specify a URL for an ad, such as an RSS feed. The user may specify the url or otherwise configure the Live Data tab at an affiliate level. The user may also configure the url or otherwise the configuration of Live Data tab at a player or playlist level. Any data that is stored at the affiliate level may be available under this tab 415. A user may elect to delete the stored URL for this playlist and/or add a different URL.

Any of the log tabs depicted in the ad builder 410 of FIG. 4F may provide access to log data, files or database associated with a video clip. The logs may comprise time based data related to cue or insertion points. The logs may include information about regions of interest where an ad could be inserted. For example, the logs may comprise time-based logs that were uploaded with a video clip. In some cases, logging may be enabled after a video clip is uploaded.

In view of the embodiment of the ad rules builder 410 depicted in FIG. 4F, the following are some example uses cases for building and using rules.

1. EXAMPLE USE CASE 1 a. A distributor creates an affiliate account or a user sets up an affiliate account for a customer in the media platform 200
b. User creates rules for the affiliate by
   i. Choosing an ad network to use
   ii. Setting up defaults values for rules, such as the static composition and dynamic composition type rules previously discussed herein
   iii. A default branding effect (image) may be uploaded and a position to display within the frame specified. The position may be defined for within the player frame: top left (TP), top right (TR), top middle (TM), bottom left (BL), bottom right (BR), bottom middle (BM) and center (C).
   iv. A mapping of some location on a page is specified to display banner ads, shadow effects, etc.

2. EXAMPLE USE CASE 2 a. User searches for video clips, identifies few clips and creates a play list.
b. User selects to manually identify ad insert points in the clips
c. The ad builder user interface 410 gets loaded with the first clip
d. Video is loaded in a pause state
e. User starts playback
f. User sees a point where ad needs to be inserted, clicks on the "in" button and the time gets populated in the text box next to it and in the text box next to the out button
g. User sees a point when the ad needs to end and clicks on the out button and the text next to the out button gets updated
h. User selects type of the ad effect to be inserted (may have a defaults at type such as a bug ad)
i. User hits save. The data appears in the row under the Ad Insertions->Effects tab. (If user does not select the out point, then the in point and the out points are the same point on the timeline).

3. EXAMPLE USE CASE 3 a. User wants to confirm the position is right
b. User Clicks on the arrow next to the log
c. Video starts playing from that point on timeline in the player

4. EXAMPLE USE CASE 4 a. User does not like the log
b. User clicks on the cross button next to the log and deletes it.

5. EXAMPLE USE CASE 5 a. In addition to the default tab (Ad Insertion) other tabs for logs (Cues) appear
b. User clicks on the tag called "Cue Logs"
c. User sees the logs and clicks on a log
d. The time associated with the in point gets populated in the in text box
e. If the user likes the cue then selects an ad and hits save
f. The log appears in the "ad insertion->Effect" tab logs, user remains on the "Cue Logs" tab

6. EXAMPLE USE CASE 6 a. User wants to edit a particular log in the "Effect" level
b. User clicks on the edit icon next to the log
c. The data gets populated in the in box and the types box
d. User play/scrubs the video
e. User identifies a point and clicks the In button
f. User clicks on the Save button and the log is updated

7. EXAMPLE USE CASE 7 a. User selects the "Branding" tab
b. A default brand logo information is displayed
c. User deletes the logo from this playlist by clicking on the delete icon
d. User clicks on an "effect" button
e. A file browse dialog appears to choose an effect to upload
f. User selects a brand logo and also selects a position to display the logo
g. User hits "Save" button, the file is uploaded in the system.
h. User repeats steps d-g to upload a few more branding images.
i. User is given a choice to associate the brand logo with the current clip or with all clips in the playlist.

8. EXAMPLE USE CASE 8 a. User selects the "Ad Insertion->Live Data" tab
b. User is provided with a text box to input the url to the RSS feed

9. EXAMPLE USE CASE 9 a. User clicks the "All" button (to associate effects with the complete clip)
b. User selects system effect and selects Save

Figure 5A:
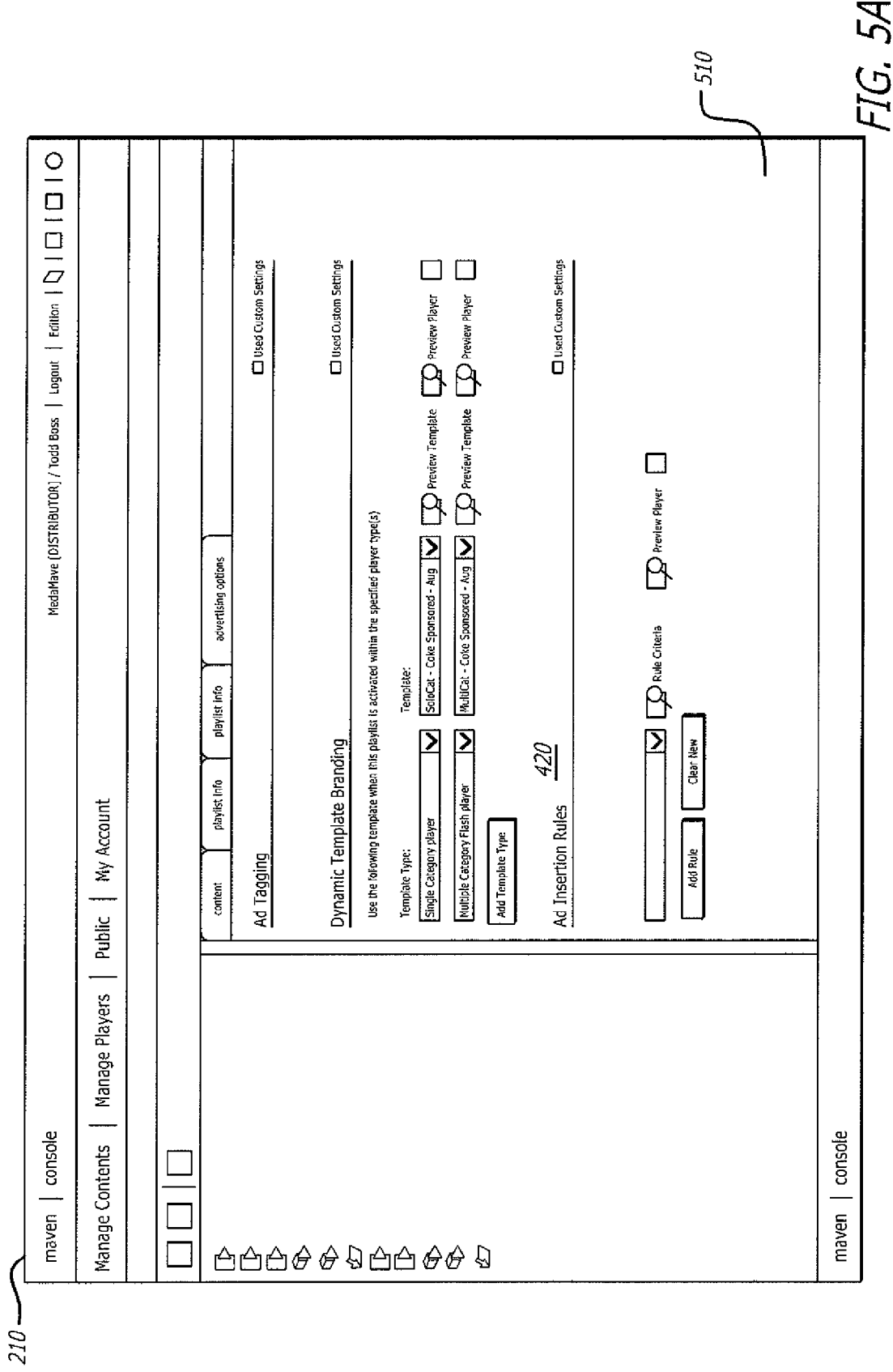
FIG. 5A is a pictorial view of an embodiment of a console for specifying ad insertion rules.
Figure 5B:
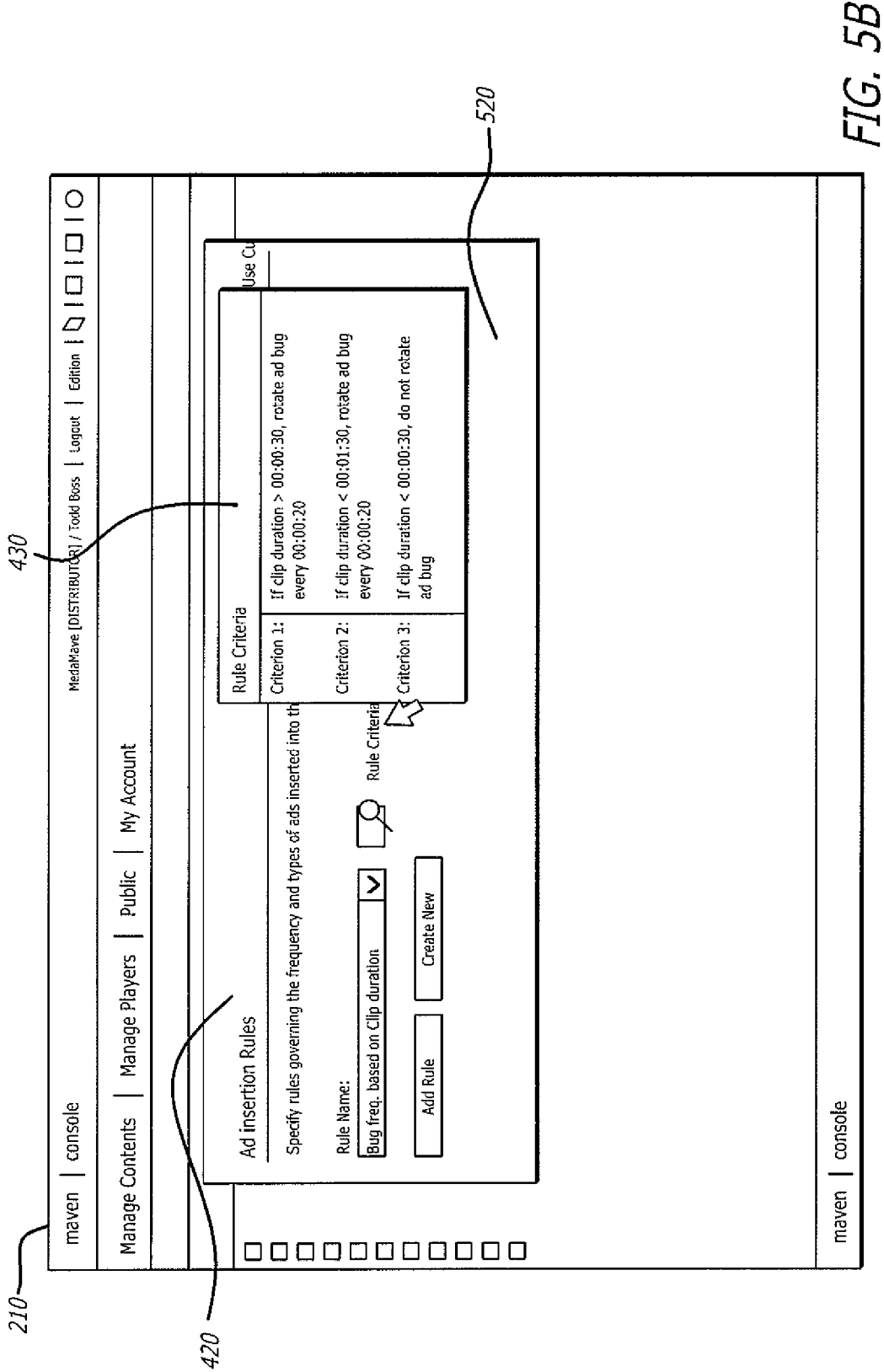
FIG. 5B is a pictorial view of an embodiment of a console for specifying criteria for an ad insertion rule.
Figure 5C:
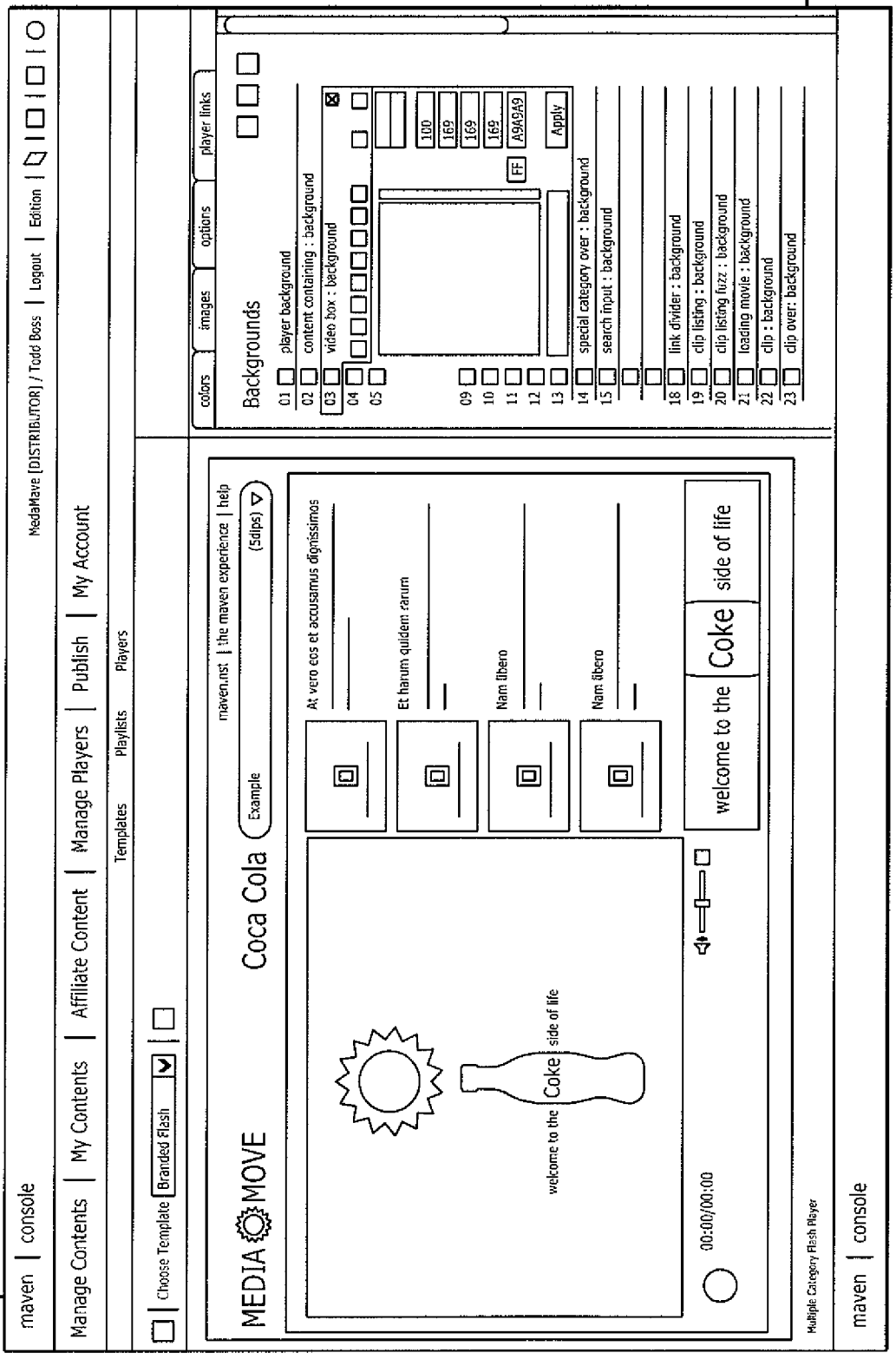
FIG. 5C is a pictorial view of an embodiment of a console for branding a player.
Figure 5D:
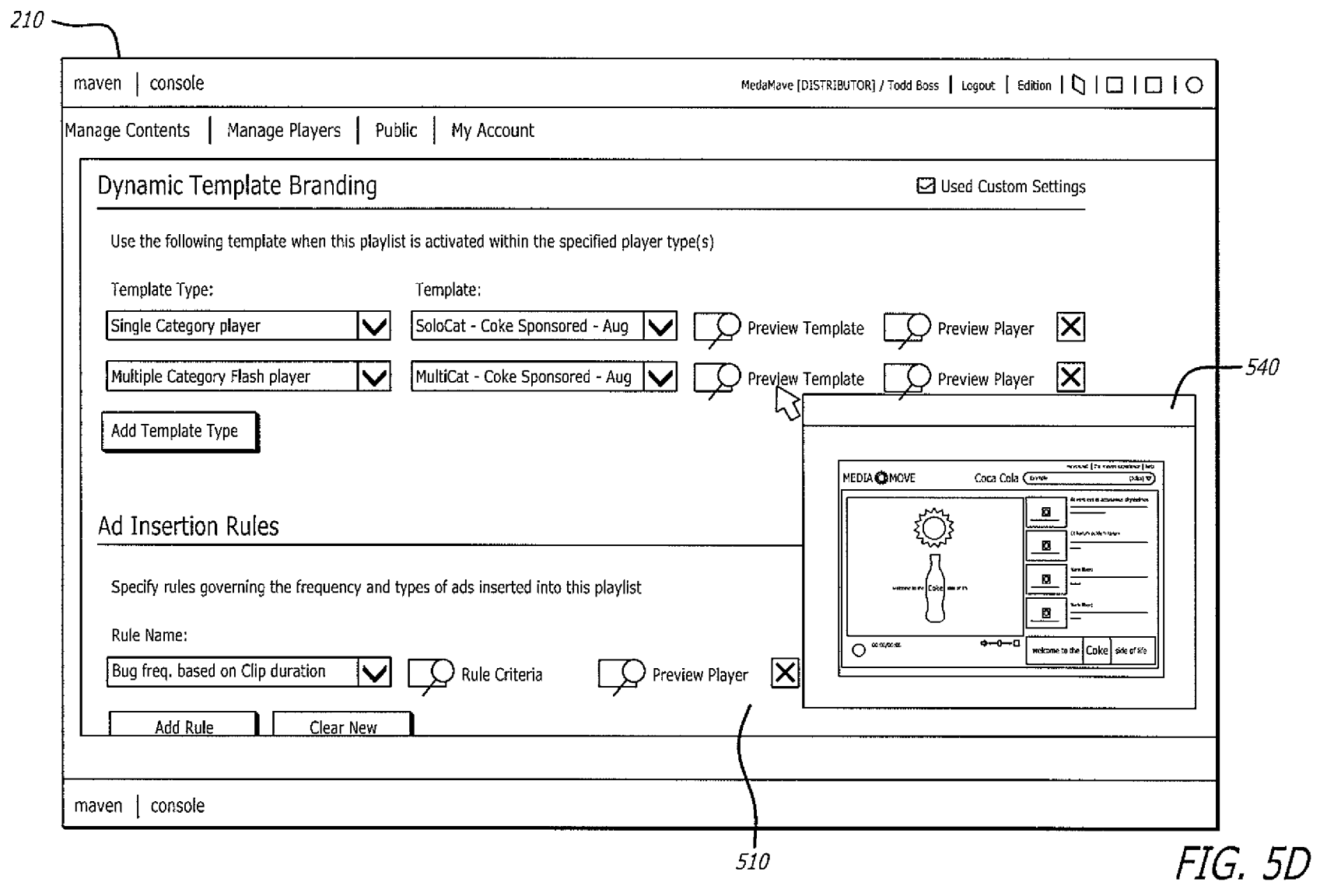
Figure 5E:
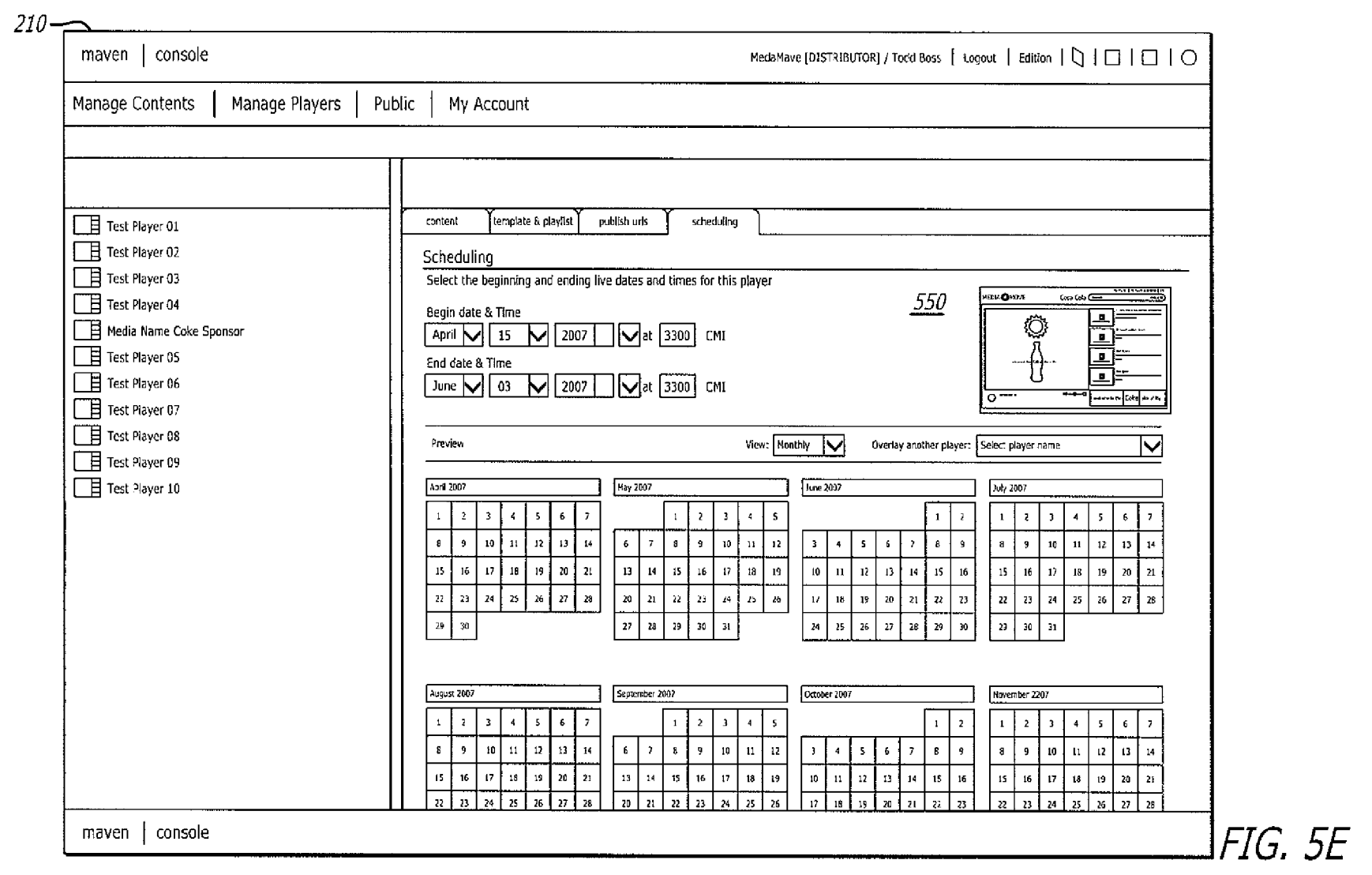
Figure 5F:
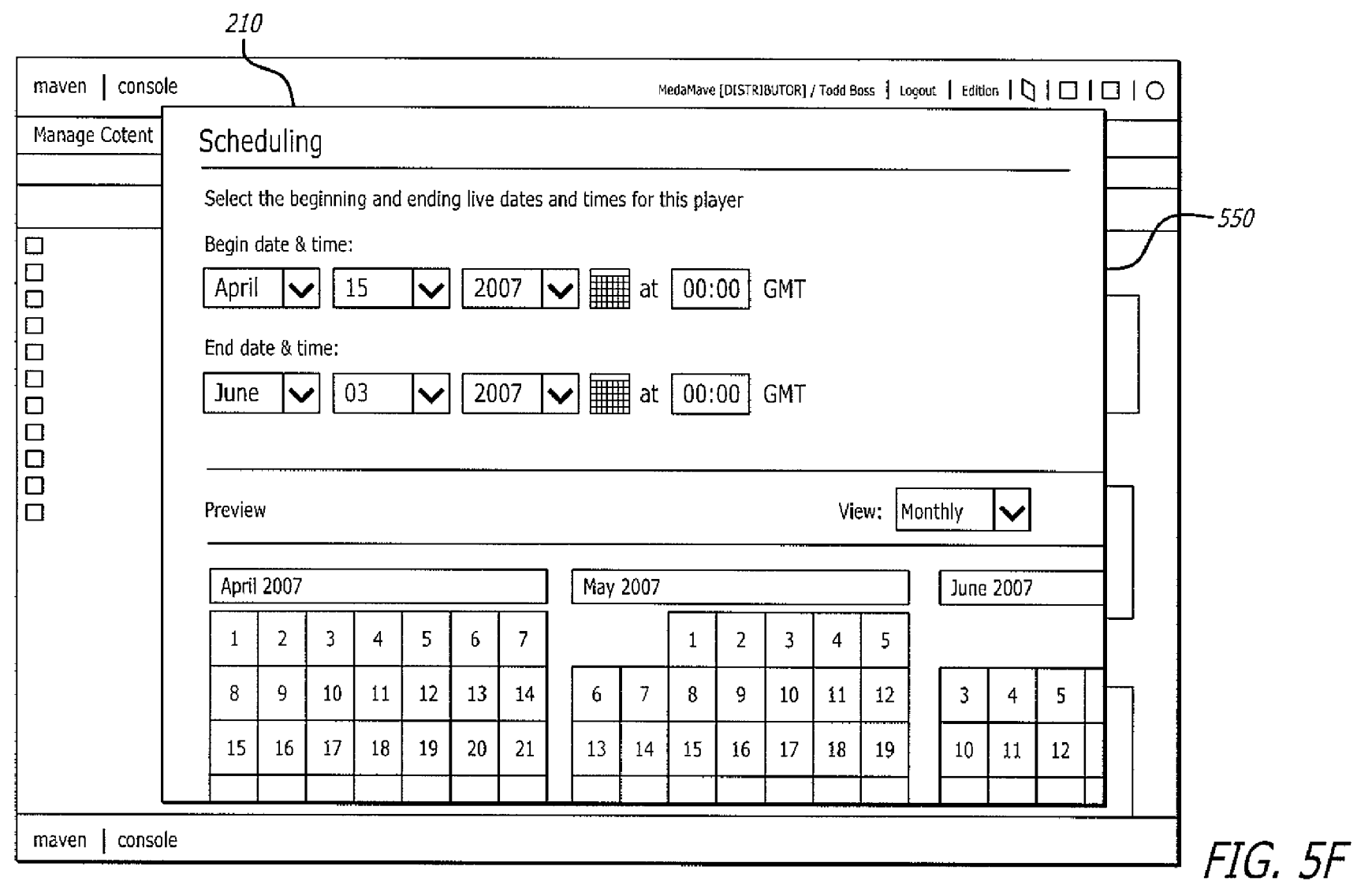

10. EXAMPLE USE CASE 10 a. User is done with marking the click
b. User clicks on the Next button and the next clip is loaded in the player Referring now to FIGS. 5A-5F, example pictorials of a console 210 providing functionality and a user interface for another embodiment of the ad builder 410 are depicted. In brief overview, FIG. 5A illustrates an embodiment of providing a user interface for configuring advertising options. FIG. 5B illustrates an embodiment of a user interface for specifying one or more rule criteria. FIG. 5C illustrates an embodiment of a user interface for managing and branding a media player. FIG. 5D illustrates an embodiment of a user interface for specifying and previewing player templates. FIG. 5E illustrates an embodiment of a user interface for scheduling the use of a player template. FIG. 5F illustrates another embodiment of the scheduling user interface.

Referring now to FIG. 5A, the console 210 may provide a user interface 510 for configuring or specifying one or more advertising options, such as branding a template for a media player or creating one or more ad insertion rules 420. For example, the user interface 510 may have one or more elements for a user to select a template type and the template for dynamic template branding. The user interface 510 may also have one or more elements for a user to specify ad insertion rules 420 governing the frequency and types of ads inserted into the playlist. The user interface 510 may provide also elements for a user to select or specify rule criteria 430 for the insertion rule 420. Furthermore, the user interface 510 may provide elements to preview the player template or the player 215.

Referring now to FIG. 5B, the console 210 may provide a user interface 520 for configuring or specifying one or more rule criteria 430 for an ad insertion rule. The user interface 520 may include a choose list of rules 420, which may be predefined or system rules, or may be rules created by the user. The user interface 520 may provide functionality for adding rules or creating new rules. Furthermore, the user interface 520 may provide any type and form of user interface elements to specify rule criteria 430, such as the example of criterion 1, 2 and 3 depicted in FIG. 5B.

Referring now to FIGS. 5C and 5D, the console 210 may provide a user interface 530 for managing, configuring or creating one or more templates for a player 215. The user interface 530 may provide a toolbox, such as a color palette, to design, specify and configure the color for portions of the media player template. For example, a user may specify a custom color for the background of any portion of the media player template, such as any of the following: player, content container, video box, search category, link divider, clip listing, clip listing fuzz, loading movie or clip over. The toolbox provided by the user interface 530 may also allow a user to select and upload images to place on any portion of the media player template. Furthermore, the user interface 530 may provide user interface elements for a user to select or specify any player links or URLs to place on the player template. Referring to FIG. 5D, the console 210 may provide a user interface 540 for previewing a template from the dynamic template branding section of the user interface 510.

Referring now to FIGS. 5E and 5F, the console 210 may provide a user interface 550 for scheduling the beginning and ending date and/or time for use of a player having a configured player template, such as the template depicted in FIG. 5C. The user interface 550 may include a calendar based selection tool for the user to select a begin date and an end date. Optionally, the user may enter a time on the begin date as well as the end data. In this manner, a user may configure when a player template may be in use or go live for a target time period or ad campaign period. In another embodiment, the user may specify a start date and/or time and a number of days or amount of time to run the campaign with or otherwise use a branded media player template.

Figure 6A:
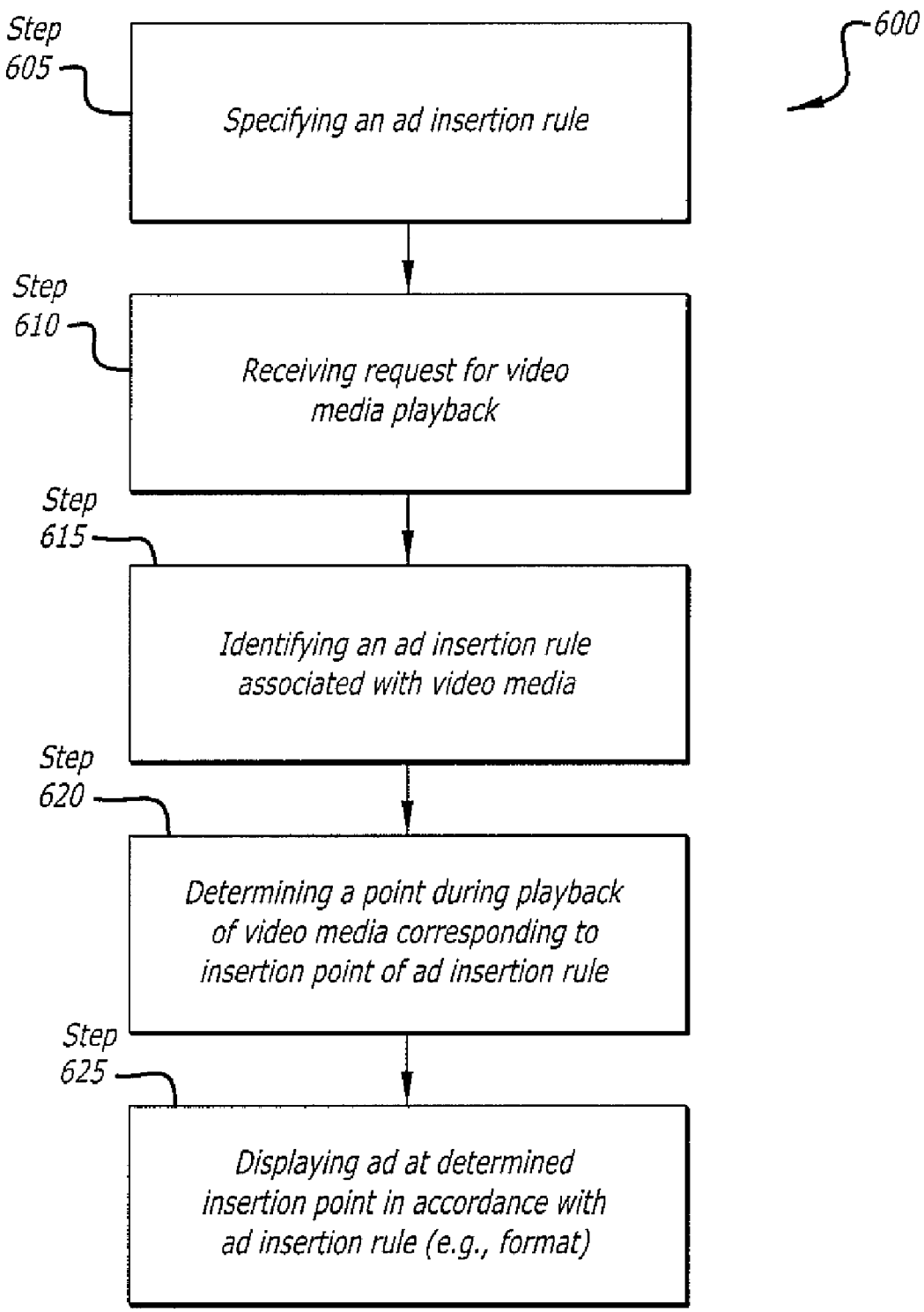
FIG. 6A is a flow diagram of steps performed in practicing an embodiment of inserting ads during playback of video media via ad insertion rules.
Figure 6B:
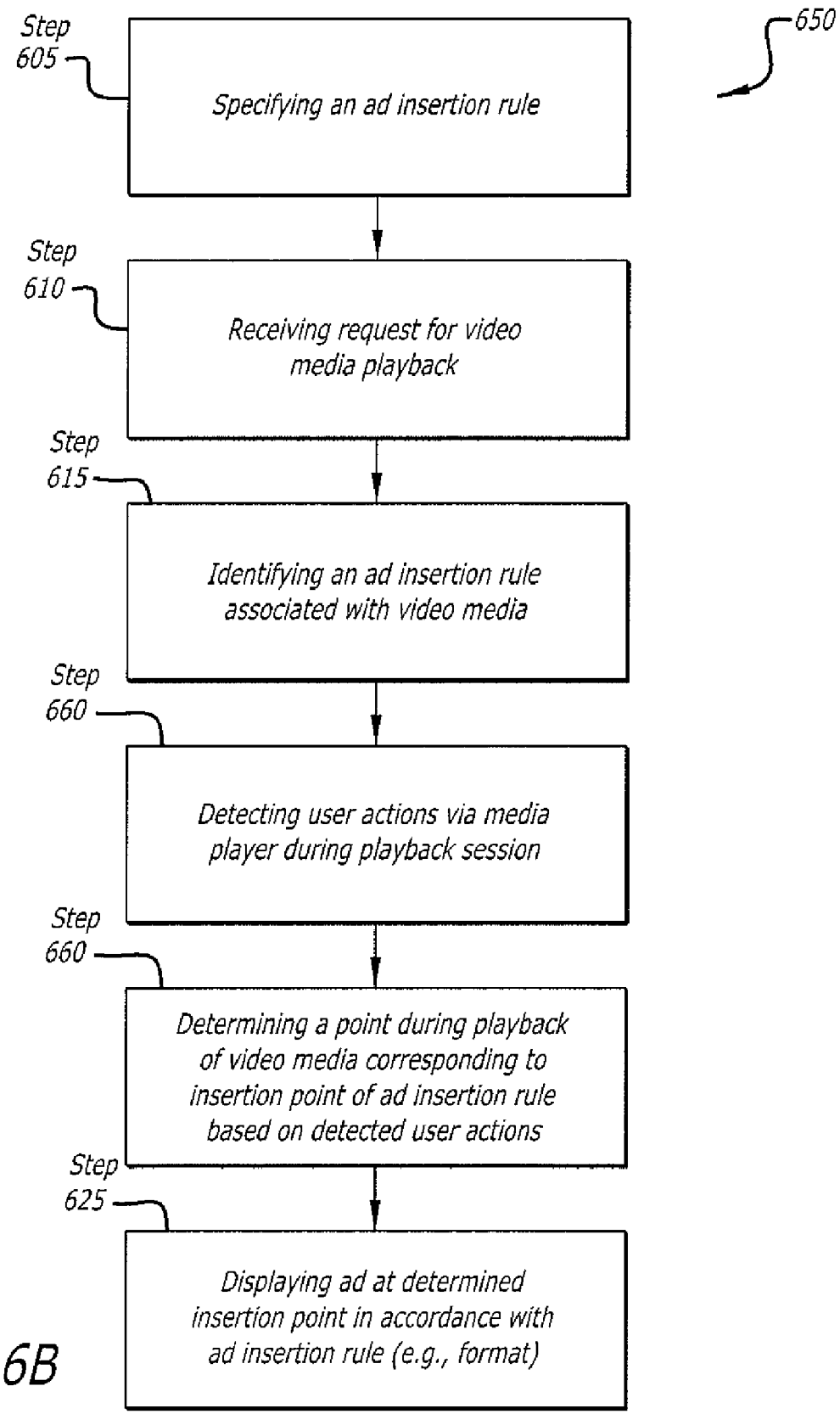
FIG. 6B is a flow diagram of steps performed in practicing another embodiment of inserting ads during playback of video media via ad insertion rules based on user actions via a media player.
Figure 6C:
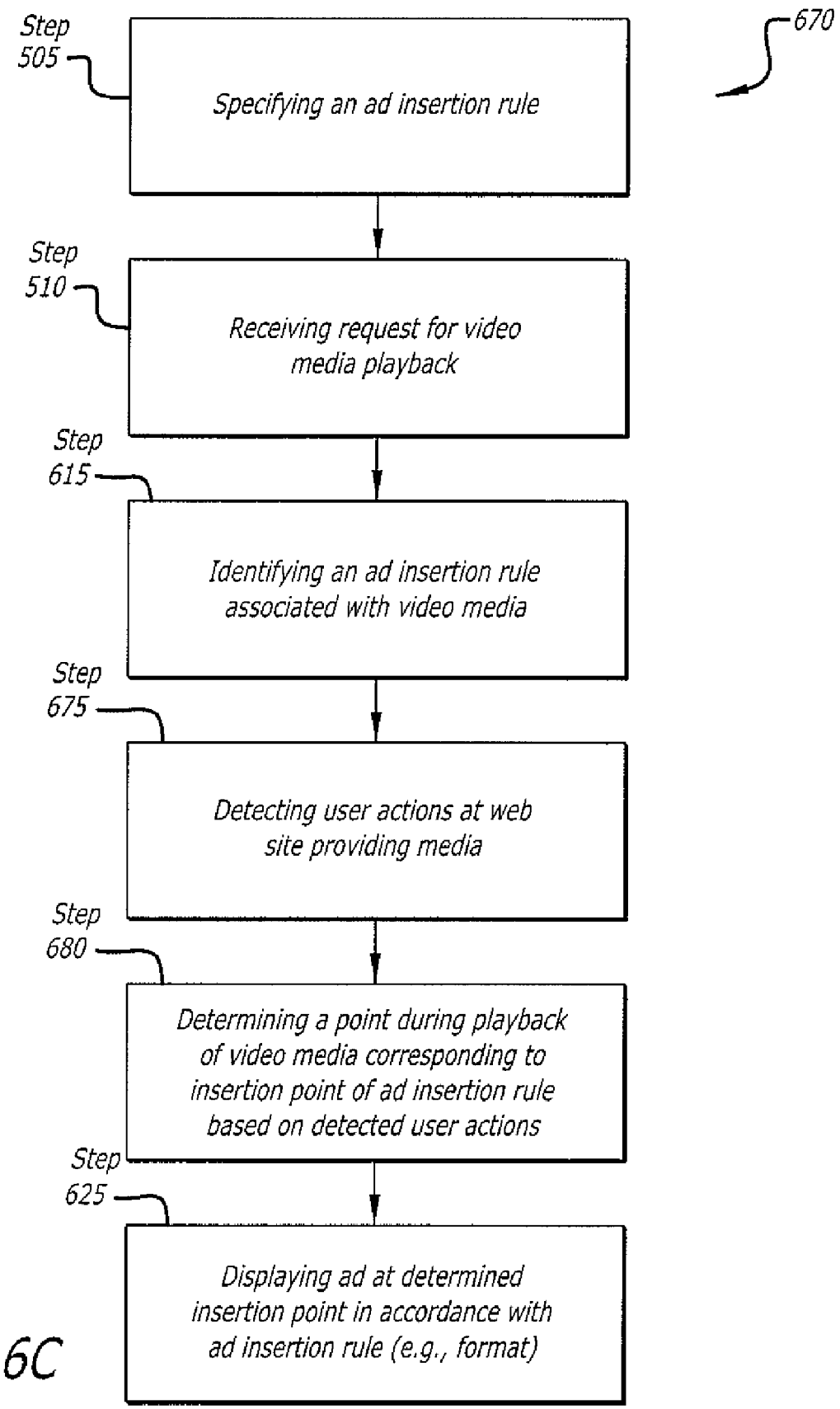
FIG. 6C is a flow diagram of steps performed in practicing another embodiment of inserting ads during playback of video media via ad insertion rules based on user actions via a site providing the video media.

Referring now to FIGS. 6A-6C, embodiments of methods of using and applying ad insertion rules to the delivery of ads during playback of video media are depicted. FIG. 6A is directed to an embodiment of a method for delivering an ad during playback of video media based on an insertion point specified by an ad insertion rule. FIG. 6B is directed to an embodiment of a method for delivering an ad during playback of video media based on one or more actions by the user via the media player. FIG. 6C is directed to an embodiment of a method for delivering an ad during playback of video media based on one or more actions by the user at a web site.

In brief overview and now referring to FIG. 6A, at step 605 of method 600, a user specifies or the media platform 200 provides an ad insertion rule 420. At step 610, the media platform 200 receives a request for playback of a video media, such as an on-demand video. At step 615, the media platform 200, such as via the stream composition service 435, identifies one or more ad insertion rules 420 associated with or otherwise to be used for the requested video media. At step 620, the media platform 200 and/or stream composition service 435 determines a point during the playback of the video media corresponding to an insertion point specified by the identified ad insertion rule 420. At step 625, in response to the determination, the media platform 200 and/or stream composition service 435 displays an ad at the determined insertion point in accordance with the ad insertion rule 420, such as using the ad type specified by the rule 420.

In further detail, at step 605, one or more ad insertion rules 420 may be specified or identified. In one embodiment, the media platform 200 provides one or more predefined or system rules 420. In another embodiment, the stream composition service 435 has one or more built-in or predefined rules 420. In other embodiments, a user via an ad builder 420 configures or specifies one or more ad insertion rules 420. In some embodiments, a user modifies a predefined rule provided by the media platform 200 or stream composition service 435. In another embodiment, a user selects a predefined rule and creates a user specified rule. The ad insertion rule 420 may include a static rule, a dynamic rule or a progressively dynamic rule.

The ad insertion rule 420 may specify any type and form of ad format 422 and/or rule criteria 430. The ad insertion rule may specify for the ad format a length for displaying the ad, a location of the ad, and/or a type of ad. In one embodiment, the ad insertion rule specifies a frequency for a plurality of insertion points. In another embodiment, the ad insertion rule specifies a frequency for displaying an ad during playback of the video media based on a length of the video media. In some embodiments, the ad insertion rule specifies a format displaying an ad during playback of the video media based on a length of the video media.

At step 610, the media platform 200 receives a request to playback a video media. In one embodiment, a user requests playback of the video media. For example, the user may select the video from a link or URL of a web-site. In another embodiment, a web page, program, service or application may request playback of the video media. For example, a web page may include scripts, instructions or other content requesting playback of the video media. In another example, a media player 215 may request playback of the video media. In some embodiments, upon displaying or serving a web page, a video media may be configured to automatically start playing.

In one embodiment, the media platform 200 and/or stream composition service 435 identifies a popularity rating of the requested video. The popularity rating may be based on a number of views or may be based on user generated/provided ratings. For example, the most popular rated video may be based on the video having the highest number of views or having the highest average rating. In some embodiments, the media platform 200 and/or stream composition service 435 identifies the user requesting playback of the video media. The stream composition service 435 may obtain a profile 426 and/or a behavior history 427 of the identified user. For example, via the profile of the identified user the stream composition service 435 may obtain one or more of the following information: name, age group, topics of interest, gender, geographic location, ethnic background, household income, education level, and children in household. In another example, the stream composition service 435 may obtain via the behavior history of the identified user one or more of the following information: average viewing period, trend in popular topics, number of streams, days and hours of streaming, and Internet protocol address mapping to location. The stream composition service 435 may also obtain via the behavior history of the identified user one or more of the following user actions via a media player: mute, pause, restart, full screen, mid point viewing, complete viewing, fast forward, and rewind. The stream composition service 435 may also obtain information on user actions, such as mouse overs, hovers, ad user initiated play via a click through.

At step 615, the media platform and/or stream composition service 435 identifies one or more ad insertion rules to apply during playback of the requested video media. In some embodiments, the stream composition service 435 identifies an ad insertion rule as associated with or assigned to the requested video media. In one embodiment, the stream composition service 435 identifies an ad insertion rule as associated with or assigned to a video media based on metadata. In other embodiments, the stream composition service 435 identifies an ad insertion rule as associated with or assigned to a playlist having the requested video media. In one embodiment, the stream composition service 435 identifies an ad insertion rule as associated with the user requesting the video media. In another embodiment, the stream composition service 435 identifies an ad insertion rule as associated with or assigned to an affiliate. In some embodiments, the stream composition service 435 identifies an ad insertion rule as associated with or assigned to a geographic location, such as to the IP address originating the request to playback the video media. In yet another embodiment, the stream composition service 435 identifies an ad insertion rule as associated with or assigned to a video media based on any rule criteria 435. In one embodiment, the media platform 200 and/or stream composition service 435 identifies a popularity rating of the ad to be delivered via the identified ad insertion rule.

At step 620, the stream composition service 435 determines a point during the playback of the video media corresponding to an insertion point of the identified ad insertion rules. The stream composition service 435 may monitor the duration of the video playback and any user actions, activity or lack thereof during the playback. In some embodiments, the stream composition service 435 may query or monitor any data collected or stored via the data acquisition service 440. In other embodiments, the stream composition service 435 interfaces or is in communication with the media player 215. From the media player, the stream composition service 435 may receive information on the status and activity of playback, such as the duration of playback and any user actions taken via the media player 215. In yet another embodiment, the media platform 200, or a server thereof, provides information on the status and activity of the playback of the video media. In some embodiments, the stream composition service 435 checks for cue points associated with the playback of the video media, such as via a log file or via metadata associated with the video media. In another embodiment, the stream composition service 435 monitors a log file providing information on status of the playback of the video media.

As the playback of the video media progresses, and as events occur, the stream composition service 435 determines if any of the insertion points of any identified ad insertion rule corresponds to the status of playback and/or any associated events. In one embodiment, the stream composition service 435 determines a duration of playback corresponds to the temporal information specified by the insertion point of the ad insertion rule, such as frequency. For example, the stream composition service 435 may determine that a point during playback of the video media corresponds to a period of time indicated by the frequency. In another embodiment, the stream composition service 435 determines an event related to playback, such as a user action, corresponds to the insertion point of the ad insertion rule. In some embodiments, the stream composition service 435 determines that a point in playback of the video media corresponds to the insertion point specified by the ad insertion rule based on the profile or the behavior history of the identified user, such as the user identified at step 610. In one embodiment, the stream composition service 435 determines that a point during playback of the video media corresponds to the insertion point specified by the ad insertion rule based on a popularity rating for the requested video and/or the ad to be delivered.

In yet another embodiment, the stream composition service 435 uses one or more timers for insertion points. For example, upon starting or activating playback of the video media, the stream composition service 435 may set a timer corresponding to the time of an insertion point. If the insertion point specifies a frequency of every 10 seconds, then the stream composition service may use a timer to trigger an event every 10 seconds. The timer may be started at the start of playback. In some embodiment, the stream composition service 435 evaluates rule criteria 435 to determine a corresponding insertion point has been reached during playback of the video media.

At step 635, the stream composition service 435 displays an ad at the determined insertion point in accordance with the identified ad insertion rule. Upon determining the status, duration or activity of playback corresponds to an insertion point, the stream composition service 435 displays, delivers or otherwise runs an ad. The ad insertion rule may specify a format 422 for the ad, such as the type of ad, location and/or duration. In response to the ad insertion rule, the stream composition service 435 may display the type of ad at a location and for a duration as specified by the rule. For example, the ad insertion rule may specify and the stream composition service 435 may display one or more of the following ad types: gateway, interstitial, bumper, context positioning, a spot, a bug, telescoping, interactive video, video curtains, video roadblocks, ticker lay, and shadow ad.

In some embodiments, the stream composition service displays the ad at a location, for a length of time or having a predetermined ad type based on the profile and or the behavior history of the identified user. In one embodiment, the stream composition service 435 displays the ad for the length specified by the ad insertion rule based on the length of the requested video media. In another embodiment, the stream composition service 435 displays the ad at the location specified by the ad insertion rule based on the length of the requested video media. In some embodiments, the stream composition service 435 may evaluate any rule criteria 430 to determine the ad format 422 for delivering the ad.

Now referring to FIG. 6B, an embodiment of steps of method 650 for delivering an ad based on detected user actions via the media player is depicted. At step 605 of method 650, a user specifies or the media platform 200 provides an ad insertion rule 420. At step 610, the media platform 200 receives a request for playback of a video media, such as an on-demand video. At step 615, the media platform 200, such as via the stream composition service 435, identifies one or more ad insertion rules 420 associated with or otherwise to be used for the requested video media. At step 655, the media platform 200, the stream composition service and/or the media player 215 detects one or more user actions during the user's playback session, such as the user pausing the playback or the length of time of the session. At step 660, the media platform 200 and/or the stream composition service 435 determines a point during the playback of the video media corresponding to an insertion point specified by the identified ad insertion rule 420 and based on the detected user actions. At step 625, in response to the determination, the media platform 200 and/or stream composition service 435 displays an ad at the determined insertion point in accordance with the ad insertion rule 420, such as using the ad type specified by the rule 420.

As discussed above in connection with an embodiment of method 600 of FIG. 6A, at step 605, one or more ad insertion rules 420 may be specified or identified, at step 610, a request to playback a video media is received, and at step 615, the media platform and/or stream composition service 435 identifies one or more ad insertion rules to apply during playback of the requested video media. In the embodiment of method 650, the method at steps 655 and 660 use actions of the user during the playback session to trigger or apply the ad insertion rule.

A playback session may include any type and form of session with an application, player, service, server or web-site associated with the playback of the video media. In one embodiment, a playback session includes a session with a media player, such as from the time a media player is executed or playback is initiated to a time the media player is terminated or playback is completed or terminated. In another embodiment, the playback session includes a session with a web-site, such as a user's visit to one or more web pages. For example, a user may login to a web-site to use services provided by the web-site. In some embodiments, the playback session includes a session with the media platform. For example, a user may access a web-site via the media platform or the user may register and login to the media platform.

In further detail, at step 655, the media platform 200, stream composition service 435, and/or media player 215 detects one or more user actions via the media player 215 during a playback session. In some embodiments, the media platform 200, stream composition service 435, and/or media player 215 detects the user has taken one or more of the following actions via the media player: 1) mute, 2) pause, 3) restart, 4) full screen, 5) fast forward, and 6) rewind. In one embodiment, the media platform 200, stream composition service 435, and/or media player 215 detects a length of time of the playback session. In some embodiments, the media platform 200, stream composition service 435, and/or media player 215 determines the detected length of time is greater than or less than a predetermined length of time, such as a predetermined length of time set as a rule criteria 430.

At step 660, the media platform 200 and/or stream composition service 435 determines a point during playback of the video media corresponds to an insertion point of the identified as insertion rule based on a detected user action. For example, the stream composition service 435 may determine a detected user action corresponds to rule criteria 435 of the ad insertion rule. The rule criteria 430 may be associated with or identify a frequency or temporal information to use for insertion based on a user action. In another example, the stream composition service 435 determines the detected user action equates to an insertion point specified by the ad insertion rule.

In some embodiments, the stream composition service 435 changes an ad insertion rule or otherwise applies a dynamic ad insertion rule based on detected actions of the user. For example, in one embodiment, the stream composition service 435 via an ad insertion rule may change the frequency of ad insertion or the format of the ad based on the detected one or more actions of the user. In another example, the stream composition service 435 via an ad insertion rule may change location of the ad or a length of time for displaying the ad based on the detected one or more actions of the user. In other embodiments, the stream composition service 435 applies a progressively dynamic ad insertion rule based on the detected actions of the user.

At step 625 as previously discussed above in connection with method 600 of FIG. 6A, the stream composition service 435 displays an ad at the determined insertion point in accordance with the identified ad insertion rule. Upon determining the status, duration or activity of playback corresponds to an insertion point, the stream composition service 435 displays, delivers or otherwise runs an ad. The ad insertion rule may specify a format 422 for the ad, such as the type of ad, location and/or duration. In response to the ad insertion rule, the stream composition service 435 may display the type of ad at a location and for a duration as specified by the rule. The detected user action may identify or change the ad format, location and/or duration to display or deliver the ad.

Now referring to FIG. 6C, a method 670 for an embodiment of steps of method 650 for delivering an ad based on detected user actions at a web site is depicted. At step 605 of method 650, a user specifies or the media platform 200 provides an ad insertion rule 420. At step 610, the media platform 200 receives a request for playback of a video media, such as an on-demand video provided via a web-site. At step 615, the media platform 200, such as via the stream composition service 435, identifies one or more ad insertion rules 420 associated with or otherwise to be used for the requested video media. At step 675, the media platform 200, the stream composition service 435 and/or the media player 215 detects one or more user actions at the web site, such as the user selecting a URL or length of visit as the web-site. At step 680, the media platform 200 and/or the stream composition service 435 determines a point during the playback of the video media corresponding to an insertion point specified by the identified ad insertion rule 420 and based on the detected user actions at the web-site. At step 625, in response to the determination, the media platform 200 and/or stream composition service 435 displays an ad at the determined insertion point in accordance with the ad insertion rule 420, such as using the ad type specified by the rule 420.

As discussed above in connection with an embodiment of method 600 of FIG. 6A, at step 605, one or more ad insertion rules 420 may be specified or identified, at step 610, a request to playback a video media is received, and at step 615, the media platform and/or stream composition service 435 identifies one or more ad insertion rules to apply during playback of the requested video media. In the embodiment of method 670, the method at steps 675 and 670 use actions of the user at a web-site to trigger or apply the ad insertion rule.

In further detail, at step 675, the media platform 200 and/or stream composition service 435 detects one or more actions of the user at a web-site. In some embodiments, the media platform 200 and/or stream composition service 435 detects a length of the user's visit at the web site. The stream composition service 435 may detect the length of the user's visit is greater than or less than a predetermined length of time, such as a length of time set by rule criteria 430. In other embodiments, the media platform 200 and/or stream composition service 435 a type of content the user viewed at the web-site. In another embodiment, the media platform 200 and/or stream composition service 435 detects one or more user interface element selected by the user at the web-site, such as a hyperlink or URL.

At step 680, the media platform 200 and/or stream composition service 435 determines a point during playback of the video media corresponds to an insertion point of the identified as insertion rule based on user activity or actions at the web-site. For example, the stream composition service 435 may determine a user behavior detected at the web-site corresponds to rule criteria 435 of the ad insertion rule. The rule criteria 430 may be associated with or identify a frequency or temporal information to use for insertion based on web site behavior In another example, the stream composition service 435 determines the detected user behavior equates to an insertion point specified by the ad insertion rule.

At step 635, the stream composition service 435 displays an ad at the determined insertion point in accordance with the identified ad insertion rule. Upon determining the status, duration or activity of the user at the web site corresponds to an insertion point, the stream composition service 435 displays, delivers or otherwise runs an ad. The user activity and actions at the web site may cause the ad format—type, location and/or—to change via application of one or more dynamic or progressively dynamic ad insertion rules.

Figure 7A:
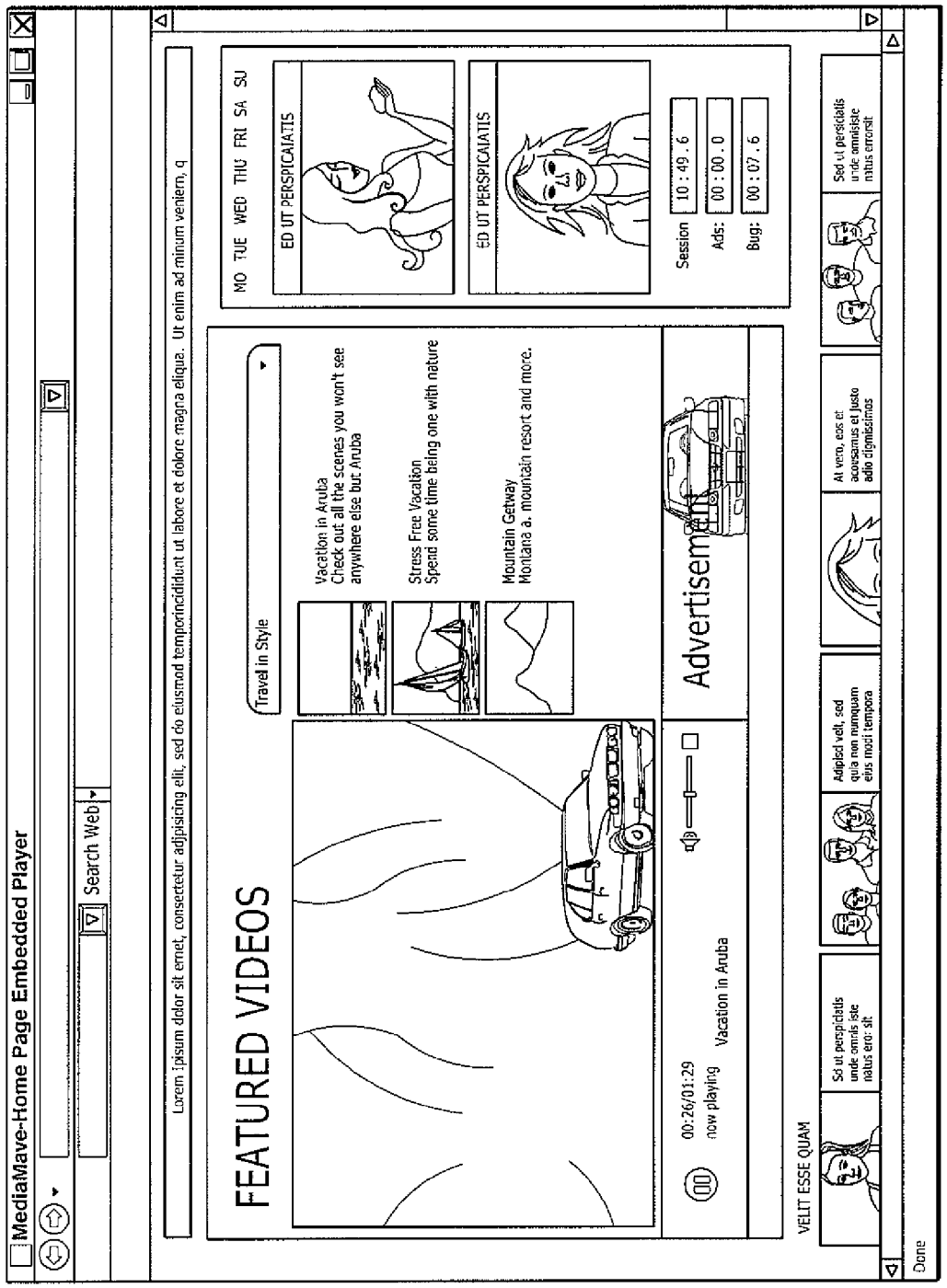
FIG. 7A is a pictorial view of an example embodiment of an ad inserted during playback of a video media.
Figure 7B:
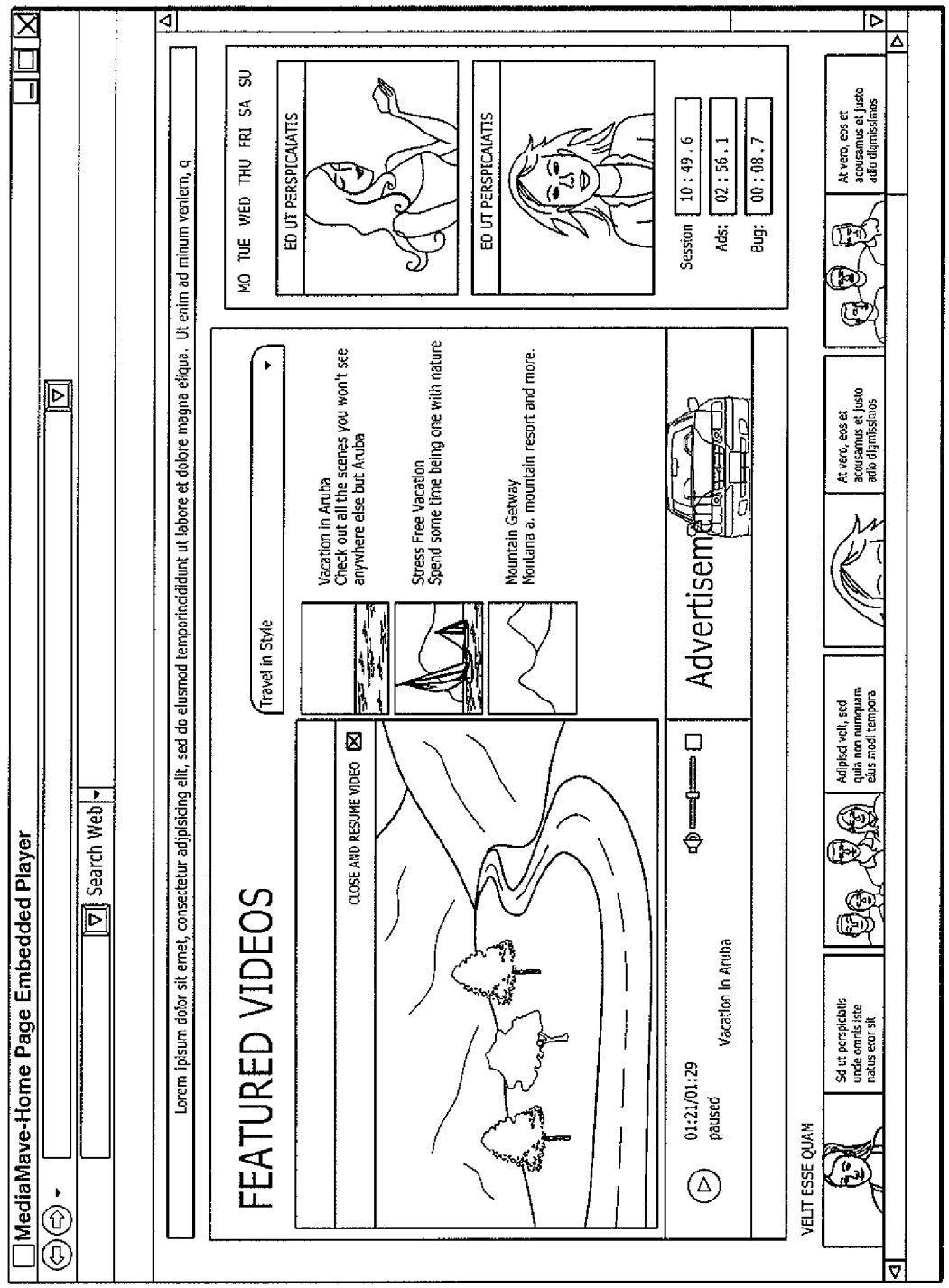
FIG. 7B is a pictorial view of an example embodiment of an ad displayed after selecting the ad inserted during playback of a video media as depicted in FIG. 7A.
Figure 7C:
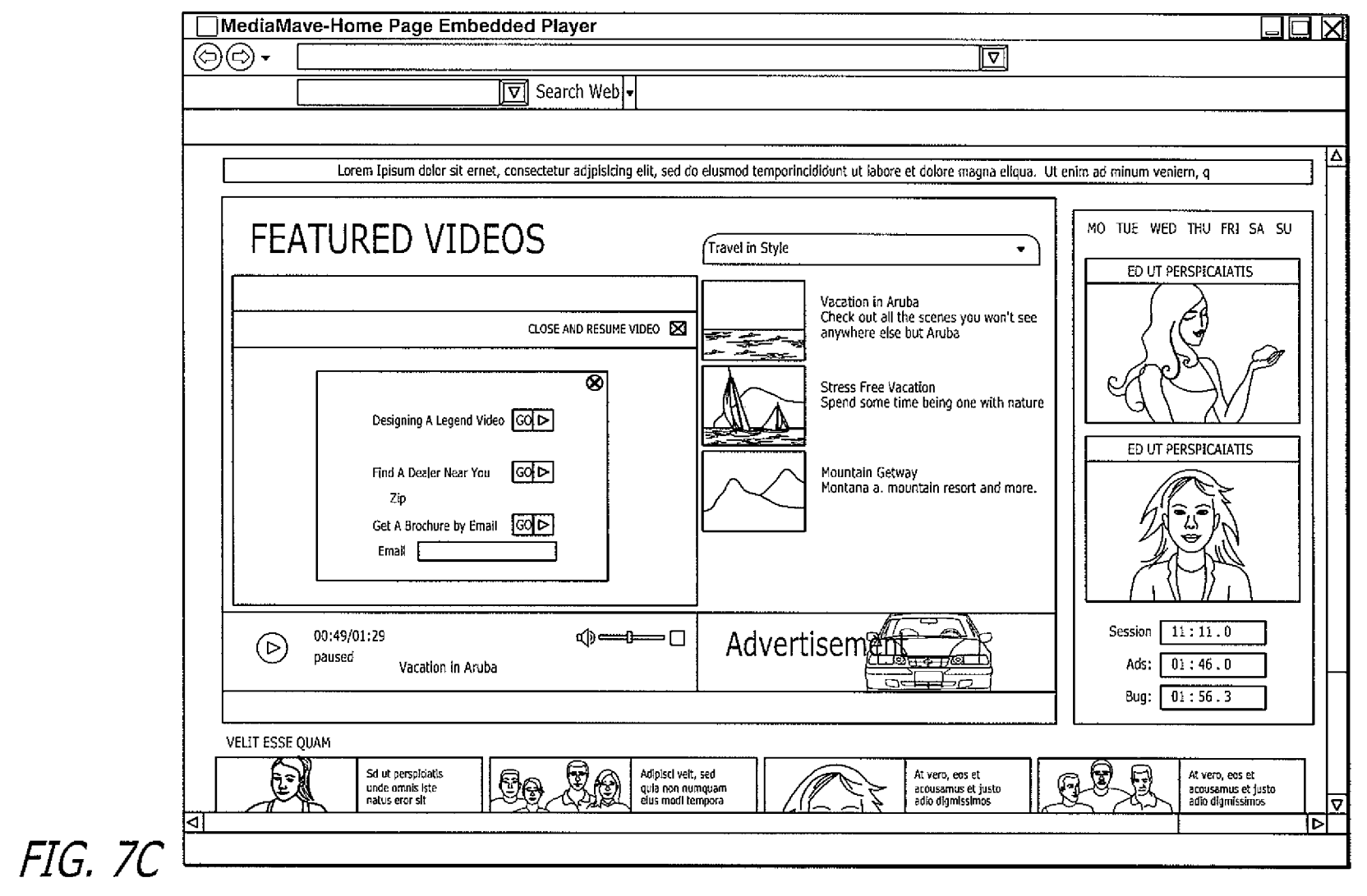
Figure 7D:
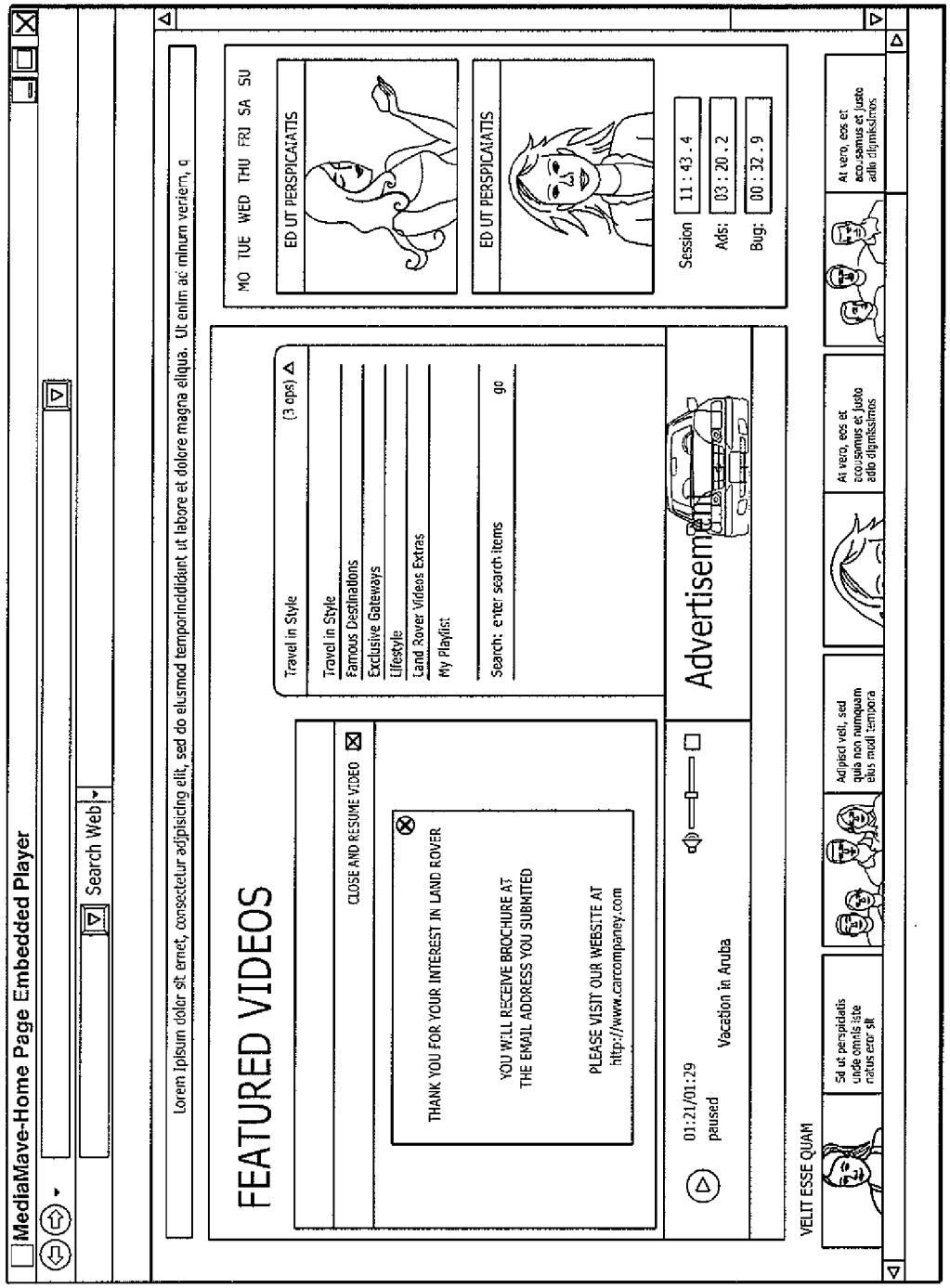
FIG. 7D is a pictorial view of an example embodiment of submission feedback and availability of new video media after completing the call for action depicted in FIG. 7C.
Figure 7E:
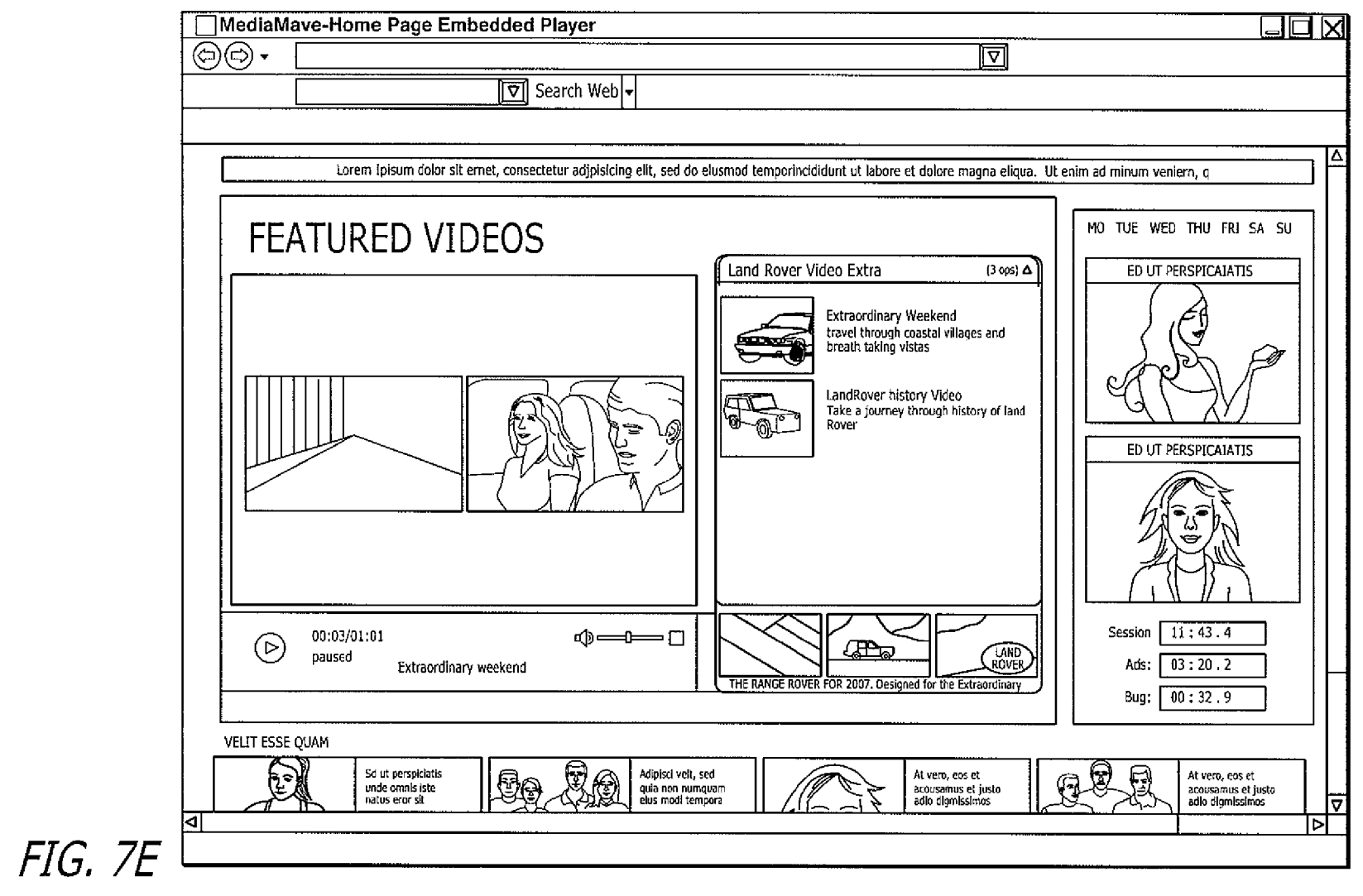

Referring now to FIGS. 7A-7E, example screen shots of application of ad insertion rules during playback of video media via the systems and methods described herein are depicted. In brief overview, FIG. 7A illustrates an example embodiment of an ad inserted during playback of a video media. FIG. 7B illustrates an example embodiment of an ad video clip displayed after selecting the first ad inserted during playback of a video media as depicted in FIG. 7A. FIG. 7C illustrates an example embodiment of a call for action at an end of the video ad depicted in FIG. 7B. FIG. 7D illustrates an example embodiment of submission feedback and availability of new video media after completing the call for action depicted in FIG. 7C. FIG. 7E illustrates an example embodiment of making new video clips available as a result of a user taking a call for action.

Referring now to FIG. 7A, a web-site delivered via the media platform 200 to present video with an embedded player is depicted. In this example, a published video channel regarding travel is presented to the user. The video channel may include a playlist of three video clips entitled "Vacation in Aruba", "Stress Free Vacation" and "Mountain Getaway". A user may select one of the video clips from the playlist. In some cases, the embedded player 215 automatically plays a first video clip in the playlist, such as the "Vacation in Aruba" video clip. During the playback of this video clip, the media platform 200 via the stream composition service 435 may apply an ad insertion rule to deliver a bug type ad related to cars, such as the Land Rover bug style ad displayed at the bottom of the video. The ad insertion rule may specify the location (e.g., bottom of video), an ad type (e.g., bug style ad), and a duration for displaying the ad. In some embodiments, the media platform and/or stream composition service 435 may stop the playback of the video to display the ad. In other embodiments, the playback of the video may continue while the bug ad is displayed.

Referring to FIG. 7B. the result of the user selecting the delivered bug ad of FIG. 7A is depicted. For example, a user may have selected the bug ad as shown in FIG. 7A at the bottom of the video. In response, the media platform 200 and/or stream composition service 435 may stop the playback of the video. The stream composition service 435 may deliver a second ad by applying an ad insertion rule based on the user's action of selecting the bug style ad. As shown in FIG.

7B, the delivered ad may be a video ad related to the advertised car. The user may watch this video ad for any duration. A user interface element is presented to the user to close the video ad and resume playback of the original video, e.g., the "Vacation in Aruba" video of FIG. 7A.

Referring to FIG. 7C, the media platform and/or stream composition service may deliver via an ad insertion rule or otherwise a call to action at the end of playing the video ad delivered as depicted in FIG. 7B. For example, an ad insertion rule may insert a graphical user interface, application or program at the end of the playback of the video ad. In the illustrated example, the call to action may provide user interface elements, such as form field and hyperlinks, to provide user options to submit information or traverse to another video or web-page. In the example, a user may select a button to go to another video clip entitled "Designing a Legend Video". The user may also enter a zip code and select a button to find a car dealer near the user's location. Also, the user may enter an email address to get sent a brochure electronically. The user may close the call to action user interface and take no requested or prompted action.

Referring to FIGS. 7D and 7E, screen shots of a user interface presented to the user after submitting information via the call to action screen of FIG. 7C is depicted. The user may have submitted email information to receive a brochure. In response to this submission, the media platform, web-site or stream composition service presents a user interface as shown in FIG. 7D acknowledging the received submission. In one embodiment, the acknowledgment screen of FIG. 7D is part of the call to action user interface and functionality. The user interface may present a link or URL to a web-site the user may want to visit related to the advertisement. By submitting the email to the advertiser, additional video clips may be unlocked or presented to the user, such as those video clips illustrated in FIG. 7E.

Data Collection and Reporting Ad Insertion Rule Usage

As introduced in FIG. 4A and described in further detail below via FIGS. 8A-8C, the ad platform 365 includes a data acquisition service 440 and reporting service 450. The data acquisition service 440 collects data on the usage of ad insertion rules and the delivery of ads therefrom. The reporting service 450 generates a number of usage reports from the collected data to provide information on the usage of the ad insertion rules and delivery of ads via these rules.

As described herein, the media platform 200 provides and integrates to a comprehensive set of services. The media platform provides services to ingest, publish, and deliver online and on-demand broadband content and video media, and to dynamically deliver ads during playback of on-demand video based on ad insertion rules. The media platform 200 is also integrated with other services and networks including distributors, affiliates, content distribution networks and ad networks, and interfaces to other systems, such as digital asset management systems and content management systems. As such, the media platform 200 has access to a rich source of information and data from the services the media platform provides as well as those services and systems to which the media platform communicates or interfaces. From this information and data, the media platform collects data and generates reports to measure and identify the operation, performance and effectiveness of the media platform and ad insertion rules.

Figure 8A:
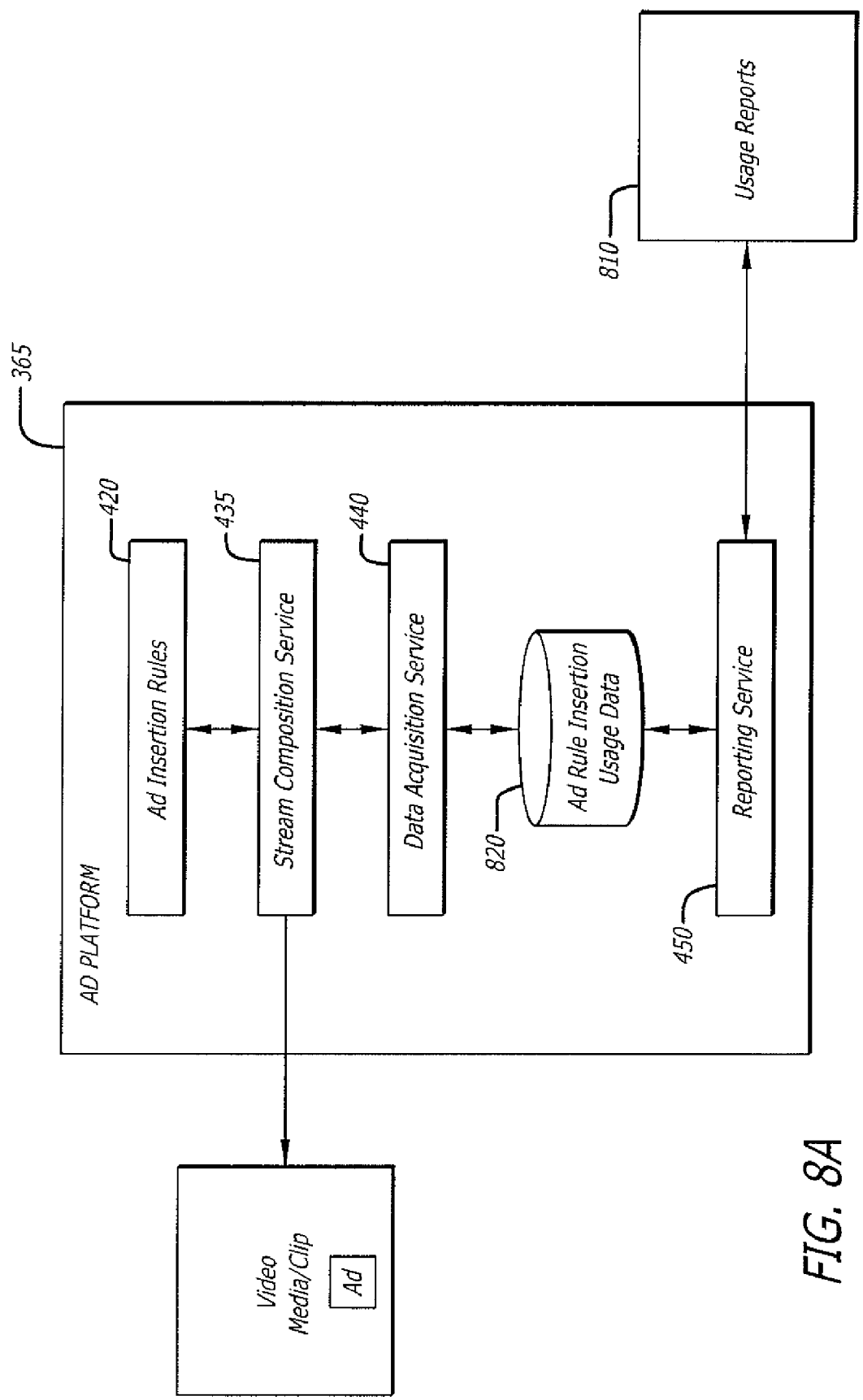
FIG. 8A is a block diagram of an embodiment of data acquisition and reporting services of an embodiment of the ad services platform.
Figure 8B:
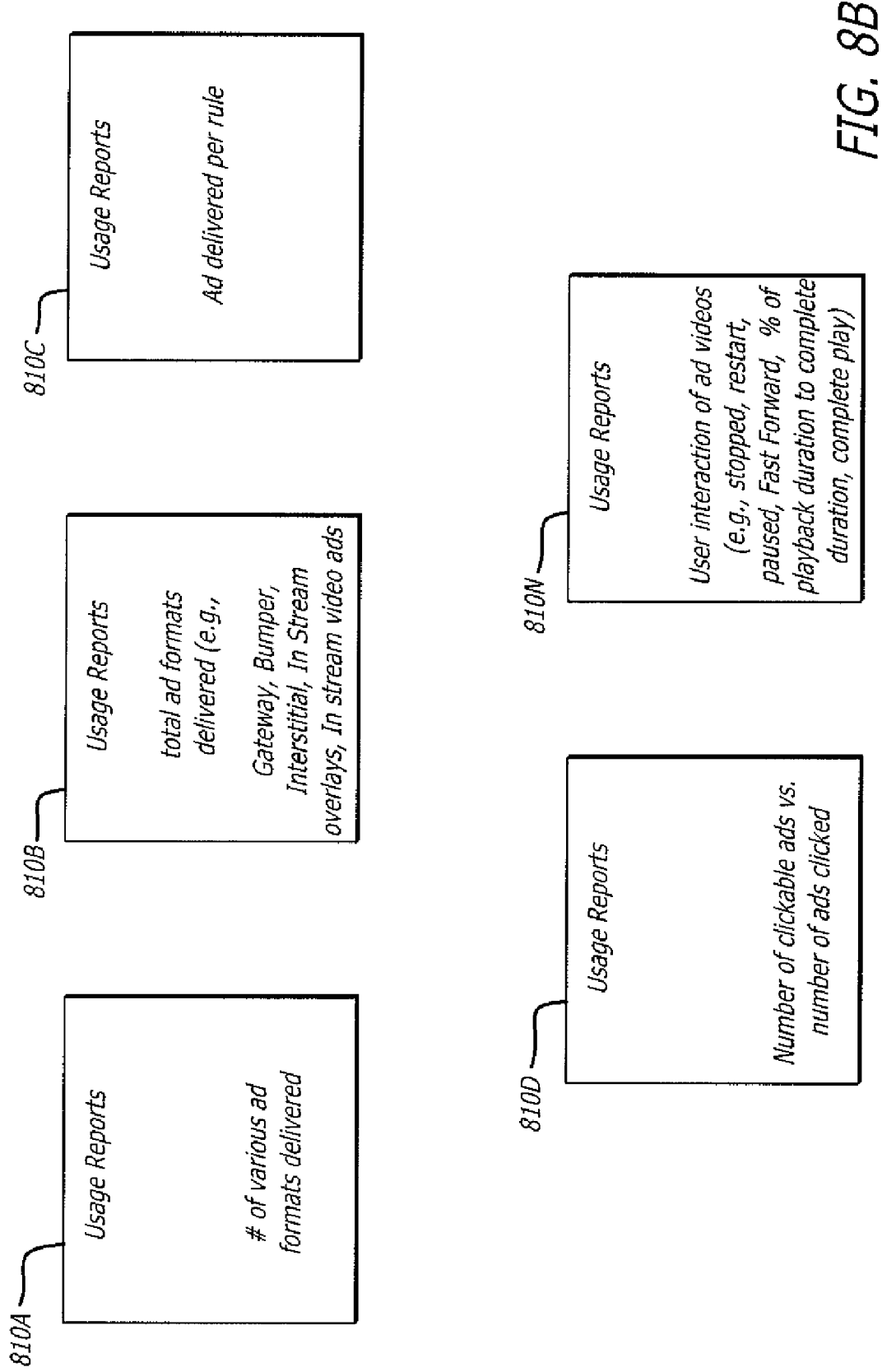
FIG. 8B depicts example embodiments of usage reports delivered via the ad services platform.

Referring now to FIG. 8A, an embodiment of the ad platform 365 for collecting data via the data acquisition service 440 and generating usage reports via the reporting service 450 is depicted. In brief overview, the ad platform 365 delivers via the stream composition service 435 video media to one or more users. As previously discussed above, the stream composition service 435 delivers ads at configurable insertions points during the playback of the video media. The insertion points may be specified by one or more ad insertion rules 420. A data acquisition service 440 collects data and events associated with the delivery of video and ads, such as information on the delivery of ads via application of ad insertion rules 420. The data acquisition stores data and information in a data storage 820. A reporting service 450 provides a reporting tool to generate usage reports 810 from the collected data stored in the data storage 820.

In further detail, the data acquisition service 440 may include any type and form of interface, mechanisms and executable instructions to received, intercept or otherwise obtain data, events, messages and/or communications related to the operation and/or performance of any portion of the media platform and/or system or service in communication with or integrated to the media platform 200. In one embodiment, the data acquisition service acts as a subscription agent. The data acquisition service 440 may subscribe to any events, information or messages provided by any service or any portion of the media platform 200. For example, the data acquisition service 440 may subscribe to events generated when an ad is played back and to related users actions via a media player (e.g., fast forwarded). In other embodiments, the data acquisition service 440 provides an application programming interface (API). Any of the services of the media platform or any external systems and services may communicate via the API to provide data and information to the data acquisition service 440. In some embodiments, the data acquisition service 440 finds, searches and obtains data via any log files. For example, in one embodiment, the data acquisition service 440 searches log files generated by the media player 215 or logs generated or provided by a content distribution network.

The data acquisition service 440 may parse any received or obtained information and data into appropriate datum and store the information to the data storage 820. The data storage 820 may comprise any type and form of database such as an SQL database, relational database or an object based or object oriented database. The data storage may comprise any version of the SQL Server database manufactured by Microsoft Corporation of Redmond, Wash., and any version of the Oracle database from Oracle Corporation of Redwood Shores, Calif. In some embodiments, the data acquisition service 440 may communicate with the data storage 820 using a database access technology, such as for example the Open Database Connectivity standard (ODBC), or Java Database Connectivity (JDBC). The data storage 820 may comprise a file, file system, Excel spreadsheet, or any other form of storage that may store and organize information in a logical manner. In one embodiment, the data storage 820 comprise data structures or objects of a program, library or other form of executable instruction, or may comprise data stored in some form of memory.

In some embodiments, the data acquisition service 440 may filter, translate, transform, manipulate or otherwise manage the data and information stored to the data storage 820. In one embodiment, the data acquisition service 440 performs any statistical or mathematical operation or technique on the data to be stored or stored in storage 820. For example, the data acquisition service 440 may calculate average values over a series of values, such as for a time period. In other embodiments, the data acquisition service 440 stores the data and information in a relationship or association, or otherwise establishes relationships in the data store between data. In one embodiment, the data acquisition service 220 organizes and arranges the data in the data storage 820, or the data in the data storage 820 is organized and arranged in a manner to improve, assist or otherwise support the generation of reports, such as any of the usage reports of FIG. 8B discussed below. For example, the data may be stored using any normalization rules and/or to flatten the hierarchy data for users to generate reports.

The data acquisition service 440 may interface to or communicate with the stream composition service 435 to obtain any data or information regarding the operation, performance and effectiveness of the stream composition service 435 and/or delivery of ads via ad insertion rules 420. The data acquisition service 440 may acquire and store any of the following information: 1) number of ads delivered, 2) number of ads delivered per rule, 3) types of ads delivered or ad formats used, 4) number of clickable ads versus number of ads clicked, 5) user interactions with ad or video via the player. The data acquisition service 440 collects and stores data providing temporal information on the insertion points at which ads were displayed during playback of video media. The data acquisition service 440 collects and stores data providing temporal information on duration and occurrence of user events and actions for playback of video media and delivered video ads.

The data acquisition service 440 may store any user information, such as user profile or behavior history, associated with delivery of video and ads. The data acquisition service 440 may store any rule criteria used or applied during the delivery of an ad via an ad insertion rule. In one embodiment, the data acquisition service 440 associates user information with rule criteria and/or with the insertion points at which ads were displayed during playback of video media.

The reporting service 450 may comprise any type and form of analytics, data warehousing, business intelligence and/or reporting tool, application, program or service to generate one or more reports from data stored in the data storage 820. In one embodiment, the reporting tool comprises a software tool that allows a user to build a report based on data in a database 820. These reports may be generated and delivered in an ad-hoc manner. In some embodiments, reports are scheduled to be generated and run automatically at predetermined times or based on policies or business rules. In one embodiment, the reporting service 450 distributes reports, for example, via email, to one or more users, such as a defined group of users or subscribers to the report. In one embodiment, the reporting service 450 includes, uses or interfaces with any of the functionality or products manufactured by WebTrends Inc. of Portland, Oreg. In another embodiment, the reporting service 450 includes, uses or interfaces with any of the Crystal Report products manufactured by Business Objects of San Jose, Calif. In some embodiments, the reporting service 450 reports data via Microsoft Excel or Microsoft Access manufactured by Microsoft Corporation of Redmond, Wash. In other embodiments, the reporting service 450 may include or use any type and form of Online Analytical Processing or OLAP tool.

The reporting service 450 may query, communicate, integrate or interface with the data storage 820 and the data therein using any type and form of communications or interface. In one embodiment, the report services 450 uses ODBC to connect to and obtain data from the data storage 820. In another embodiment, the report services 450 uses JDBC to connection and obtain data from the data storage. In some embodiments, the reporting services 450 uses APIs of the data acquisition service to access data in the data storage 820. For example, the data acquisition service 440 may provide an object-oriented API to access the data storage 820.

The reporting service 450 may provide any type and form of user interface, command line or graphical, for a user to select and generate reports. In one embodiment, the console 210 provides the user interface for the reporting service 450. The user interface may include user interface elements, such as text boxes or combo boxes, for a user to enter or select one or more parameters for generating the report, such as the name of an ad insertion rule or a time period for which to generate the report. The reporting service 450 may provide a user interface for a user to create reports by traversing the organization and hierarchy of data in the data storage 820, and selecting, associating and arranging the data in a report in a desired format.

The reporting service 450 may generate from data in the data storage one or more usage reports 810 providing information on the use of ad insertion rules. For example, the reporting service 450 may generates these reports 810 in response to a user request or automatically as part of a system work flow. Referring now to FIG. 8B, diagrams of example usage reports are depicted. In brief overview, report 810A may provide information on the total ad formats delivered. Report 810B may provide a quantity of different ad formats delivered. Report 810C may provide the number of ads delivered per ad insertion Rule. Report 810D may provide information on the number of clickable ads versus the number of ads clicked.

In further detail, report 810a may provide information on the quantity of each type of ad format delivered. The report 810A may provide quantity information for one ad type, all ad types available or delivered, or selected ad types. A user may be able to select one or more ad types and/or a time period as input parameters to run the report. The report 810A may identify the ad insertion rule(s) used to deliver the ad type. The report 810A may provide any temporal information to identify the insertion points of when the ad types were delivered. The report 810A may identify the video media for which the ad was delivered during playback. The report 810A may also identify any user related information, such as information from the user profile or user behavior history or any user actions taken via the media player or web-site.

The report 810B may provide quantitative information on the total ad formats delivered. For example, the report 810A may identify the total number of ad types delivered via the media platform, via a published video channel, via an affiliate, via a web-site, or to one or more users. The report 810B may provide the totals of ads delivered for all ad types and provide a breakdown of the total according to each ad type, such as for Gateway ads, bumper ads, in-stream overlays, in stream video ads, etc. The report 810B may be provided for a user selected or a predetermined time period. The report 810A may also identify any temporal information regarding the date and time of delivery of the ad, such as which day or time in the day received the highest total of ads.

The report 810C provides information on the delivery of ads on an ad insertion rule basis. This report 810C may identify for one rule, all rules, or a selected set of one or more rules the number and type of ads delivered over any time period. The report 810C may display any temporal information to identify the insertion points triggered by the ad insertion rule. The report 810C may also identify values of any rule criteria at the time of the insertion point. The report 810C may identify the rule criteria that triggered or issued the ad insertion rule or delivery of the ad. The report 810C may provide any information from the user profile, user behavior history or any user actions triggering the rule or associated with the playback of the video media or the delivered ad. The report 810C may provide information on the video media for which the ad insertion rule was applied.

The report 810D provides information on click through effectiveness of any clickable ads delivered via the media platform, such as via an ad insertion rule. The report 810A may display the number of times a clickable ad was delivered over any time period. This report 810A may display the number of times the clickable ad was clicked or selected by a user. The report 810D may display the total number of clickable ads delivered and the total number of times these clickable ads were clicked over any time period. The time period may be user selected or predetermined. The report 810A may also breakdown the number of clickable ad delivered and number of times clicked by any scope, such as for the entire media platform, one or more affiliates, a published video channel, a web-site or to one or more users.

The report 810N provides information on user interaction with any ad videos delivered via the media platform, such as via one or more ad insertion rules. The report 810A may identify any of the actions taken by the user via the media player 215 while the video ad is being delivered or played. For example, the report 810N may identify any player control actions, such as stop, restart, pause and fast forward or rewind. The report 810N may also identify the duration or percentage of playback of the video, the remaining time to complete duration, or whether or the video was completely played. The report 810N may identify any user actions or user activity with respect to a session with the web-site, a session with the media player, such as a playback session, or a session via the media platform 200. For example, the report 810N may identify the length of the user session, or the stop and start times of the user session.

The reporting service 450 may generate and provide any of the reports 810A-810N across any applicable scope of entity of the media platform, such as for each, any or all affiliates, publishers, content owners, distributors, aggregators, users, advertisers, advertising networks. For example, any of the reports 810A-810N may be generated for all ad insertion usage across the media platform or for ad insertion rule for a specific or selected entity. The reporting service 450 may generate and provide any of the reports 810A-810N for any granularity of scope, such as for the usage of an ad insertion rule for a particular time period (days, weeks, months or years) or for the usage of an ad insertion rule at a particular instant in time. The reporting service 450 may generated and provide any of the reports 810A-810N for a combination of scope of entity and ad insertion rules.

Figure 8C:
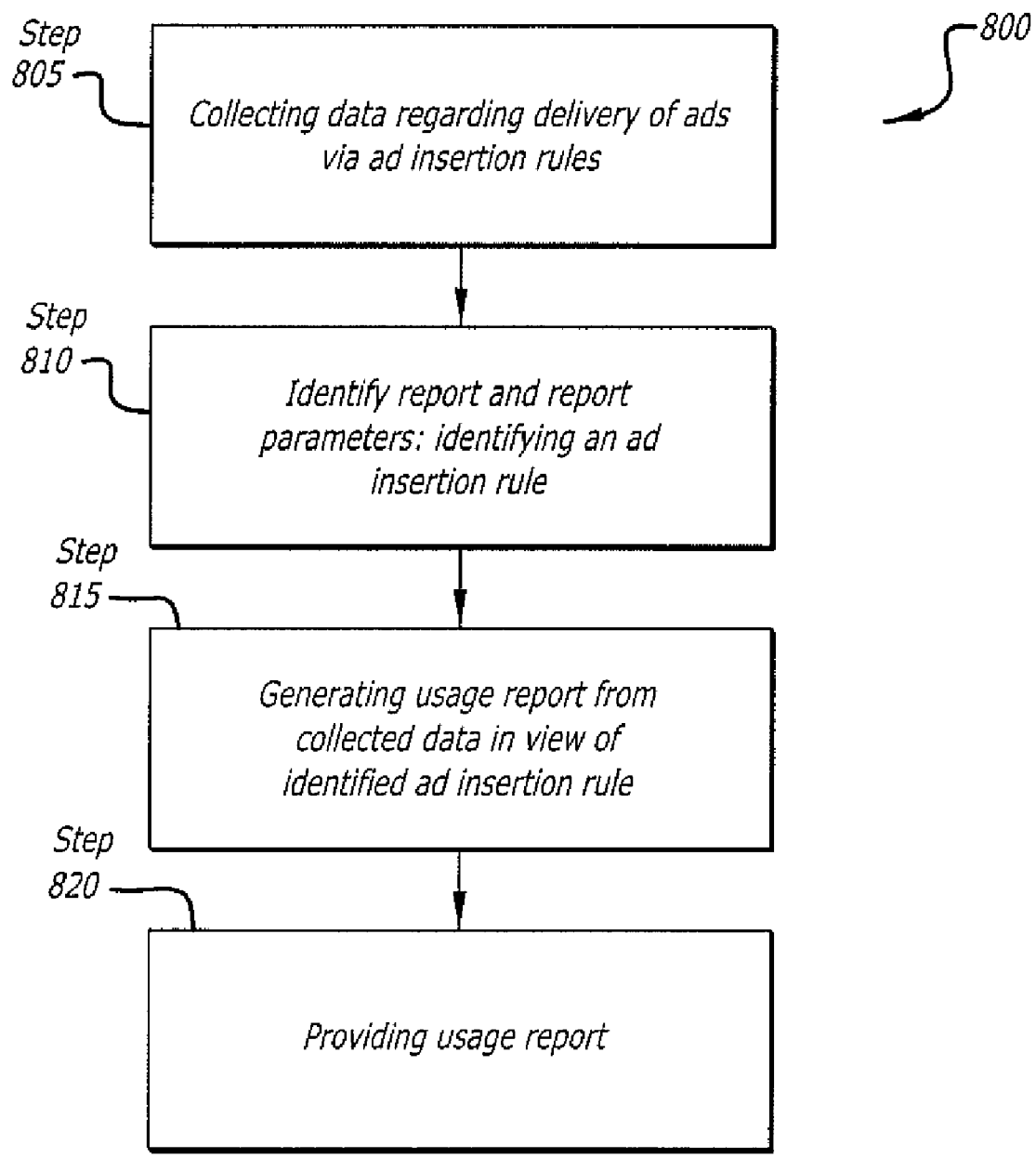
FIG. 8C is a flow diagram of steps of an embodiment of a method for collecting and reporting usage of ad insertion rules.

Referring now to FIG. 8C, an embodiment of steps of a method 800 for providing usage reports regarding ad insertion rules is depicted. In brief overview, at step 805, the data acquisition service 440 collects data regarding the media platform's delivery for ads via one or more ad insertion rules. At step 810, a usage report is identified or selected. Any input parameters to the report may be provided such as identifying an ad insertion rule to run the report for. At step 815, the reporting service 450 generates the usage report from the collected data stored in a data storage by the acquisition service. At step 820, the reporting service 450 provides or distributed the generated report.

In further detail, at step 805, the data acquisition service 440 obtains data regarding the operation, performance and/or effectiveness of the media platform 200 and the delivery of ads via ad insertion rules. The data acquisition service 440 may subscribe to, receive from or request from the stream composition service 435, media player 215 or any other services of the media platform any events, data and information regarding the operation and performance with respect thereto. The data acquisition service 440 may store any information on the delivery of the ads and the usage and triggering of ad insertion rules into the data storage 820. For example, the data acquisition service 440 may store temporal information describing the insertion points at which ads are delivered in accordance with an ad insertion rule. The data acquisition service 440 may store any values of rule criteria related to the triggering of an ad insertion rule. The data acquisition service 440 may obtain and store to the data storage 820 information regarding the following: 1) the number of various ad formats delivered, 2) total number of ad formats delivered by ad type 3) the quantity, time and formats of ads delivered per ad insertion rule, 4) the number of clickable ads versus the number of ads clicked, and 5) user actions and interactions with video ads, media player or web-site.

At step 810, via the reporting service 450, a usage report 810 may be identified and selected for generation. For example, a user may select any one of the usage reports 810A-810N described in FIG. 8B. In some embodiments, the user may select a predefined report. In other embodiments, the user may create a custom report or user defined report. In some cases, the user provides input information to run the report 810, such as a time period. For example, a report may prompt the user for input information. The report may request or a user may provide any information to identify the scope of entity or granularity of data for which to run the report 810. In one embodiment, the reporting service 450 or a user identifies an ad insertion rule for which to obtain a usage report 810. In another embodiment, the reporting service 450 or user identifies a set of ad rules for which to obtain a usage report 810. In yet another embodiment, the reporting service 450 provides a usage report 810 for each of the ad insertion rules configured or defined in the media platform.

At step 815, the reporting service 450 uses the collected data in the data storage 820 to generate and provide a usage report 810. Based on any of the input parameters or identified ad insertion rule(s), the reporting service 450 obtains applicable data and information from the collected data of the data storage. In some embodiments, the reporting service 450 queries, interfaces to or communicated with any service, system, program, application or database to obtain information requested by or needed for a report 810. In one embodiment, the reporting service 450 generates a usage report 810 for one or more identified ad insertion rules. A user may identify the ad insertion rules as an input parameter to a report or by selecting a usage report to run. The reporting service 450 may generate a usage report 810 on a predetermined schedule or frequency, such as in accordance with a business rule or policy. The reporting service 450 may generate a usage report 810 in an ad-hoc manner, such as per a user requesting the report via a user interface.

At step 820, the reporting service 450 provides the generated usage report 810. The reporting service 450 may present the generated report 810 via a user interface, such as the console. In other embodiments, the reporting service 450 may present the generated report 810 via a dashboard. In another embodiment, the reporting service 450 may distribute the generated report 810 via email to one or more users. In other embodiments, the report service 450 may export or provide the data in any desired format, such as comma separated files or for import into Microsoft Excel spreadsheet.

With the dynamic and variable characteristics of both on-demand video and ad insertion and the configurability and flexibility of ad insertion rules, there may be a wide range of results, effects and/or performance of the media platform with respect to the delivery of ads. The reporting systems and methods described herein provide a way to review and measure the effectiveness and performance of ad insertion rules. With feedback provided by these usage reports 810 on the delivery of ads via ad insertion rules, user may change, configure or create ad insertion rules to further optimize or improve the delivery of ads and ad delivering during the playback of video media.

Advertisement Inventory Forecasting

Figure 9A:
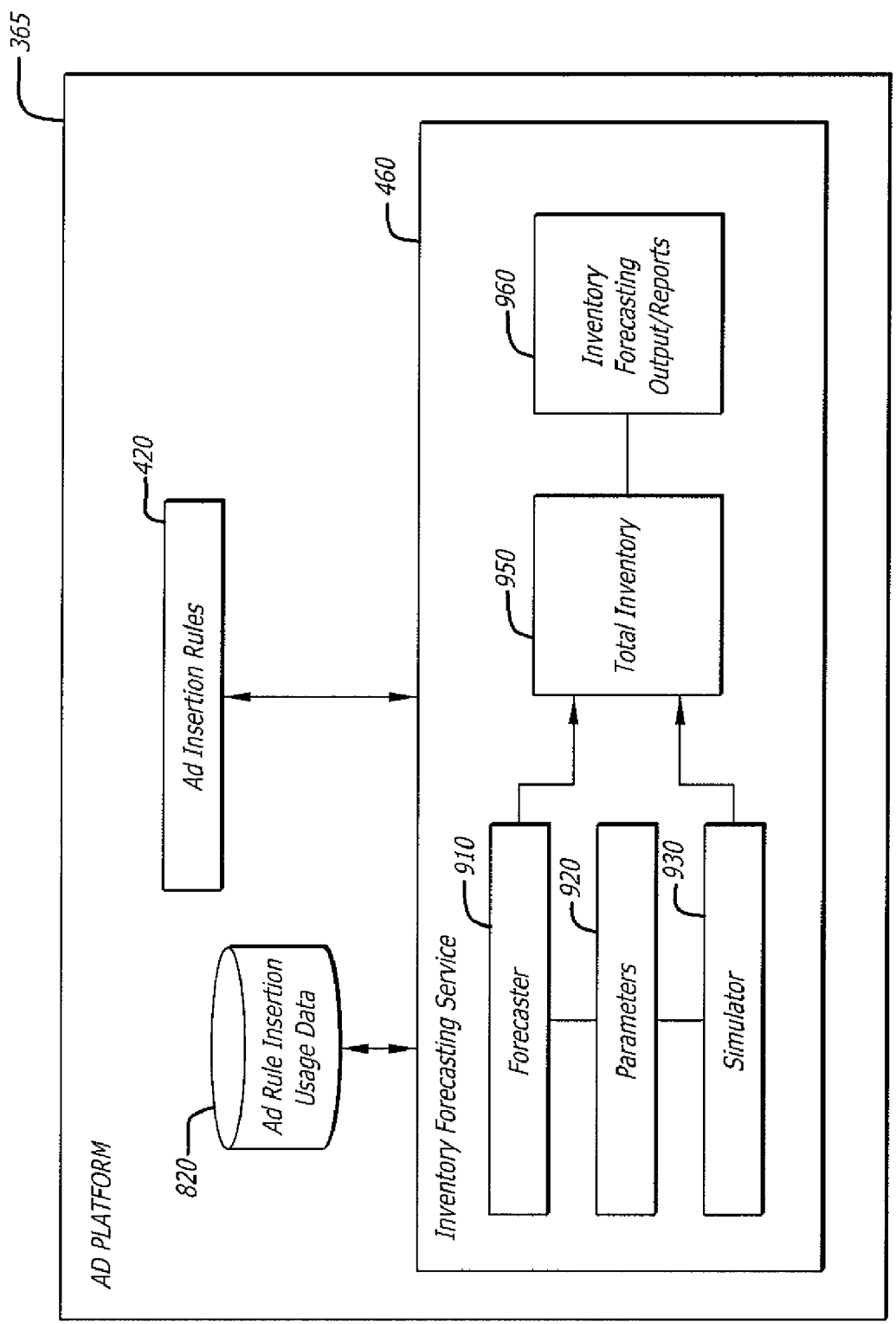
FIG. 9A is a block diagram of an embodiment of inventory forecasting services of an embodiment of the ad services platform.
Figure 9C:
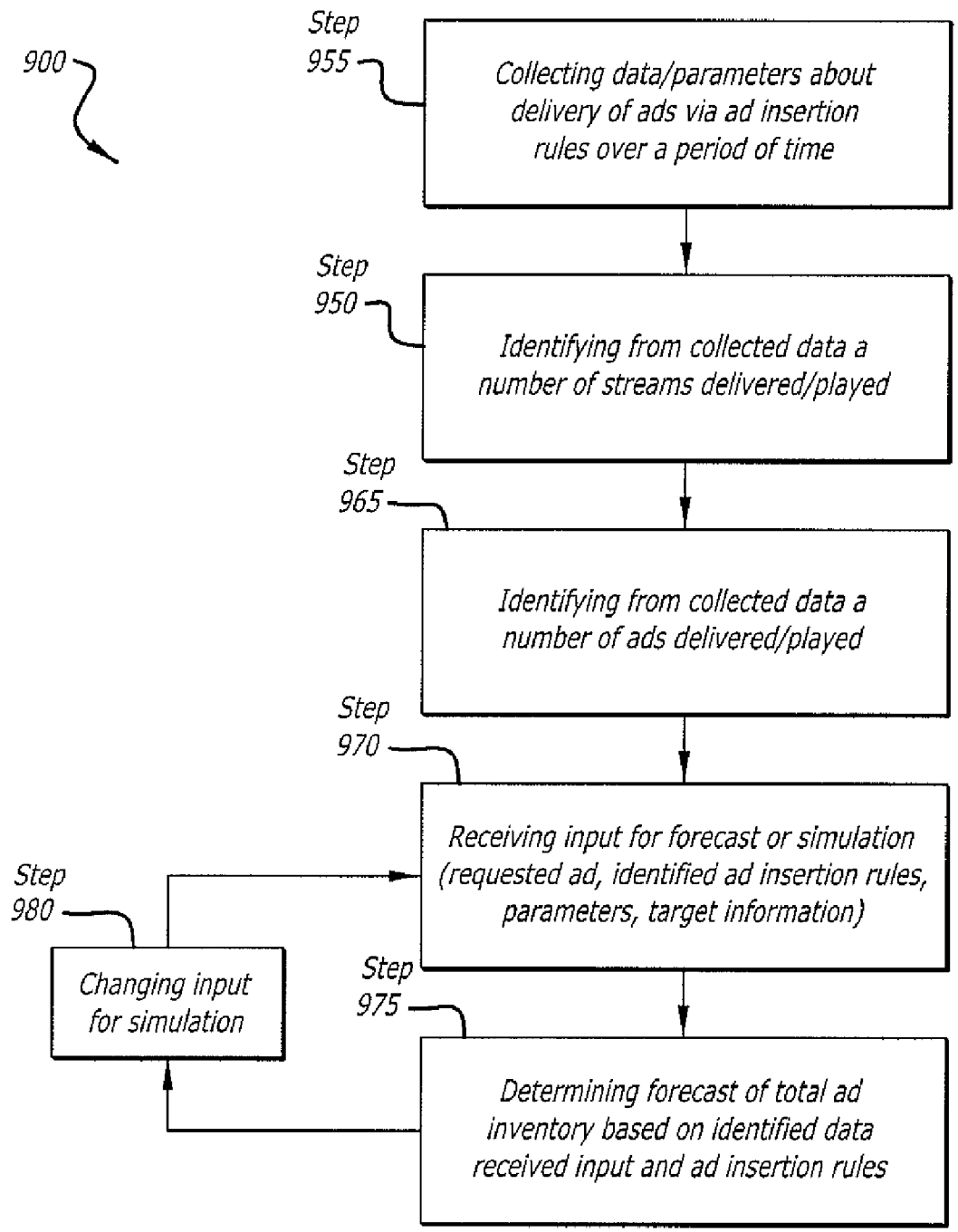
FIG. 9C is a flow diagram of steps of an embodiment of a method for forecasting inventory.

Referring now to FIGS. 9A-9C, systems and methods of an ad inventory forecasting service 460 for forecasting advertising inventory based on ad insertion rules and/or collected data is described. As the media platform 200 and/or stream composition service 435 is able to improve the delivery of ads via ad insertion rules and collected data, an inventory forecasting service 460 may forecast or estimate the available ad inventory based on collected data and application of the ad insertion rules. For example, a customer may want to buy ad impressions for a campaign and would like to know if they could sell 50,000 impressions of an ad during a certain part of day and in a certain category. Using the forecasting systems and methods described herein, the media platform provides information on the ad inventory available to a campaign based on campaign parameters and application of ad insertion rules.

Referring now to FIG. 9A, an embodiment of the inventory forecasting service is depicted 460. In brief overview, the inventory forecasting service 460 may include a forecaster 910 which accesses or obtains data, such as historical ad viewer ship data, from a data storage 820. The forecaster 910 may use a forecasting or estimation methodology upon the data 820 and input from one or more parameters 930 to determine a total ad inventory 950. The inventory forecasting service 460 may include a simulator 930 to simulate one or more "what-if" scenarios of changing ad insertion rules and targeted ad campaign parameters to determine total ad inventory 950. The inventory forecasting service 460 may include one or more types of output, such as reports 960 to provide information on the total ad inventory 950 from the forecaster 910 and/or simulator 930.

In further detail, the forecaster 910 may include or perform any type and form of forecasting methodology, technique, algorithm, logic, function or operation. The forecaster 910 may include software, hardware or a combination of software and hardware. The forecaster 910 may include an application, program, process, service, task or set of executable instructions for performing a forecasting methodology. In one embodiment, the forecaster 910 performs time series forecasting or provides a time series based forecast. The forecaster 910 may use and type and form of a model to predict future events based on known past events or to otherwise predict future data points before they are measured based on past data points. The forecaster 910 performs or provides any type and form of time series forecasting such as Box-Jenkins and linear regression The forecaster 910 may use any type and form of autoregressive (AR) models, integrated (I) models, or a moving average (MA) model, such as the Autoregressive Moving Average Models (ARMA) and Autoregressive Integrated Moving Average (ARIMA) models.

The forecaster 910 computes, forecasts, predicts estimates, or otherwise provides a total ad inventory forecast 950. As depicted in FIG. 9A, the total inventory 950 is a function of the total audience available (ai) over a period of time and the spot load (sl) of the ad:

$$\text{Total inventory} = f(ai, sl) = ai \times sl$$

The total audience may be expressed as the number of video clips delivered over a period of time and the spot load may be expressed as number of ads per video clip. Although the total inventory is shown as a multiplying function of available inventory and spot load, any type and form of function may used to determine the total inventory based on available inventory and spot load. In one embodiment, the total inventory may be determined using the available inventory and spot load and a configurable or predetermined factor, such as $$\text{Total inventory} = f(ai, sl) = ai \times sl \times \text{factor}$$

The predetermined factor may be used to take into account errors, risks and other factors in forecasting the total ad inventory 950.

In forecasting the available inventory, the forecaster 910 may use or more parameters 920 as illustrated in FIG. 9B. In an example embodiment, the forecaster 910 may use the following parameters 920 observed over a period of time
1. Days and the hours during which streams where played back
2. Number of streams
3. Audience segment of the user/consumer
4. Churn rate, i.e., how many times an ad was streamed to a user In some embodiments, the forecasting service 460 and/or forecaster 910 processes parameters 920 or data 820 to identify seasonal trends and special events. The forecasting service 360 may perform any type of smoothing calculation or average calculation to reduce the effect of the identified seasonal trends and special events. In some cases, the forecaster determines the total inventory 950 with the processed data and then adds in the data from the identified seasonal trends and/or special events for fine tuning the total inventory value.

In some embodiments, the forecaster 910 obtains any one or more of the parameters 920 from the data storage 820. In other embodiments, the forecaster 910 obtains any parameter 920 from the data acquisition service or any other service of the media platform 200. In another embodiment, the forecaster 910 provides a user interface, graphical or command-line, for a user to enter, input or provide one or more of the parameters 920. In yet another embodiment, the forecaster 910 performs computations on data from the data storage 820, a service, such as the data acquisition service, and/or from the user to obtain or generate a parameter 920.

The forecaster 910 may determine or use an available inventory (ai) comprising any time span or portion thereof. In some embodiments, the available inventory includes a number of media streams served or delivered. In other embodiments, the forecaster use an available inventory based on number of media streams player or played for a predetermined duration of time. The forecaster 910 may use an available inventory based on the number of media streams played to completion. The forecaster 910 may use an available inventory based on the number of media streams for which an ad was clicked or a video as played, or for which a predetermined number of ads were clicked or a video ad played for a predetermined duration. The forecaster 910 may determine or use the number of media stream server or delivered over a predetermined time period. In some cases, the forecaster 910 determines or uses as the available inventory the number of streams served during a part of the time during the time period and/or category or type of content. For example, the forecaster 910 may determine available inventory for evenings when football clips are playing. In other embodiments, the forecaster 910 determines or uses as the available inventory the number of streams served via a video channel, a web-site, distributor or affiliate.

The forecaster 910 may determine or use for the spot load (sl) of the total inventory 950 a number of ads, played, clicked or delivered. For the available inventory, the forecaster 910 may determine or use as the spot load a number of ads delivered or served to the audience. In other embodiments, the forecaster 910 may determine or uses as the spot load a number of ads played, such as a number of ads played by the determined audience. In some embodiments, the forecaster 910 may use as the spot load the number of ads that were clicked or selected by a user. In another embodiment, the forecaster 910 may use as the spot load the number of ads played back for a predetermined duration. In some embodiments, the forecaster 910 may use as the spot load a statistical computation of spot load, such as an average number of ads delivered or played over a period of time, a part of date, a content category or type, or a user profile. In one embodiment, the forecaster 910 may use a spot load based on a number of ads delivered or player on a per user basis.

The forecaster 910 may determine a spot load based on ad insertion rules 420. For a given audience or number of streams server or played, the forecaster 910 may determine which of the ad insertion rules would be triggered or cause an ad to be delivered or played to the audience. The forecaster 910 may use any static, dynamic or progressively dynamic ad insertion rule, or any combination thereof, to forecast a spot load. The forecaster 910 may determine based on any data in the data store 820 the number of ads that would or should delivered based on applying a set of one or more ad insertion rules. A user may specify a set of ad insertion rule(s) to use for forecasting. The forecaster 910 may determine a spot load based on insertion points of ad insertion rules, such as from data 820 identifying number of insertion points at which ads were delivered. The forecaster 910 may determine a spot load based on an average number of insertion points at which ads were delivered, for example, on a per rule basis.

The simulator 930 may include or perform any type and form of simulation technique, model, algorithm, logic, function or operation. The simulator 930 may include software, hardware or a combination of software and hardware. The simulator 930 may include an application, program, process, service, task or set of executable instructions for performing a simulation. In one embodiment, the simulator 930 performs a "what-if scenario" for a time series forecast of the forecaster 910 by changing one or more ad insertion rules 420, parameters 920 and/or data 820. In some embodiments, the simulator 930 includes the functionality of or interfaces to the forecaster 910. The simulator 930 may provide a front-end to the forecaster 920, such as user interface to allow a user to create ad campaign scenarios. The simulator 920 may allow a user to change input to the forecaster 910, or otherwise control and manipulate the input to determine the output. The user may change the inputs to the simulation or forecasting until a desired output is determined. The simulator 920 may simulate the execution of one or more ad insertion rules over an identified audience. The simulator may use historical data in the data store to determine when and for what stream an ad insertion rule may deliver an ad.

The inventory forecasting service 460 may provide output from the forecaster 910 and/or simulator 920 via inventory forecasting output 960, such as via reports. The inventory forecasting output 960 may identify and/or describe the total inventory 950 and any parameters or calculations of the total inventory 950 as determined by the forecaster 910. Likewise, The inventory forecasting output 960 may identify and/or describe the total inventory 950 based on any simulations or "what-if" scenarios simulated and provided by the simulator 930. The inventory forecasting output 960 may be any user interface form, such as a web page, text output, document, report or other electronically readable output means. For example, the inventory forecasting output 960 may be provided in the form of a table or spreadsheet.

Referring now to FIG. 9C, an embodiment of steps of a method for performing forecasting and simulation to determine a total available inventory 950 is depicted. In brief overview, at step 955, the media platform 200 via the data acquisition service collects data and parameters about the delivery of ads via application of ad insertion rules during playback of video media over a period of time. At step 960, the inventory forecasting service 460 identifies from the collected data a number of media streams served or played. At step 965, the inventory forecasting service 460 identifies from the collected data a number of ads delivered or played At step 970, the inventory forecasting service 460 receives input for performing a forecast, such as an ad requested to be delivered, target information, ad insertion rule, or input parameters. At step 975, the inventory forecasting service 460 performs a forecast based on the identified data and received input. At step 980, a simulation of a what-if scenario or forecast may be performed by changing input to the simulator 930 or forecaster 910.

At step 955, the media platform via the data acquisition service collects data regarding the delivery of ads via the application of ad insertion rules. The data acquisition service stores this data into a data storage 820. As previously described herein, for example in conjunction with FIGS. 8A-8C, the data acquisition service may collect data regarding the operation, performance and/or effectiveness of the ad insertion rules, including number and format of ads delivered, duration of ad play, user actions, user profile and user behavior history information. The data acquisition service may also store any temporal information regarding the insertion points for the delivery or playback of ads via the ad insertion rules.

At steps 960 and 965, the inventory forecasting service 460, forecaster 910 and/or simulator 930 may identify data to use for forecasting and/or simulation from the collected data in the data storage 820. The data may be identified for any time period, including day parts. In one embodiment, the forecaster 460 identifies from the collected data a number of media streams delivered or served. In another embodiment, the forecaster 460 identifies from the collected data a number of media streams played or played for a predetermined duration. In some embodiments, the forecaster 460 identifies from the collected data a number of ads delivered or server. In other embodiments, the forecaster 460 identifies from the collected data a number of ads played or played for a predetermined duration. The forecaster 910 may identify any of the following parameters 920 from the collected data: 1) days and the hours during which streams where played back 2) number of streams 3) audience segment of the user/consumer 4) churn rate, i.e., how many times an ad was streamed to a user. In some embodiments, the forecasting service 460 and/or forecaster 910 identifies seasonal trends and special events from the collected data.

At step 970, the forecasting service 460, forecaster 910 and/or simulator 930 receives any input to perform the forecasting or simulation from any type and form of interface, such as a graphical user interface, command line or API. In one embodiment, the forecaster 910 receives identification of an ad requested to be delivered or for which a total available inventory 950 should be determined. In another embodiment, the forecaster 910 receives identification of one or more ad insertion rules to apply or use for the forecast. In other embodiments, the forecaster 910 receives any one or more parameters 920, such as a parameter provided by a user. In some embodiments, the forecaster 910 receives any target information for an ad campaign, such as a target audience, a target time period or a category for the requested ad.

At step 975, the forecaster 910 forecasts, estimates, predicts or otherwise determines a total available inventory 950 based on the identified portions of the collected data and/or the received input. The forecaster 910 may determine the total available inventory as any type function of available inventory (ai) and spot load (sl), for example as depicted in and discussed above in conjunction with FIG. 9B. The forecaster 910 may determine the spot load based on any one or more identified ad insertion rules. The forecaster 910 may use a time series forecasting model or methodology. The forecaster 910 may determine the total available inventory 950 for any time period, day part, category, or target audience. The forecaster 910 may use any slice of historical data or time periods from the collected data to forecast the total available inventory 950. In one embodiment, the forecaster 910 determines a forecast of total inventory 950 for a requested ad based on the identified number of times each of a plurality of video media was played, the identified number of ads delivered during playback of the video media and an identified set of one or more ad insertion rules At step 980, the inventory forecasting service 460 may perform one or more inventory forecast simulations via the simulator 930. A user may request or initiate the simulation. In some embodiments, a system, application or process may initiate, automatically or otherwise, a simulation. In one embodiment, a user may change any input for the simulation such as to create different target information, a different audience segment or use different ad insertion rules. In another embodiment, the user may change one or more parameters 920 used for a forecast. In some embodiments, a user changes one or more of the ad insertion rules to determine an effect on a forecasted total inventory 950, such as changing a rule criteria or ad format or location. A user may create "what-if" scenarios and perform "what-if" analysis by changing any input to the forecast to determine how the input impacts or affects the output of total ad inventory 950.

Via forecasting and simulation as described above, a user may be able to further improve or optimize ad insertion rules and the delivery of ads for a target ad campaign. A user may determine what type of ad insertion rules, audience segment and time slots may work better for an ad campaign. With forecasting and simulation, the user can optimize ad insertion rules to increase viewer ship and click through on ads and increase revenue and advertising rates. With the flexibility in targeting of ad insertion rules, the media platform described above provides the functionality to offer various tiered and levels of advertising services and ad campaigns.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method comprising:
   (a) receiving, by a computer, a request to playback a video media;
   (b) identifying, by the computer, an ad insertion rule associated with the video media, the ad insertion rule specifying an insertion point during playback of the video media to display an ad and a format for displaying the ad at the insertion point, the ad insertion rule specifying the format and a frequency for displaying the ad during playback of the video media based on a length of the video media;
   (c) determining, by the computer, a point during playback of the video media corresponding to the insertion point specified by the ad insertion rule; and
   (d) transmitting the ad to a client computer for display at the determined point during playback of the video media using the format for the ad specified by the ad insertion rule.

2. The method of claim 1, wherein step (c) comprises determining the point during playback of the video media corresponds to a period of time indicated by the frequency.

3. The method of claim 1, comprising specifying, by the ad insertion rule, one of a length for displaying the ad, a location of the ad, or a type of ad.

4. The method of claim 3, wherein step (c) comprises displaying the ad for the length specified by the ad insertion rule based on the length of the requested video media.

5. The method of claim 3, wherein step (c) comprises displaying the ad at the location specified by the ad insertion rule based on the length of the requested video media.

6. The method of claim 3, wherein step (c) comprises displaying one of the following types of ads responsive to the ad insertion rule: gateway, interstitial, bumper, context positioning, a spot, a bug, telescoping, interactive video, video curtains, video roadblocks, ticker lay, and shadow ad.

7. The method of claim 1, comprising identifying a user requesting playback of the video media, and obtaining one of a profile or a behavior history of the identified user.

8. The method of claim 7, comprising obtaining via the profile of the identified user one or more of the following information: name, age group, topics of interest, gender, geographic location, ethnic background, household income, education level, and children in household.

9. The method of claim 7, comprising obtaining via the behavior history of the identified user one or more of the following information: average viewing period, trend in popular topics, number of streams, days and hours of streaming, and Internet protocol address mapping to location.

10. The method of claim 7, comprising obtaining via the behavior history of the identified user one or more of the following user actions on a media player: mute, pause, restart, full screen, mid point viewing, complete viewing, fast forward, rewind, mouse over, hover, user initiated play via a click through.

11. The method of claim 7, wherein step (c) comprises determining the point in playback of the video media corresponding to the insertion point specified by the ad insertion rule based on one of the profile or the behavior history of the identified user.

12. The method of claim 7, wherein step (d) comprising one of displaying the ad at a location, for a length of time or having a predetermined type based on one of the profile or the behavior history of the identified user.

13. The method of claim 1, comprising identifying the popularity rating of one of the video media requested for playback or the ad specified by the ad insertion rule associated with the requested video media.

14. The method of claim 13, comprising identifying the popularity rating based on a number of views of the video media.

15. The method of claim 13, wherein step (c) comprises determining the point during playback of the video media corresponding to the insertion point specified by the ad insertion rule based on the identified popularity rating.

16. The method of claim 13, comprising one of increasing or decreasing a frequency of ads displayed during playback of the video media based on determining the identified popularity rating is one of greater than or less than a predetermined threshold.

17. The method of claim 13, wherein step (d) comprises one of displaying the ad at a location, for a length of time or having a predetermined type based on the identified popularity rating.

18. A method comprising:
(a) receiving, by a computer, a request by a user to playback a video media via a media player;
(b) identifying, by the computer, an ad insertion rule associated with a video media, the ad insertion rule specifying an insertion point for displaying an ad during playback of the video media based on one or more actions of a user via the media player during a playback session of the video media;
(c) detecting, by the computer, one or more actions of the user via the media player during the playback session of the video media;
(d) determining, by the computer, a point during playback of the video media corresponding to the insertion point specified by the ad insertion rule based on the detected one or more actions of the user; and
(e) transmitting, by the computer, the ad specified by the ad insertion rule to a client computer for display at the point during playback of the video media based on the determination.

19. The method of claim 18, wherein step (c) comprises detecting a length of time of the playback session is one of greater than or less than a predetermined length of time.

20. The method of claim 18, wherein step (c) comprises detecting the user has taken one or more of the following actions via the media player: mute, pause, restart, full screen, fast forward, and rewind.

21. The method of claim 18, comprising changing one of a frequency of ad insertion or format of the ad based on the detected one or more actions of the user.

22. The method of claim 18, comprising changing one of a location of the ad or a length of time for displaying the ad based on the detected one or more actions of the user.

23. The method of claim 18, wherein step (e) comprises comprising one of displaying the ad at a location, for a length of time or having a predetermined type based on the detected one or more actions of the user.

24. The method of claim 18, wherein the playback session comprises a user's session with a web site.

25. The method of claim 18, wherein the playback session comprises a user's session with the media player.

26. A method comprising:
(a) receiving, by a computer, a request by a user to playback a video media via a web site;
(b) identifying, by the computer, an ad insertion rule with a video media, the ad insertion rule specifying an insertion point for displaying an ad during playback of the video media based on one or more actions of the user at a web site;
(c) detecting, by the computer, one or more actions of the user at the web site;
(d) determining, by the computer, a point during playback of the video media corresponding to the insertion point specified by the ad insertion rule based on the identified one or more actions of the user; and
(e) transmitting, by the computer, the ad specified by the ad insertion rule to a client computer for display at the point during playback of the video media based on the determination.

27. The method of claim 26, wherein step (c) comprises detecting a length of the user's visit at the web site is one of greater than or less than a predetermined length of time.

28. The method of claim 26, wherein step (c) comprises detecting a type of content the user viewed at the web-site.

29. The method of claim 26, wherein step (c) comprises detecting a user interface element selected by the user at the web-site.

30. The method of claim 26, comprising changing one a frequency of ad insertion or format of the ad based on the detected one or more actions of the user at the web-site.

31. The method of claim 26, comprising changing one a location of the ad or a length of time for displaying the ad based on the detected one or more actions of the user at the web-site.

32. The method of claim 26, wherein step (e) comprises comprising one of displaying the ad at a location, for a length of time or having a predetermined type based on the detected one or more actions of the user at the web-site.

33. The method of claim 26, wherein the user's visit to the web-site comprises a playback via a media player.

* * * * *